US012570198B2

(12) United States Patent
Farquhar et al.

(10) Patent No.: US 12,570,198 B2
(45) Date of Patent: Mar. 10, 2026

(54) IN VEHICLE CARGO STORAGE UNIT CONVEYOR SYSTEM

(71) Applicant: LEAR CORPORATION, Southfield, MI (US)

(72) Inventors: Mark Farquhar, Southfield, MI (US); Brian Phillips, Almont, MI (US); Jeanene F. Munroe, Dearborn, MI (US); Evan Katz, Southfield, MI (US); Praveen Dodamani, Pune (IN); Nilesh Mate, Pune (IN); Gegi George, Farmington Hills, MI (US); Kyle Calvert, Sterling Heights, MI (US); Eric Veine, Wixom, MI (US); Krzysztof Wroblewski, Washington, MI (US); Stephen Redwood, Flat Rock, MI (US); Vishal Sarode, Farmington Hills, MI (US); Chris Armbruster, White Lake, MI (US); Kevin Gasparotto, New Hudson, MI (US); Andrew Showich, Beverly Hills, MI (US); Christopher D. Johnson, Novi, MI (US); Sumanth Muthyala, Ann Arbor, MI (US); Aaron Roggow, Rochester Hills, MI (US); Salim Marouf, Ann Arbor, MI (US); Lea Thomas Smith, Severna Park, MD (US); Anthony Mollica, Royal Oak, MI (US); Michael Currie, Macomb, MI (US); Erik Elie, West Bloomfield, MI (US); Jason Scott, Southfield, MI (US)

(73) Assignee: Lear Corporation, Southfield, MI (US)

( * ) Notice: Subject to any disclaimer, the term of this patent is extended or adjusted under 35 U.S.C. 154(b) by 186 days.

(21) Appl. No.: 18/366,341

(22) Filed: Aug. 7, 2023

(65) Prior Publication Data

US 2024/0059205 A1 Feb. 22, 2024

Related U.S. Application Data

(60) Provisional application No. 63/398,417, filed on Aug. 16, 2022.

(30) Foreign Application Priority Data

Mar. 21, 2023 (IN) .............................. 202341019436

(51) Int. Cl.
*B60P 1/64* (2006.01)
*B60P 1/36* (2006.01)

(52) U.S. Cl.
CPC ............... *B60P 1/6481* (2013.01); *B60P 1/36* (2013.01)

(58) Field of Classification Search
CPC ... B60P 1/649; B60P 1/6463; B65G 1/12–133
See application file for complete search history.

(56) References Cited

U.S. PATENT DOCUMENTS

| 4,667,602 A | 5/1987 | Vaida et al. | |
| 5,788,057 A * | 8/1998 | Walser ................. | B65G 17/485 |
| | | | 211/121 |

(Continued)

FOREIGN PATENT DOCUMENTS

| DE | 102007063061 A1 | 7/2009 |
| WO | 2022/094015 A1 | 5/2022 |

OTHER PUBLICATIONS

International Search Report for PCT/US2023/029802 dated Oct. 31, 2023, 11 pages.

(Continued)

*Primary Examiner* — Joseph A Dillon, Jr.
(74) *Attorney, Agent, or Firm* — Brooks Kushman P.C.

(57) ABSTRACT

A system for moving cargo includes an in-vehicle conveyor system mounted in a vehicle cargo space, the in-vehicle conveyor system comprising one or more rails. The rails may be mounted to walls, floor, or ceiling of the vehicle cargo space. The system also includes one or more cargo storage units attached to the in-vehicle conveyor system. Each of the one or more cargo storage units is secured to the rails such that the one or more cargo storage units are raised with respect to a floor of the vehicle cargo space and define a circuit as based on a travel path of the one or more cargo storage units. Upon instruction, the cargo storage units are (Continued)

movable along the circuit to move a specified cargo storage unit to a predetermined location.

17 Claims, 56 Drawing Sheets

(56)  References Cited

U.S. PATENT DOCUMENTS

| | | | | |
|---|---|---|---|---|
| 11,498,627 | B2 * | 11/2022 | Patel | G06Q 10/0836 |
| 11,724,633 | B2 * | 8/2023 | Perez | B60P 3/007 |
| | | | | 414/390 |
| 11,932,491 | B2 * | 3/2024 | Haid | B65G 1/1375 |
| 11,978,012 | B2 * | 5/2024 | Gil | G06Q 10/087 |
| 12,026,663 | B1 * | 7/2024 | Kalm | B65G 1/137 |
| 12,134,532 | B2 * | 11/2024 | Haid | B60P 1/00 |
| 12,187,228 | B2 * | 1/2025 | Otero | B60R 7/02 |
| 12,319,503 | B2 * | 6/2025 | Nguyen | G07F 11/54 |
| 2016/0224930 | A1 * | 8/2016 | Kadaba | G06Q 10/0631 |
| 2017/0291766 | A1 | 10/2017 | Orth et al. | |
| 2020/0175471 | A1 * | 6/2020 | Tsuruta | G06Q 10/0838 |
| 2022/0009731 | A1 * | 1/2022 | Haid | G06Q 10/08 |
| 2022/0129833 | A1 | 4/2022 | America | |
| 2022/0281372 | A1 * | 9/2022 | Seemüller | B60P 1/5442 |
| 2024/0010450 | A1 * | 1/2024 | Courtens | B60P 1/6481 |
| 2024/0109730 | A1 * | 4/2024 | Dupre | B65G 35/06 |

OTHER PUBLICATIONS

International Preliminary Report on Patentability for PCT Application No. PCT/US2023/029802, dated Oct. 11, 2024, 14 pages.

* cited by examiner

400

320,330

314

300

202

204

400

GEN 2 ROTATION MECH

CENTER MOTOR TURNED 90 DEG
CLOCKWISE, CSU FACING INSIDE

CENTER MOTOR TURNED 90 DEG
CLOCKWISE, CSU FACING REAR

TROLLEY CENTER PIN ENGAGED/TRANSFER
FROM CROSS-CAR HOOK SYSTEM

STEP 14

| NO. | | OPTIONS | |
|---|---|---|---|
| ▽ | ▽ | | ▽ |
| | | WEIGHT | |
| 1 | | RACETRACK W/ CORNER RADII | |
| 2a | | RACETRACK W/ CORNER SQUARE (16 TOTES) | |
| 2b | | RACETRACK W/ CORNER SQUARE (17 TOTES) | |
| 3 | | RACETRACK W/ 2 CORNER SQUARE + 2 CORNER RADII (SAME SIDE) | |
| 4 | | OPTION-1 W/MIDDLE TRACK & CORNER RADII | |
| 5 | | OPTION-1 W/MIDDLE TRACK & SQUARE RADII | |
| 6 | | OPTION-1 W/SQUARE CROSS TRACK & RADII | |
| 7 | | OPTION-1 W/RADII CROSS TRACK & CORNER RADII | |
| 8 | | PUSHERS W/ MIDDLE TRACK | |
| 9 | | RACETRACK W/ 2 CORNER SQUARE + 2 CORNER RADII (DIAGONAL SIDE) | |
| 10 | | JIT TYPE CONVEYOR - (OVERHEAD APPLICATION) | |
| 11 | | CURRENT CAROSEL - (SPRINT 15 DESIGN) | |
| 11b | TO BE DEVELOPED | CURRENT CAROSEL - (SPRINT 15 DESIGN) - VOLUME OPTIMIZED TO BE DEVELOPED | |

FIG. 22A

IN VEHICLE CARGO STORAGE UNIT CONVEYOR SYSTEM

CROSS-REFERENCE TO RELATED APPLICATIONS

The present application claims priority to U.S. provisional application Ser. No. 63/398,417, filed Aug. 16, 2022, and Indian Provisional Application Ser. No. 20/234,1019436, filed Mar. 21, 2023, the disclosures of which are hereby incorporated in their entirety by reference herein.

TECHNICAL FIELD

The present disclosure relates to a systems, devices, and methods for handling cargo, and more particularly, to systems, devices, and methods for facilitating cargo management within a vehicle.

BRIEF DESCRIPTION OF THE DRAWINGS

FIG. 22A is a chart showing various rail configurations, according to one or more embodiments;

DETAILED DESCRIPTION

Figure 1:
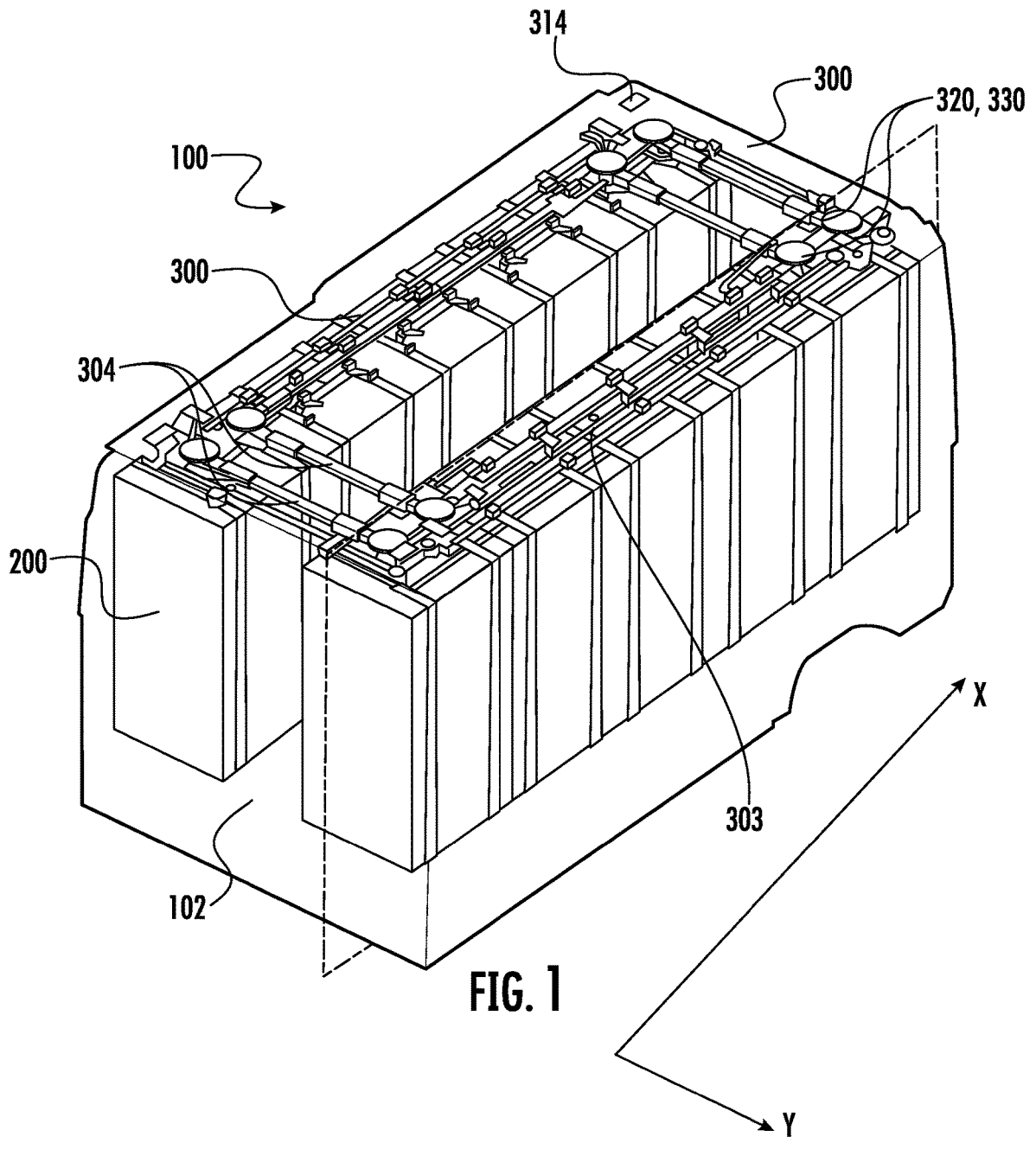
FIG. 1 is a perspective view of an in-vehicle cargo storage unit conveyor system in a vehicle, according to one or more embodiments with cargo storage units (CSU's) attached thereto.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Substantial labor, time and cost is spent on managing cargo and packages from all aspects of the supply chain, starting from the warehouse to getting packages the last mile (or last few miles) due to difficulties in efficiently and quickly transporting and storing the cargo, and the subsequent inefficient loading and unloading of a delivery vehicle (e.g., a car, van, truck, trailer, or other suitable vehicle with a space for storing cargo, like packages, for delivery). Furthermore, retrieval of packages in the vehicle during last-mile delivery may be inefficient due to drivers needing to search for packages in the cargo space of the vehicle, especially if packages move during vehicle operation or as other packages are unloaded and delivered. Certain types of cargo may further require particular environments that may not be readily available or customizable in a vehicle.

Accordingly, systems, devices. and methods to assist cargo transport and improve cargo management in the vehicle are provided.

According to one or more embodiments, an in-vehicle conveyor system for moving cargo storage units (CSUs) is provided, as well as devices incorporated in the system, and methods for operating the system. The in-vehicle conveyor system moves the CSUs to specified locations within the cargo area of a vehicle either during operation of the vehicle (i.e., the vehicle is in motion), or when the driver is retrieving packages from CSUs for delivery (i.e., the vehicle is not in motion). The CSUs may be housings, for example, with variable shelving to form compartments or package cavities in which packages or other cargo can be stored, and in some examples, which restrain the packages or cargo in specified locations, and limit free movement of packages or cargo during vehicle operation. Hereinafter, packages and cargo may be used interchangeably, and description of one of a package or cargo is not intended to be limiting, as all types of cargo (i.e., unboxed/unwrapped items) is contemplated.

Generally, the in-vehicle conveyor system includes rails in the vehicle cargo space that the CSUs are removably attached to for translating the CSUs about the cargo space of the vehicle during transit to the next delivery location or when the driver is searching for a package for delivery at the delivery location. The rails may be mounted to the interior walls, floor, or ceiling of the vehicle. In various non-limiting embodiments and examples described herein, the rails are mounted to the ceiling such that the CSUs provided thereon hang from the rails, with the bottom of the CSUs being raised with respect to the floor of the cargo space. Although the CSUs may generally be described as hanging from the rails in various embodiments, the CSUs may be attached or removably attached to the rails in any suitable manner, and description or depiction of the CSUs as hanging is not intended to be limiting. For example, although not shown in the Figures, the CSUs may sit atop the rails and be moved around on or adjacent to the rails, rather than below the rails by a suitable trolley mounting the CSU to the rail. In additional examples, as will be discussed below, the rails may be mounted to the walls such that the CSU can still hang vertically below the rails. Moreover, the rails may be floor mounted such that they are suspended above the vehicle floor to allow the CSUs to hang from the rails. Further detail of the configurations and examples for the rails and attaching the CSUs to the in-vehicle conveyor system, and features of the system will be described below with reference to the Figures.

Furthermore, in various embodiments, the in-vehicle conveyor system allows an identified package in a specific cargo unit to be directly brought to a predetermined location in the vehicle cargo space (e.g., where the driver can access the identified package, for example at the front of the vehicle, at an area corresponding to a side door of the vehicle, or at the rear of the vehicle, or as based on the cargo space and driver access design) while improving loading efficiency and ergonomics. The system can be implemented in existing vehicle cargo spaces, and can help reduce weight of cargo shelving structures mounted in the vehicles, while providing flexibility to manually access packages according to the CSU it is stored in at any time. The system also more efficiently utilizes vehicle cargo capacity since the space for the driver to enter the cargo area to find, sort, and organize packages is reduced because of mobility of the CSUs on the rails, such that the CSUs can improve utilization of the cargo space than previously occupied by conventional cargo shelving.

Additionally, the in-vehicle conveyor system and CSUs together allow for a driver to more efficiently find cargo and packages for delivery. The system allows for varied location of the CSUs for retrieval of packages for the driver (e.g., towards the front or rear of the vehicle), and improves accessibility to packages based on the organization provided by the CSUs and their integration into the in-vehicle conveyor system. For example, when secured in CSUs, packages may be less blocked by other packages on shelving or by packages the floor, and packages do not need to be manually moved around the cargo space to access other packages, which would impact time to deliver a subsequent item based on iterations of manual movement of packages and difficulty in finding a package in the cargo space. The system may further operate to move the CSUs along a travel path defining a circuit to a predetermined location in the cargo space as based on delivery data, location information, a predetermined path/route of the vehicle, or GPS data of the vehicle to decrease the time needed at each delivery stop, as the in-vehicle conveyor system can operate while the vehicle is in motion to anticipate the upcoming delivery and deliver a specific CSU to the predetermined location in the vehicle. The predetermined location may include latches or other stops to hold the CSU in position during delivery by the driver. Although the predetermined location is generally described to correspond to where a driver may access the CSU, the predetermined location may also correspond to a storage position for a CSU such that other CSUs may be accessed, and description of a predetermined location corresponding to driver access is not intended to be limiting. Furthermore, there may be further locations indicated for the CSU to be moved to. For example, there may be a third location such as a center storage position or wall storage position, or a fourth location as an option to deliver CSU to front or rear access point different from the predetermined location, and any suitable number of location options as based on the configuration of rails and CSUs mounted thereto is contemplated.

As such, systems, devices, and methods are described hereinafter for an in-vehicle conveyor system with CSUs, where the systems, devices, and methods secure, organize, and advance packages to improve cargo management and maximize cargo capacity. The arrangement of the rails described herein are examples of configurations, and are not intended to be limiting, and other configurations are also contemplated for improving circuit efficiency and volume capacity in the cargo space. Furthermore, the configurations of the CSUs are provided as example constructions, and are not intended to be limiting, and other constructions are contemplated as suitable for use with the in-vehicle conveyor system. Non-limiting example mechanisms for movement and movement restriction of the CSUs is provided, as well as operating methods for the mechanisms, and further mechanisms and methods are also contemplated although not described herein. Additional accessories to the system are also described hereinafter, according to various embodiments, which include, without limitation, electronics (e.g., package scanners), mechanical locks and latches, location indicators, CSU covers, variable containers for the CSUs, etc.

Referring to FIGS. 1-5, an example of an in-vehicle conveyor system 100 is shown according to various embodiments. The in-vehicle conveyor system 100 moves CSUs 200 to specified locations, including predetermined locations, in the cargo space 102 of a vehicle 104. The vehicle 104 may be any suitable vehicle such as, for example, a car, van, truck, trailer, or other suitable vehicle with a cargo space for storing cargo, like packages, for delivery. The in-vehicle conveyor system 100 includes one or more rails 300 mounted to walls, ceilings, or floor of the vehicle cargo space 102. The in-vehicle conveyor system 100 also includes one or more cargo storage units (CSUs) 200 removably attached to the in-vehicle conveyor system 100, with each of the CSUs 200 secured to the rails 300 when attached to the in-vehicle conveyor system 100 such that the CSUs 200 are raised with respect to a floor 101 of the vehicle cargo space 102. The CSUs 200 on the rails 300 define a circuit 310 as based on travel paths of the CSUs 200. Upon instruction, the CSUs are movable along the circuit 310. As such, a specified cargo storage unit 250 of the CSUs 200 may be moved to a predetermined location 315 along the circuit 310.

The instruction for moving the CSUs may be automated or manual, or may be optionally both. For example, for manual instruction, the driver of the vehicle 104 may have a control device (not shown) to recall the specified cargo storage unit 250 to the predetermined location 315. In another example, where the instruction is automated, the CSUs 200 may be moved based on delivery data associated with a specified cargo storage unit 250. In various embodiments, the delivery data may be associated with packages loaded in the specified cargo storage unit 250. The delivery data may be an address for delivering a specific package, or may be a zone for delivering a group of packages. Furthermore, the instruction may be based on wherein the instruction is further based on location information, a predetermined path or route, or GPS data of the vehicle 104 in which the in-vehicle conveyor system 100 is provided. In certain embodiments, the instruction may be based on a combination of delivery data and location information, a predetermined path or route, or GPS data of the vehicle 104, where the location information or GPS data of the vehicle may be correlated with the delivery data associated with the packages for the instruction. For example, the driver may see the GPS data and manually call, via the control device, specific packages based on their delivery data to the predetermined location (e.g., to the front or the rear of the vehicle 104). In another example, the GPS data of the vehicle location may trigger an automated instruction upon entry of a delivery zone, such that packages with delivery data associated with the zone are moved to the predetermined location (e.g., rear for delivery). Moreover, in yet other examples, the packages may be loaded onto the CSUs based on a predetermined path/route, and the instruction may be to bring CSUs in a particular order to the predetermined location. Although certain examples for the instruction are provided above, the instruction may be any suitable manual or automated instruction, and the description of particular examples is not intended to be limiting.

In the embodiments depicted in the Figures, the in-vehicle conveyor system 100 may be, in some embodiments, mounted to walls 105, ceilings 106, or the floor 107 of the vehicle 104. In certain examples, the rails 300 are mounted in a suitable manner (i.e., to the walls 105, ceilings 106, or floor 107) to form an overhead system to move the CSUs 200 around the cargo space 102, defining a circuit 310 based on the travel path of the CSUs about the vehicle cargo space 102. The CSUs 200 are securable or removably securable to the rails 300 via any suitable mechanism, examples of which will be described with reference to FIGS. 16-20B below.

Figure 2A:
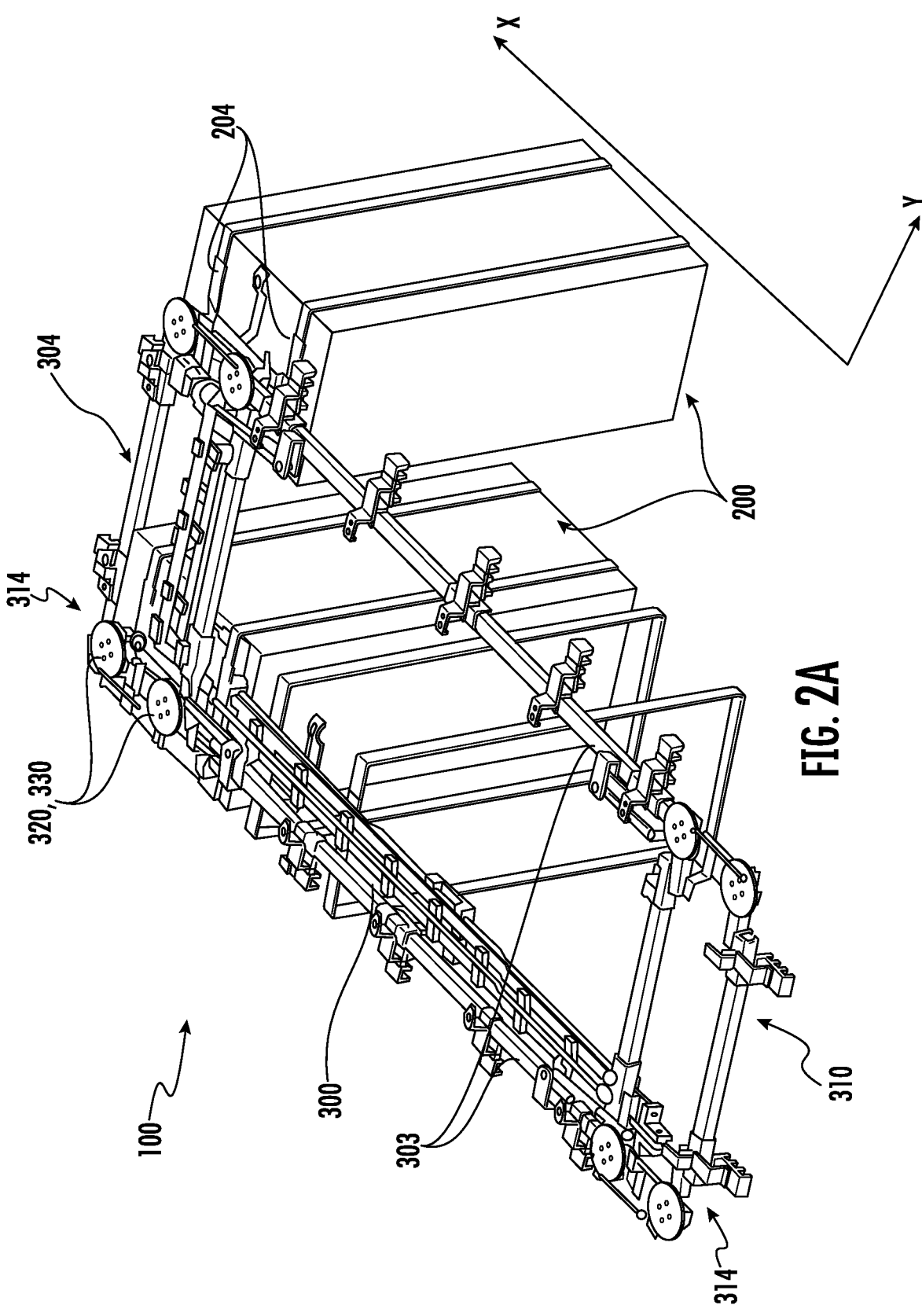
FIG. 2A is a perspective view of an in-vehicle cargo storage unit conveyor system, according to one or more embodiments, with some CSU's removed.
Figure 2B:
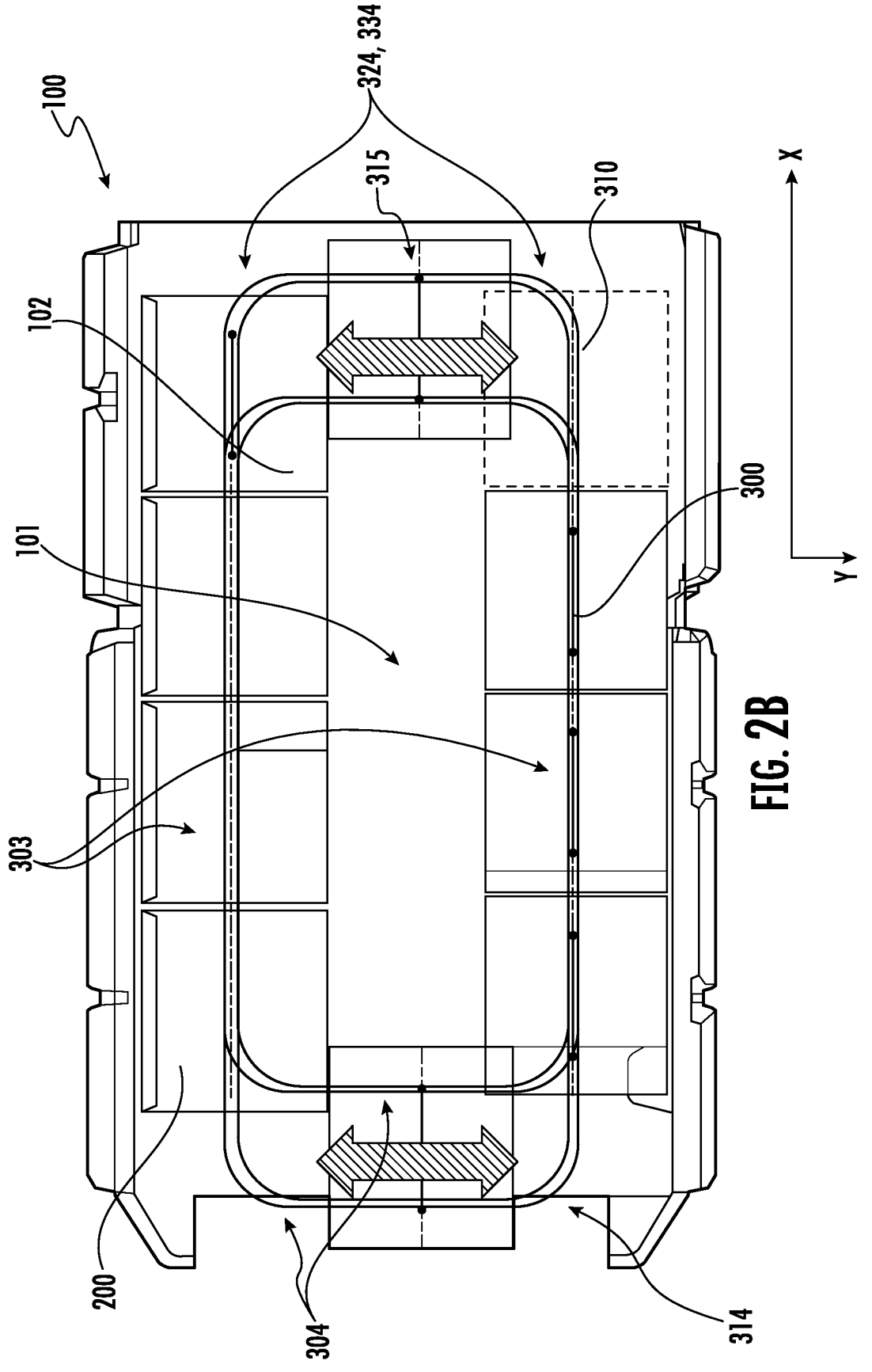
FIG. 2B is a top view diagram of the in-vehicle cargo storage unit conveyor system according to one or more embodiments.
Figure 3A:
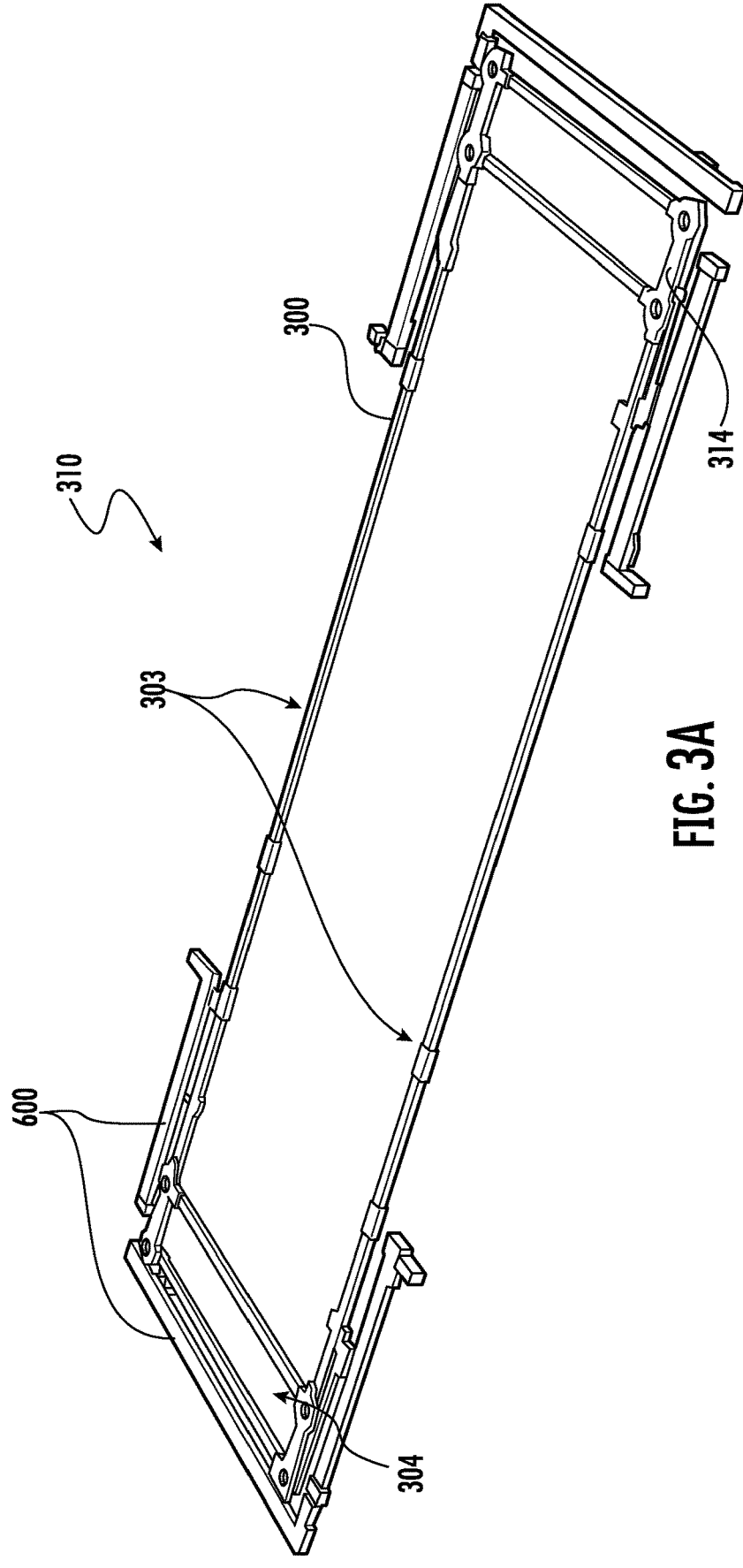
FIG. 3A is a schematic diagram of the in-vehicle cargo storage unit conveyor system according to one or more embodiments.
Figure 3B:
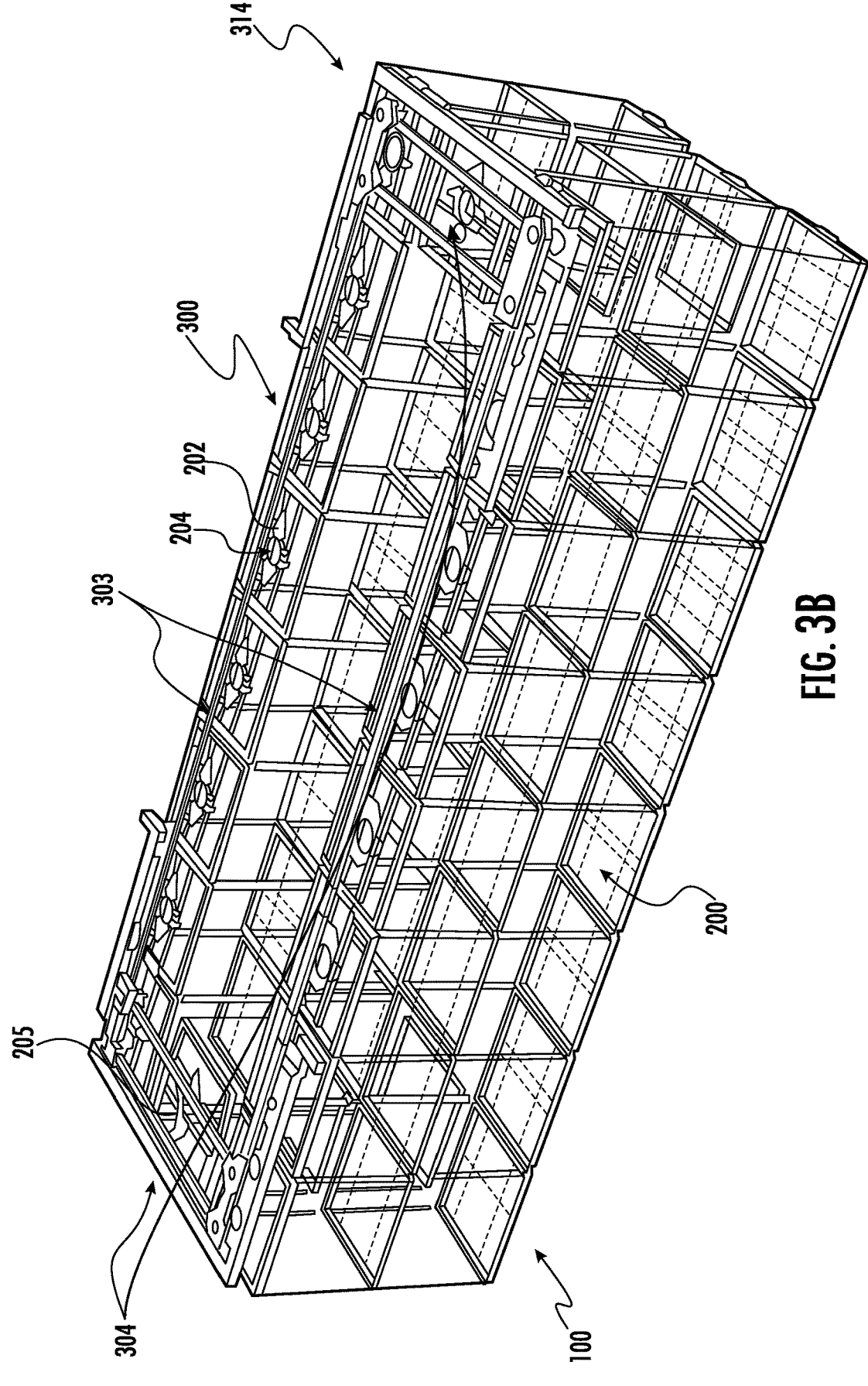
FIG. 3B is a schematic diagram of the in-vehicle cargo storage unit conveyor system of FIG. 3A, with cargo storage units thereon.

The rails 300 may include one or more rails which form various rail configurations and combinations of rail configurations to move the CSU's 200 along the circuit 310 and optimize cargo capacity and movement based on the travel path of the CSUs on the circuit 310 as based on the rail configurations. In FIGS. 1, 2A-B, the rails 300 are in generally a racetrack type configuration forming a generally rectangular circuit 310 around the cargo space 102. In other examples, as shown in FIGS. 22A-M, the rails 300 may include a center rail 301 in the forward/aft direction of the vehicle 104, with lateral rails 304 extending from the center rail 301 on either side of the center rail 301, defining L-shaped circuits 310 for CSUs 200 to move along. The rails 300 may mono-rail tracks 302 or dual rail tracks 305. Although mono-rail tracks 302 and dual rail tracks 305 are shown in the various Figures, this is not intended to be limiting, and any suitable number of rails may be used to form the rails 300 for moving the CSUs 200. The rails 300 may include combinations of forward/aft rails 303 and lateral rails 304, which cooperate to move the CSUs 200 in the forward/aft direction and the lateral direction, respectively. In order to change direction of movement in the cargo space 102, the rails 300 may include corner portions 314 that include mechanisms for changing direction of movement of the CSUs 200 within the circuit 310 (e.g., corner turnstiles, corner radii, square corner radii, or other suitable mechanism). The change in direction may be from rails in a forward/aft direction to a lateral direction, or vice versa. Various embodiments and details of rails 300 will be described with reference to FIGS. 4-21J, with examples of arrangements of rails 300, corner portions 314, among other details such as drive mechanisms for the CSUs 200.

As depicted based on the example cargo space 102 shown in FIGS. 1 and 2A-B, the rails 300 include corner turnstiles 320, 330 (or interchangeably, turnstiles 320, 330) at the corner portions 314 at the front and rear of the in-vehicle conveyor system 100 towards the front and rear of the cargo space 102 (as defined along axis X), on either side (in the Y-direction) of the cargo space 102. The corner turnstiles 320, 330 form the corner portions 314 which allow change in direction of movement of the CSUs 200. In certain embodiments, the corner turnstiles may align channels of the rails for the travel of the CSU to be altered from a first direction (e.g., fore/aft) to a second direction (e.g., lateral). In other embodiments, the corner turnstiles may be cooperating rotatable plates that allow for gradual directional change over a length (see FIG. 4, 5A-B). Furthermore, although described as corner turnstiles, or turnstiles, the spirit of the component may be placed at other locations (i.e., not at corners) or at other corners as based on the rail design, as will be discussed in further detail with reference to FIGS. 22C-H. However, in various embodiments, the corner turnstile may be discussed for direction of travel transfer, and in other embodiments, rotation of the CSU, as based on the embodiment described. Furthermore, in various embodiments, although certain numbers of corner turnstiles 320 are shown, any number is contemplated as based on the rail configuration (i.e., number of lateral rails or split loop rails and/or the size of the cargo space when being incorporated for direction of travel transfer). In the schematic diagram of FIG. 2B, the rails 300 include corner radii 324, 334 at the corner portions 314 to allow change in direction of movement the CSUs 200. Other mechanisms may be provided at the corner portions 314 to facilitate movement of the CSUs 200, as well as provide a directional change on the circuit 310, and depiction of turnstiles 320, 330 and corner radii 324, 334 are not intended to be limiting. The corner portions 314 may cooperate with rotaries 322, 332 (see FIGS. 19A-B) disposed along the rails 300 to facilitate rotation of the CSUs 200. The rotation change may occur upon a change in direction of movement, or may be along the length of a rail. The rotaries 322, 332 may initiate the rotation of the CSU, or the CSUs may include other swivel mechanisms 205, as will be described in further detail below, in order to rotate the CSU relative to the rails 300 or that cooperate with the rotaries in order to swivel the CSU. Further examples are provided in FIGS. 19A-D; 20A, and will be described in further detail below. The rotaries 322, 332 may be incorporated at the corner portions 314 or may be disposed along the rails 300 in order to provide a location for rotation of the CSU 200 based on the desired rotation locations of the system. As referenced herein, the corner turnstiles 320, 330 are utilized as components to transfer the CSUs 200 from a fore/aft rail to a lateral rail, and vice versa, in various embodiments, while the rotaries 322, 332 are utilized as components to swivel or rotate the CSUs 200 relative to the rails, and may be disposed at any suitable location along the rails 300, including, but not limited to, the lateral rails (as shown in the Figures). The system 100 may include any combination of rotaries (or features that can rotate the CSU relative to the rails) and corner turnstiles as required to facilitate cargo movement and access as based on the rail design within the cargo space, and depiction of particular embodiments is not intended to be limiting.

The corner portions 314 may be positioned in other areas along the rails 300 as based on the circuit 310 design within the cargo space 102, and the desired access points corresponding to predetermined location(s) 315 along the circuit 310 for the CSUs 200. As shown in the Figures provided, the predetermined location 315 for where a specified CSU 250 is guided to along the circuit 310 may be desired at the rear (as defined along axis X) of the cargo space 102, or the front of the cargo space, and as such, corner turnstiles 320, 330 are provided to change direction of travel of the CSUs 200 in order for the specified CSU 250 to reach the predetermined location 315. Although described generally as a specified CSU 250, the specified CSU 250 may be any selected CSU as based on driver or system selection. For example, the specified CSU 250 may be one that is required by the driver (e.g., based on the packages loaded thereon), or more generally be a CSU that is designated to be moved either by the system or the driver (e.g., a CSU that needs to be moved out of the way to another location for another to reach the driver). The corner portions 314, such as turnstiles 320, 330 shown in FIG. 2A, may include any suitable features for translating the CSUs 200 from one side of the cargo space 102 to the other, in the Y-direction. For example, the CSU 200 may be rotated about its vertical axis as it is translating in the Y-direction (i.e., laterally in the cargo space 102) of the circuit 310 by the rotary 322 which engages the swivel mechanism 205 (see FIGS. 17A-B; 18B; 19B-C) to rotate the CSU 200 to facilitate a predetermined orientation of the CSU or facilitate a Y-direction translation of the CSU along the circuit 310. Thus, the rotary 322 operates to turn the CSU 200 as it is translated across the lateral section 312 of the circuit 310 that the CSU 200 moves in the Y-direction.

Further examples of the rail configurations will be provided with reference to FIGS. 16-20B below, and include suitable arrangements with various corner portions 314 as based on the circuit 310 design and rail 300 configuration.

In the examples shown in FIG. 6B and FIGS. 17A-20B, the CSUs 200 may be secured or removably secured via mount 204 and/or trolleys 202 to the rails 300 that hang or otherwise suspend the CSU 200 from the rails. Although the Figures show a mount 204 on the top of the CSU 200 to the rails 300, such that the CSU hangs above the cargo floor 101, this is not intended to be limiting, and the trolleys 202 may be mounted to any suitable surface of the CSU 200 with a mount 204 to allow the CSU 200 to move along the circuit 310 and relative to the rails 300. For example, when mounted on the bottom of the CSU 200, the trolley 202 may sit on the rails 300 and provides a surface to raise the CSU from the cargo floor 101 for movement along the rails 300. In other examples, the trolley 200 may be mounted to a mount 204 on a side of the CSU 200 to suspend the CSU 200 above the cargo floor 101. As such, the mount 204 and/or the trolley 202 may secure, or may removably secure, the CSU 200 to the rails 300 for movement along the rails 300, and any examples depicting a hanging CSU is not intended to be limiting. Furthermore, although shown as separate components mount 204 and trolley 202, the components may be integrated such that the trolley 202 and mount 204 are one component or part of a single component that secures the CSU 200 to the rails 300, and depiction of a mount 204 for securing a trolley 202 is not intended to be limiting. Additionally, as shown in the various embodiments and will be discussed in further detail below, the mount 204 and trolleys 202 may independently or together further cooperate with a swivel mechanism 205 to allow relative movement and/or rotation of the CSU 200 with respect to the rails 300.

Figure 4:
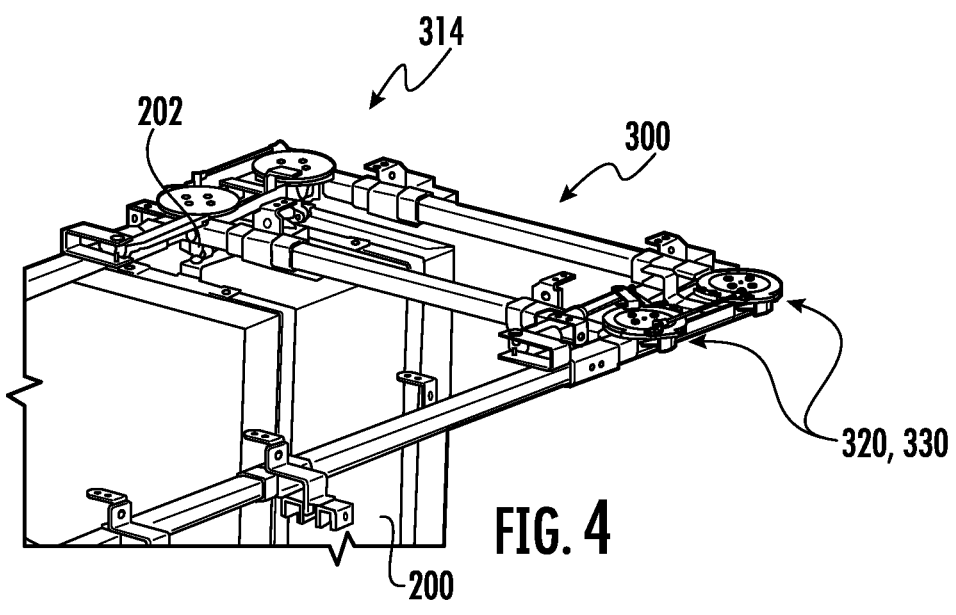
FIG. 4 is a close-up view of the corner turnstiles of FIG. 3A-B with the CSU's removed.
Figure 5A:
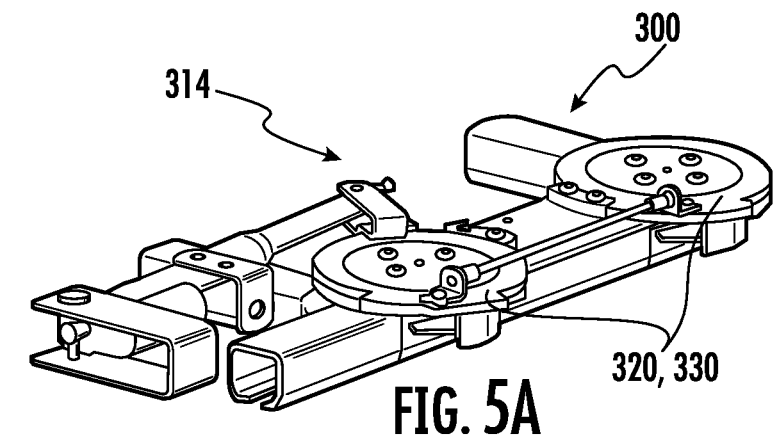
FIGS. 5A-B are close-up top and bottom perspective views, respectively, of the corner turnstiles of FIG. 4.
Figure 5B:
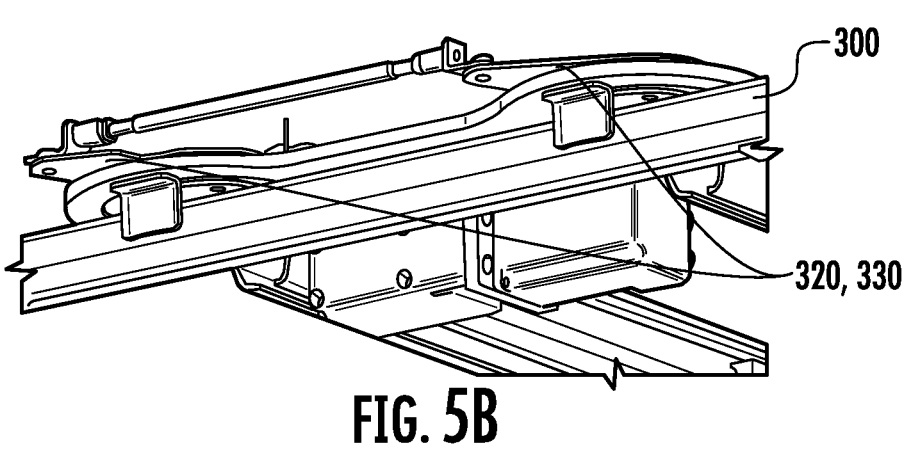

The mount 204 may be any suitable mechanism for attaching, or in some examples, removably attaching, each CSU 200 to the rails 300 and/or the trolleys 202 and allowing movement of the CSUs 200 along the rails 300 via the trolleys 202, and may allow rotation of the CSU 200 relative to a vertical axis. The mount 204 may be secured to one or more cross-members 203 extending across the top of the CSU 200. Although shown as a cross-members 203 spanning across the top of the CSU 200, any other member for the mount to secure the mount 204 to the trolley 202 is also contemplated, as well as embodiments where the mount 204 may be incorporated or integrated with the members or cross-members 203. Various non-limiting examples of the mounts 204 to secure the CSU 200 include frames for receiving the CSU 200 therein as shown in FIG. 2A or 4, or may include a hook, a ball joint (see the examples of FIGS. 16A-D), a gear and barrel, cooperating wheels, or plates to secure the mount 204 to the trolley 202 and/or swivel mechanism 205, or in other examples, may be combinations of the various mechanisms described herein. For example, in the example shown in FIGS. 16A-D, the mount 204 includes a lock plate on top of the CSU that engages a ball which allows movement along the rails 300, and may further allow or facilitate rotation of the trolley 202 relative to the rails 300 when changing direction of travel. As such, the CSU 200 may not rotate, as based on being mounted via the ball, when the CSU 200 changes the direction of travel on the rails (i.e., for the examples shown in FIGS. 16A-D, the CSU remains stationary along the vertical axis of rotation, and a channeled section of the trolley 202 turns with the turnstiles 320, 330 to align with another set of rails 300 to change direction of transfer).

The trolley 202 may include any suitable feature in order to slide along the rails 300, including but not limited to, wheels, bearings, or a frictional slide on the rails 300. Other trolleys 202 and features of various trolleys 202 will be described with reference to FIGS. 17A-20B. For example, the trolley 202 may include a rotational ball joint 209 on the trolley 202, or in other embodiments, may include the rotational ball joint on the mount 204, to allow the trolley 202 to rotate relative to the CSU (i.e., for transfer between directions of travel). Each CSU 200 may be secured to the rails 300 by one or more trolleys 202, and depiction of one or two trolleys 202 per CSU 200 is not intended to be limiting. As such, the CSU 200 may be secured to the rail via a single trolley 202 in some embodiments, and dual trollies 202 in other embodiments, and may further include additional trollies 202. In various embodiments, the number of trolleys 202 per CSU 200 may be dependent on the number of rails 300 for the configuration (i.e., a monorail 302 or dual rail 305 track).

In certain embodiments, each CSU 200 may be independently rotatable about a vertical axis (i.e., defined along a height of the CSU 200) and with respect to the rails 300. The rotation may be allowed by the mount 204, or by, and in combination with, the trolley 202 and/or swivel mechanism 205. As such, the swivel mechanism 205 may result in the CSU 200 to swivel, and in some embodiments, the trolley, mount, or part of the mount, to rotate, and discussion of particular embodiments is not intended to be limiting. In embodiments with one trolley 202, the vertical axis may generally be at the center of the CSU 200, while in embodiments with two or more trolleys 202, the trolleys 202 may cooperate to allow rotation about the vertical axis defined at the center of the CSU 200. As such, each trolley 202 may cooperate with a swivel mechanism 205 to allow the individual CSU 200 to rotate about the vertical axis, and relative to the rails 300. In certain embodiments, the corner turnstiles 320, 330 may allow rotation of the trolley 202 while the CSU remains at the same orientation, such that the swivel mechanism 205 operates at a different location along the circuit 310, and examples of CSU rotation is not intended to be limiting. The swivel mechanism 205 may be any suitable mechanism, as shown and described in the various examples provided in the Figures, such as, but not limited to a turnstile, Igus bearing, ball joint, lazy susan, or other bearing system to allow the CSU to rotate about a vertical axis. The swivel mechanism 205 may be manually driven or power driven. In examples where the swivel mechanism 205 is power driven, the power drive may be via a rack and pinion, a spoke pin drive, a manual sprocket/rack, a cam and swivel, or a manual or powered lazy susan mechanism. In other embodiments, the swivel mechanism 205 may be driven by a linear actuator. In various examples, the swivel mechanism 205 may include a plate or rotational device defining detents or indentations for defining stop positions about the rotational travel of the CSU 200. For example, the detents or indentations may be spaced at 90 degree intervals around the plate, or in other examples, at 45 degree intervals. Any suitable number of detents and indentations may be used based on the stop positions desired for each CSU 200. The stop positions may allow the driver to access the contents of the CSU 200 more easily, as the CSUs 200 may be stored in a way along the walls inhibiting access (i.e., the open side(s) of the CSUs 200 may be blocked), and upon movement to the front or rear of the vehicle as desired based on the predetermined location, the swivel mechanism 205 allows the driver to rotate the CSU 200 to the desired stop position in order to access the contents more easily. In other embodiments, the swivel mechanism 205 may be activated by a controller (not shown) that can rotate the CSU 200 as based on an instruction (that may be a manual or automated instruction).

Generally, the mount 204, the swivel mechanism 205, and the trolley 202 may be integrated or separate components, and in various embodiments, each may or may not be directly connected with the CSU or be utilized. As such, in some embodiments, a swivel mechanism 205 may be omitted, and only the mount 204 and the trolleys 202 are incorporated (e.g., where the corner turnstile is used for transfer and rotation). In other embodiments, the trolley 202 may be mounted to the CSU separately from the swivel mechanism and/or the mount, and vice versa. As such, depiction of certain embodiments is not intended to be limiting, and the trolley, mount and swivel mechanisms may cooperate or be integrated together in various embodiments but may also be independent as described herein.

Figure 15A:
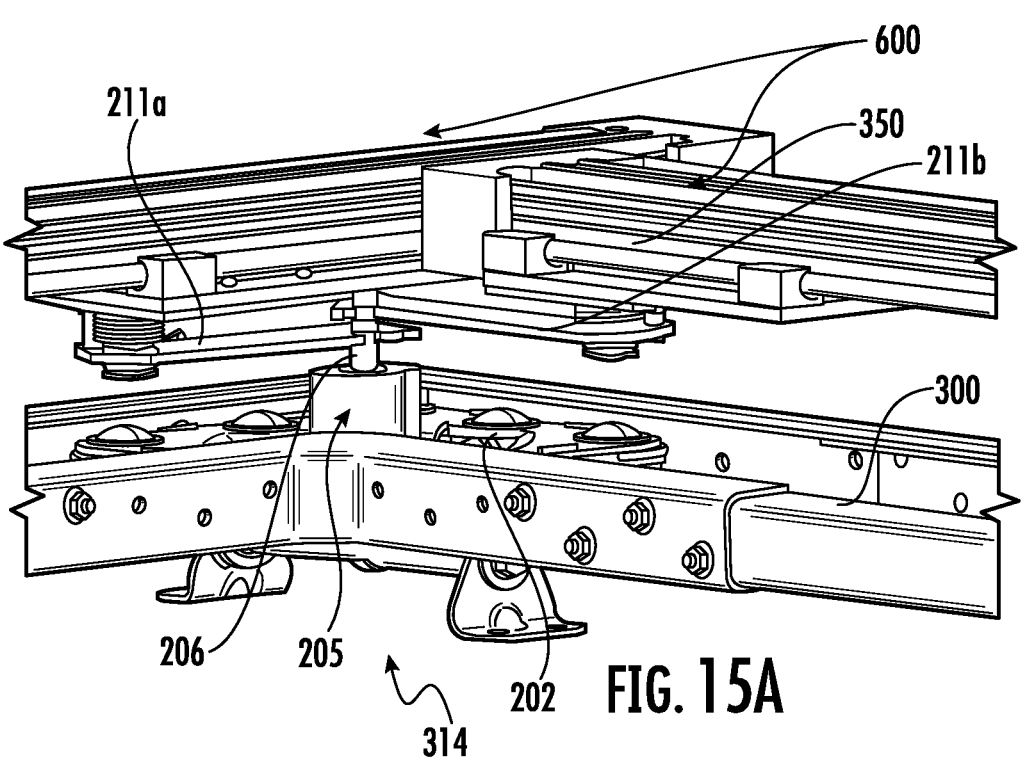
FIG. 15A is a perspective view of a corner portion cooperating with a drive system, according to one or more embodiments.
Figure 15B:
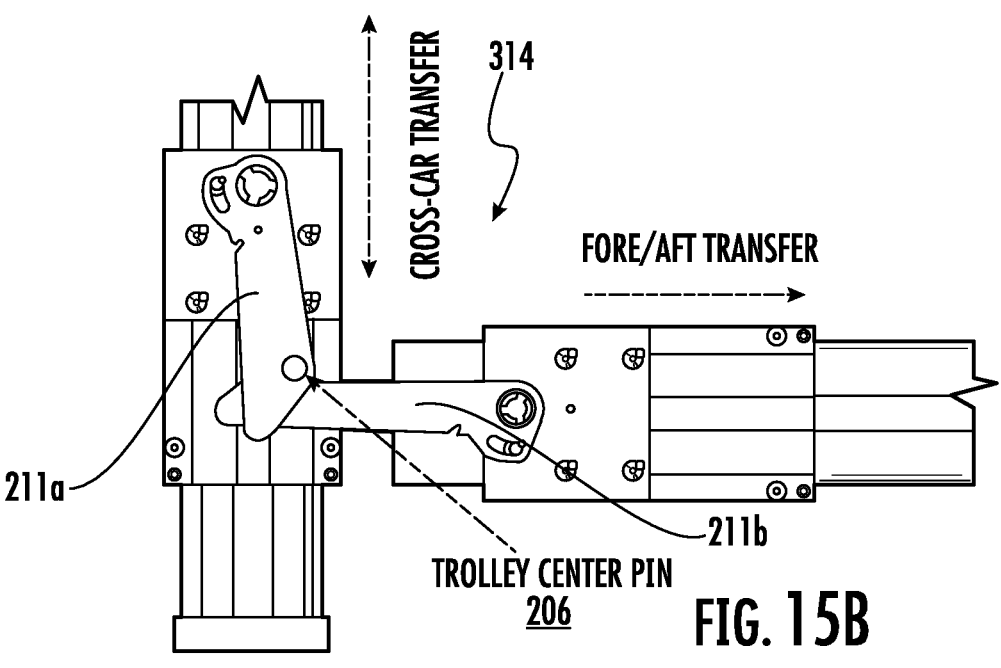
FIG. 15B is a top partial view of the drive system of FIG. 15A.
Figures 16A, 16B, 16C, 16D:
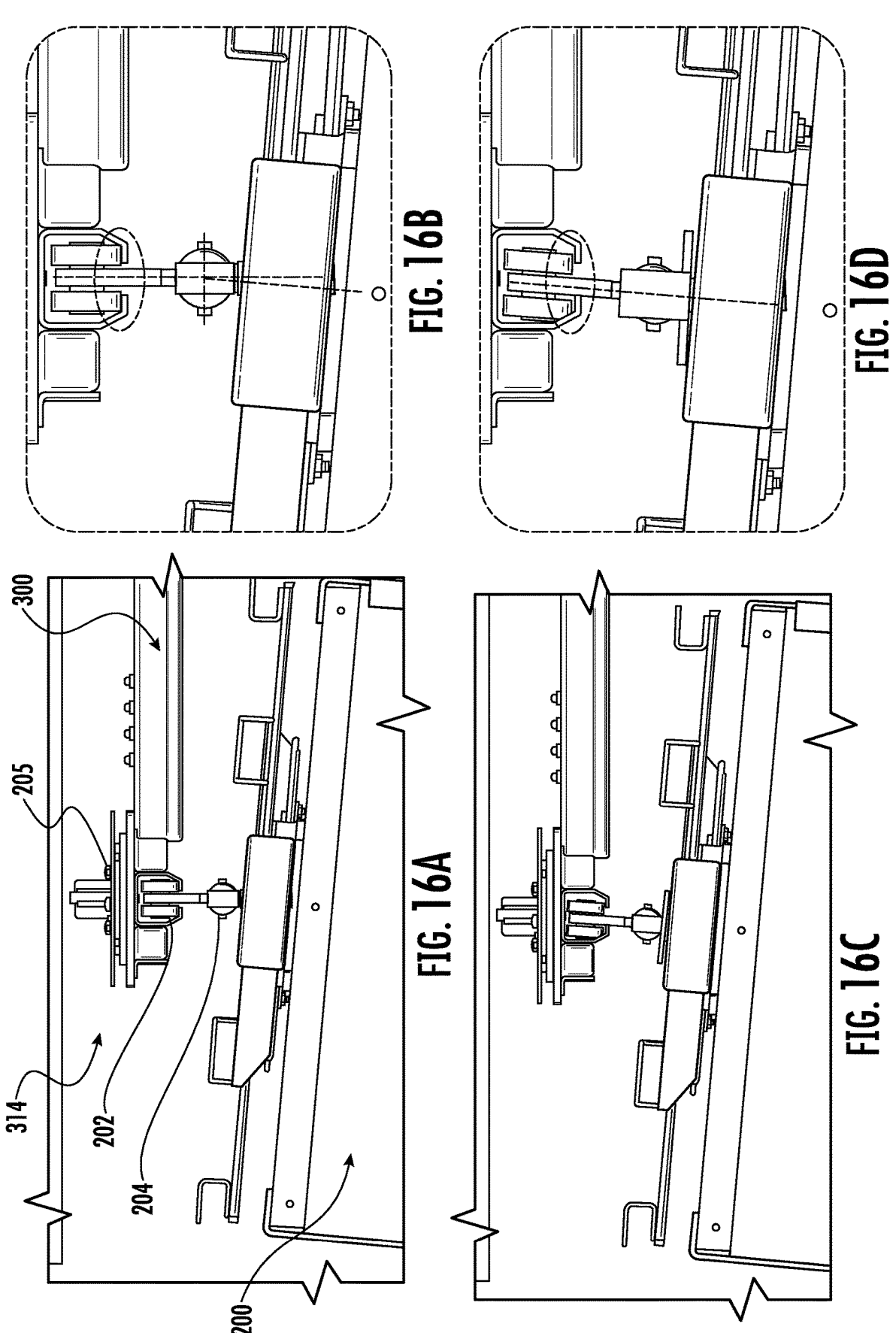
FIGS. 16A-D are side-view diagrams of corner portions and mounts for the CSU, according to various embodiments.

In one or more examples, as shown in FIGS. 15A-20B, each trolley 202, also referred to interchangeably as rail connector 202, may include a motor and gear mechanism for the swivel mechanism 205 for allowing rotation of the CSU 200 relative to the rails 300. The motor and gear mechanism may be any suitable mechanism allowing rotation, such as, but not limited to a stepper motor, a back drive motor, a worm and ring gear, a planetary gear set, combinations of motor and gear types, or other suitable gear set for rotating the CSU 200. Furthermore, although discussed throughout as a motor, any actuator may be contemplated, such as a pneumatic or hydraulic device. Each rail connector or trolley 202 and swivel mechanism 205 may also include a gear portion or a rack portion of a rack and pinion gear set. Furthermore, in various examples, and as shown in FIG. 15A, each rail connector or trolley 202 may include a center pin 206 having a first position corresponding to a first direction of movement of the CSU 200 along the circuit 310, and a second position corresponding to a second direction of movement of the CSU 200 along the circuit 310, with the center pin 206 being movable between the first and second positions in which the center pin 206 can latch (e.g., by engaging a hook 211a,b, corresponding to the direction of travel, that are positioned above or, in other embodiments, below the rails 300, at the corner portions 314). In various embodiments, the first and second directions of movement may be opposite directions, orthogonal directions to each other, or otherwise at an angle to each other. The directions may be based on the circuit 310, as well as the rail configuration 300 (i.e., the presence of lateral and forward/aft legs of the rails 300). Further details of trolleys or rail connectors 202 will be described below with reference to FIGS. 15A-20B.

The CSUs 200 and rails 300 of the conveyor system 100 cooperate to allow powered (e.g., motor, pneumatic, or hydraulic) and/or manual movement of the packages within the cargo space 102 along the circuit 310, and further may include organizational features and data controls to allow for packages to be deposited in a specific CSU 200 (e.g., via package scanning), which may be then taken by the conveyor system 100 to a predetermined location 315 when instructed (either automatically based on external data (e.g., logistical delivery information) or a predetermined path or route of delivery, or manually by driver command) such that the CSU 200 is moved for access to the package at the predetermined location 315. Further detail for recall of packages, other mechanisms of the system, variations of the previously discussed embodiments, and the movement of CSUs within the system will be described with reference to FIGS. 21A-J below, showing sequential movement and operation of various examples of the in-vehicle conveyor system 100.

With reference again to FIGS. 6-9, the CSUs 200 are structures that generally hold cargo, such as packages, and retain the packages within the cargo space 102 during movement of the CSUs 200 about the cargo space 102. Each CSU 200 may have a similar configuration or construction, or may be different configurations or constructions as desired for the cargo space 102 or based on the packages to be delivered. Thus, each CSU 200 may independently have any suitable configuration and construction, and may include additional features such as electronics, indicator lights, etc. to facilitate identification of CSUs and packages on the CSUs. Some non-limiting examples of the CSU configuration and construction is provided with reference to FIGS. 6-9.

With reference to FIGS. 6-9, examples of suitable CSUs 200 constructions with various configurations are provided. Furthermore, each CSU 200 may have a different arrangement, material, configuration, and all the CSUs need not have the same configuration, and description of any particular arrangement is not intended to preclude another arrangement, material, or configuration of a CSU to be incorporated with a different arrangement, material, or configuration of CSU. In some embodiments, the CSU is made of steel and is welded to form a complete and fixed assembly (see FIG. 6B). In other embodiments, for example, the CSUs may have a more flexible construction to allow for customization and variation between CSUs or allow for foldability of the CSU when detached from the rails 300. For example, some CSUs 200 may have a trim box shell 220 with multiple shelves providing cargo areas of different sizes and volumes, while another example CSU 200 has a tote bag construction 210. As such, uniform CSUs as shown in FIGS. 1-2 is not intended to be limiting, and combinations may be used as based on the packages and cargo to be loaded in order to optimize efficient loading of the vehicle.

Generally, each CSU has a body 207 that may form, in certain examples, either a trim box shell 220 or a tote bag construction 210. The body 207 may be formed of a cargo net material, a modular lightweight load-carrying equipment material (MOLLE), welded steel, metal frames, or a fabric, vinyl, leather, or other suitable webbed or woven textile, or combinations thereof. The CSU body 207 may be foldable when detached, be soft such that the CSU loses its shape when detached from the rails 300, or be rigid such that the CSU 200 holds shape when removed from the rails 300. The body 207 defines a cavity 208 for receiving packages therein, and may include a mount (i.e., a trolley 202 or other mechanical connection) for attaching or removable attaching the body 207 to rails 300 of an in-vehicle conveyor system 100. The body 207 may have any suitable size as based on the desired CSU 200 volume in the cargo space 102. Furthermore, each CSU 200 may include one or more bodies 207 to form each individual CSU, and may be attached to each other such that one CSU 200 can be secure with the rails 300 to control movement of all attached bodies 207. Each body 207 may have one or more shelves 209 within the cavity 208 in the body 207 that divides the cavity 208 and can support packages thereon. As shown in FIGS. 6-7, the CSU 200 may have a single shelf or a multi-shelf structure. In CSUs 200 having multiple shelves, the shelves may be uniformly spaced, or be unevenly spaced to form cargo storage areas with different sizes and volumes. The location of the shelves 209 may be customizable or adjustable such that the shelves 209 may be movable within the body 207, for example, to divide the cavity 208 based on the package size to be stored in the CSU 200. In examples where the shelves 209 may be removable, the body 207 of the CSU 200 may be foldable, collapsible, or otherwise detachable when the shelves 209 are removed (as shown in FIG. 7C), such that the CSU is constructed in a modular manner, and in some examples, with common tooling and parts. For example, the walls 217 of the body 207 may be separate pieces that connect in order to form the body 207 for receiving the shelves 209 therein. In other embodiments, the shelves 209 may be fixed in location. As such, each body 207 with shelves 209 may define multiple cavities 208 for receiving packages, and the cavities 208 may be of varying size as based on the spacing of the shelves 209. Generally, the CSU may include a plate as the mount 204 to attach the CSU to the trolleys, as shown in FIG. 7B. The mount 204, as previously discussed, may be any suitable construction, and be located on any suitable surface of the CSU, and depiction of a mount 204 on top of the CSU is not intended to be limiting. Furthermore, although shown as a stationary mount 204, features may be incorporated into the mount 204 or the connection with the trolley 202 and/or swivel mechanism 205 to allow the for the CSU 200 to rotate relative to a vertical axis of rotation, and depiction of a plate mount without rotatability features is not intended to be limiting. Further non-limiting examples of CSUs 200 will now be described in detail.

Figure 6A:
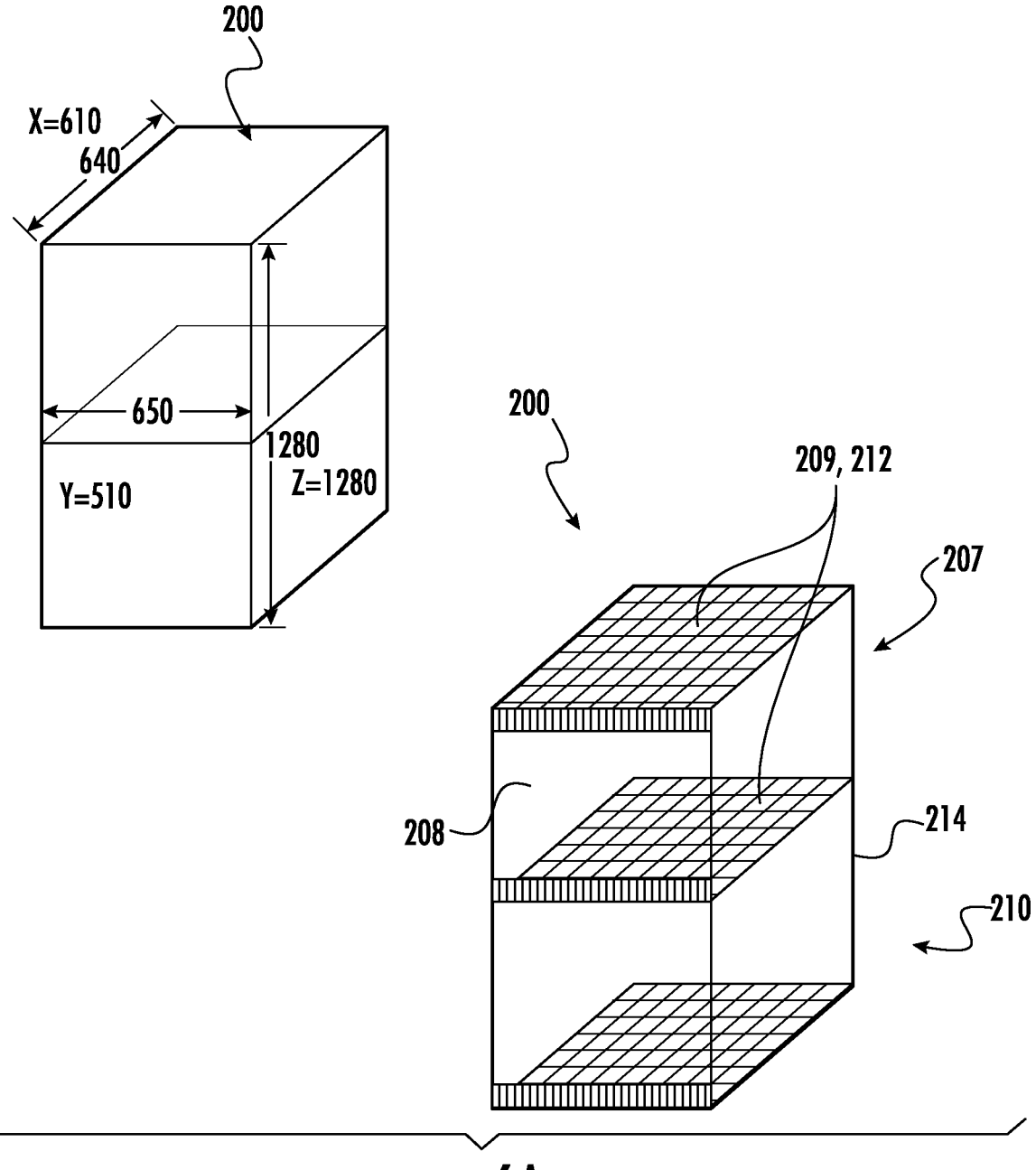
FIGS. 6A-B show diagrams of a CSU, according to one or more embodiments.

In the embodiment shown in FIG. 6A, the CSU 200 may have a body 207 with a tote bag construction 210 with shelves 209 formed of a belt/cargo strap or MOLLE material 212 that can be attached to a vertical wire frame 214 to form discrete tote shelves of the CSU 200. The vertical wire frame 214 may have any suitable number of openings to support the belt/cargo strap material 212 attached thereto to form each tote bag 210 for the conveyor system 100. In certain embodiments, the hooks of each belt/cargo strap material 212 can hook directly to the shelf 209 above or top unit, or in other embodiments, can hook to the wire frame based on the desired shelf height for each belt/cargo strap material 212 formed package cavity 208. The belt/cargo strap material forming the shelves and package cavities therein may be slidable on vertical corner straps or the vertical wire frame to allow for customized shelf height. Each bag tote construction 210 or each individual belt/cargo material shelf 212 may include an attachment (not shown) that can be used to hold the bag open or closed such that when a driver requires access to the packages stowed in the tote bag construction 210, the material forming the tote bag construction 210 may be held open. Although hooks are described in herein, any other clamp or fastener may be used with the tote bag construction in order to secure it to a trolley 202 for movement on the rails 300.

Figure 6B:
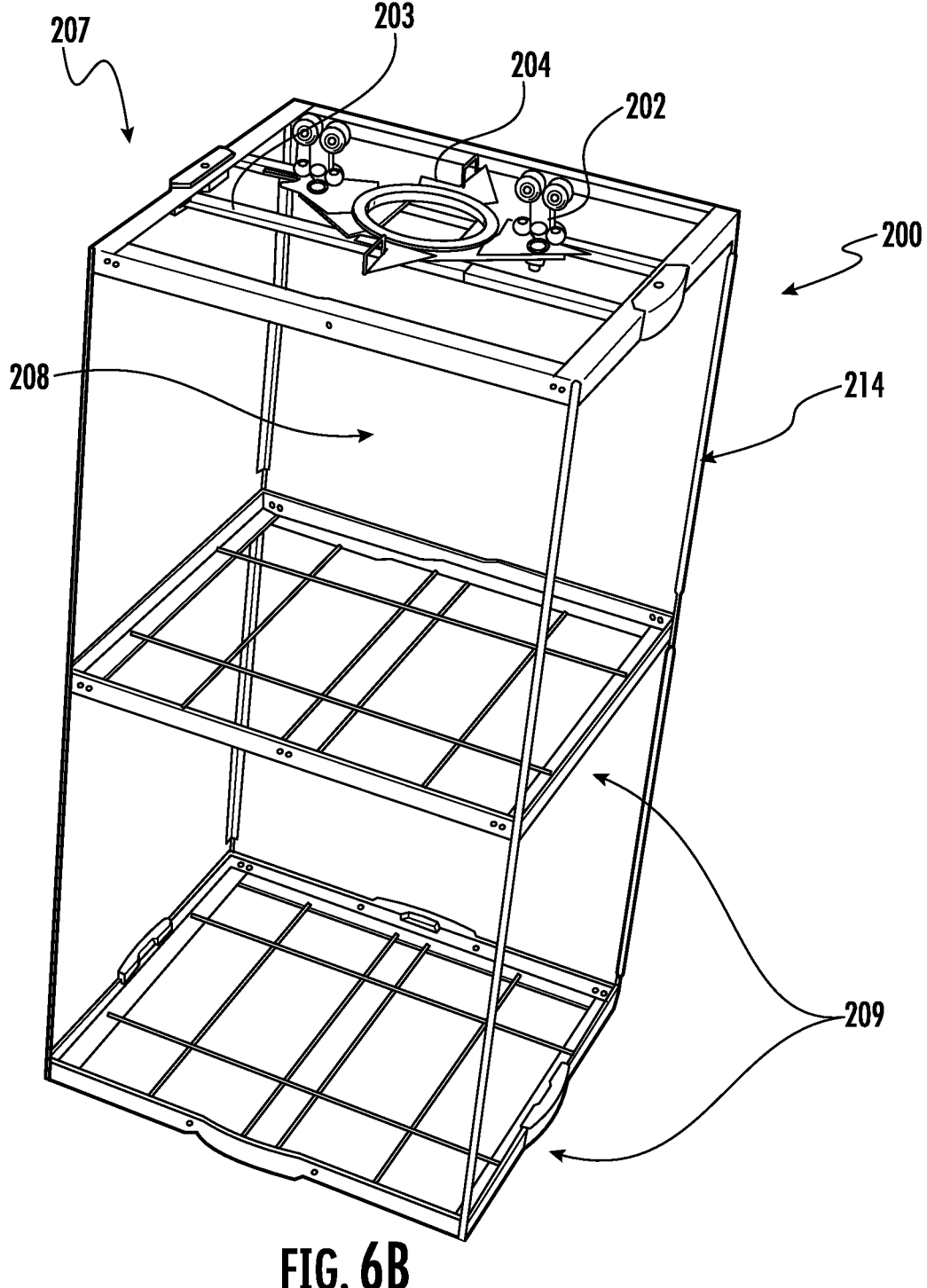

In the embodiment shown in FIG. 6B, the CSU 200 may have a body 207 constructed of a metal, plastic, or composite frame 214 with shelves 209 (e.g., metal, composite, wire, or plastic shelves) secured on the frame 214 to form package cavities 208. In the embodiment shown in FIG. 6B, the CSU 200 includes a mount 204 for securing the CSU 200 to the trolley 202 for movement on the rails. The mount 204 may be secured to cross rails 203, or to other parts of the CSU 200 (not shown).

Figure 7A:
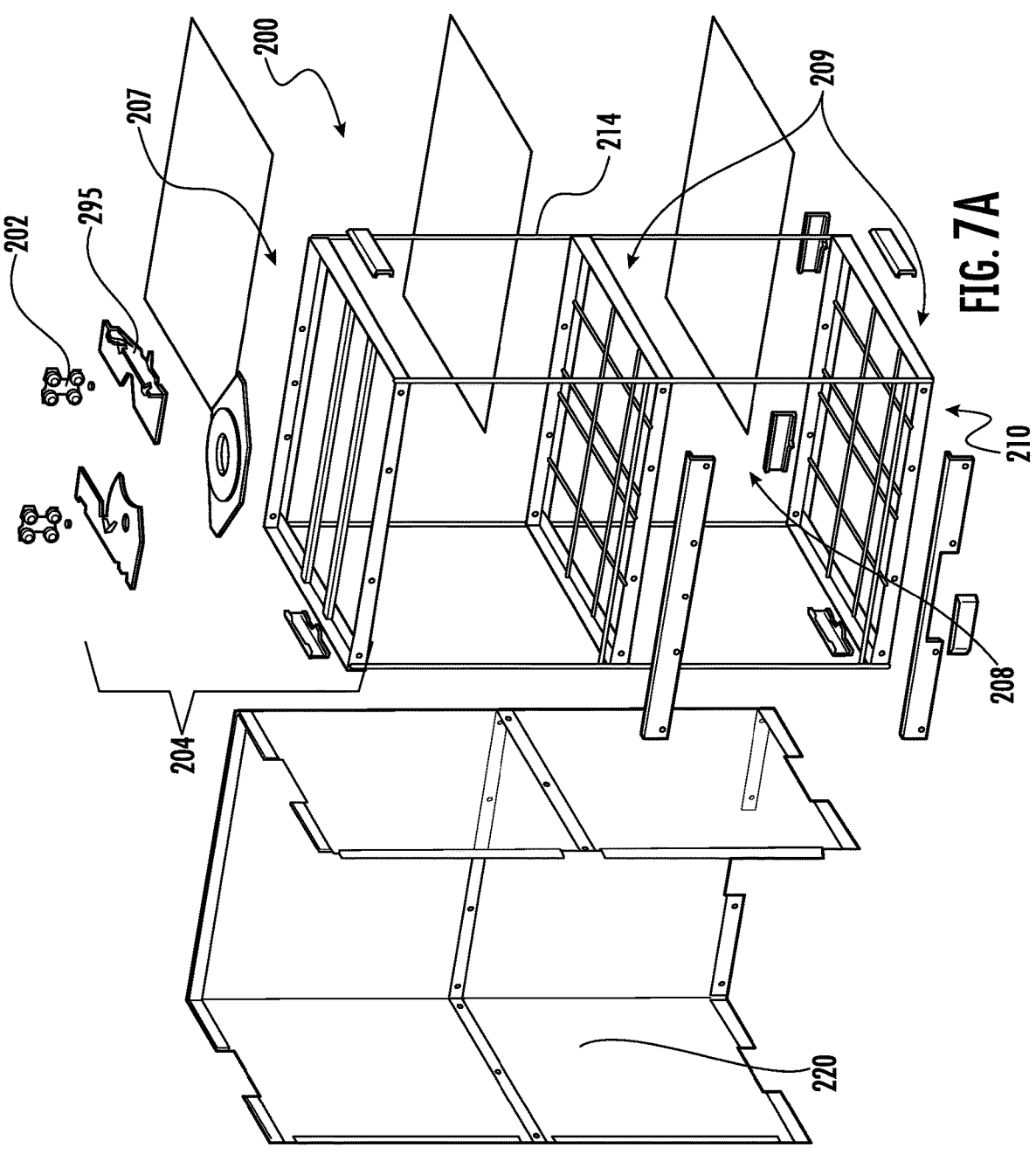
FIGS. 7A-C are exploded schematic diagrams of a CSU, according to various embodiments.
Figure 7B:
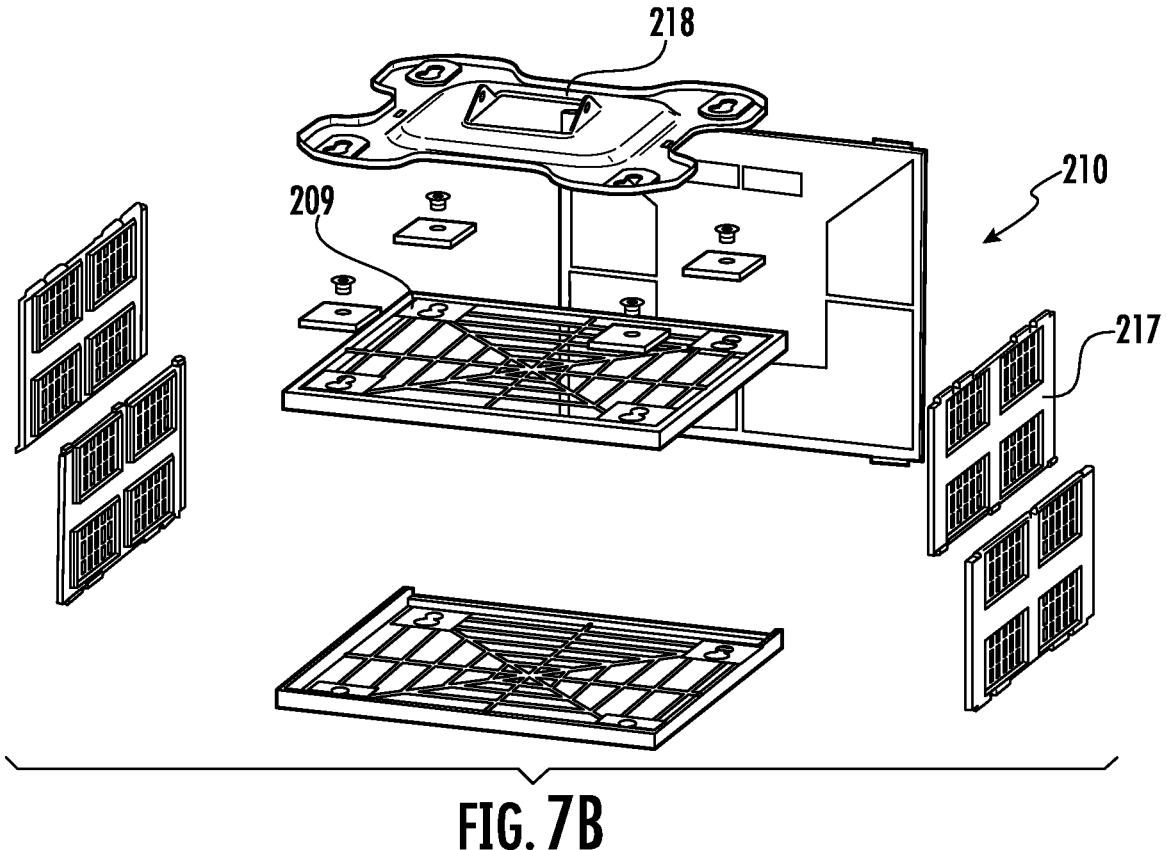
Figure 7C:
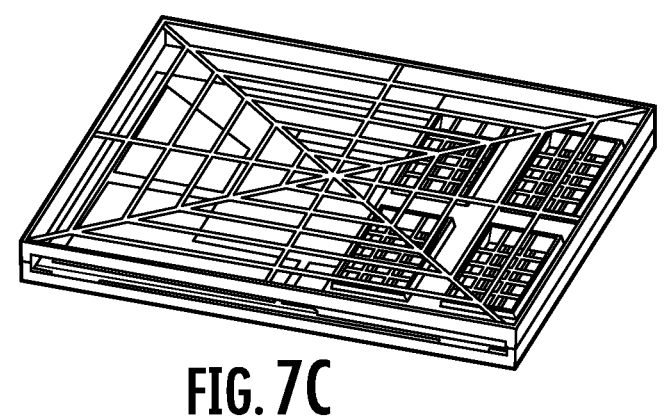

In another example, as shown in FIG. 7A, each CSU 200 may be constructed of a trim box shell 220 with rigid shelving 222 disposed therein to form a multi-shelf CSU 200. The trim box shell 220 may be any suitable material to form the CSU, such as a light weight but structurally supportive material for packages that does not add significant weight to the vehicle. For example, the trim box shell may be a plastic material, a metal construction, composite material, or be a trim material on a rigid (e.g., metal, plastic, or composite) frame. The trim material may be any suitable material such as, but not limited to, fabric, vinyl, leather, or other webbed or woven material. Although shown as a 3-sided structure (in order to provide driver access to cargo stored on the rigid shelving 222), the trim box shell 220 may be modified as having two opposing walls with the shelves supported therebetween. As such, the driver may have access from either side of the CSU 200. The sides of the trim box shell 220 may also be adjustable and/or removable and provide variable mounts for the shelving 222 such that spacing can be modified based on the package sizes to be stored in the CSU 200. The shelves may be mounted in any suitable manner, and may include any mounting features on the rigid frame or box shell 220 to secure the shelves 222 to the trim box shell 220 to support packages thereon. FIGS. 7B-C show the CSU 200 formed as a modular structure, with walls 217 cooperating with the shelves 209 to form the body 207. In FIG. 7C, the CSU is shown in the collapsed/ deconstructed state, which can be reassembled as needed, and stowed when not in use to simplify movement of the remaining CSUs.

Figure 8:
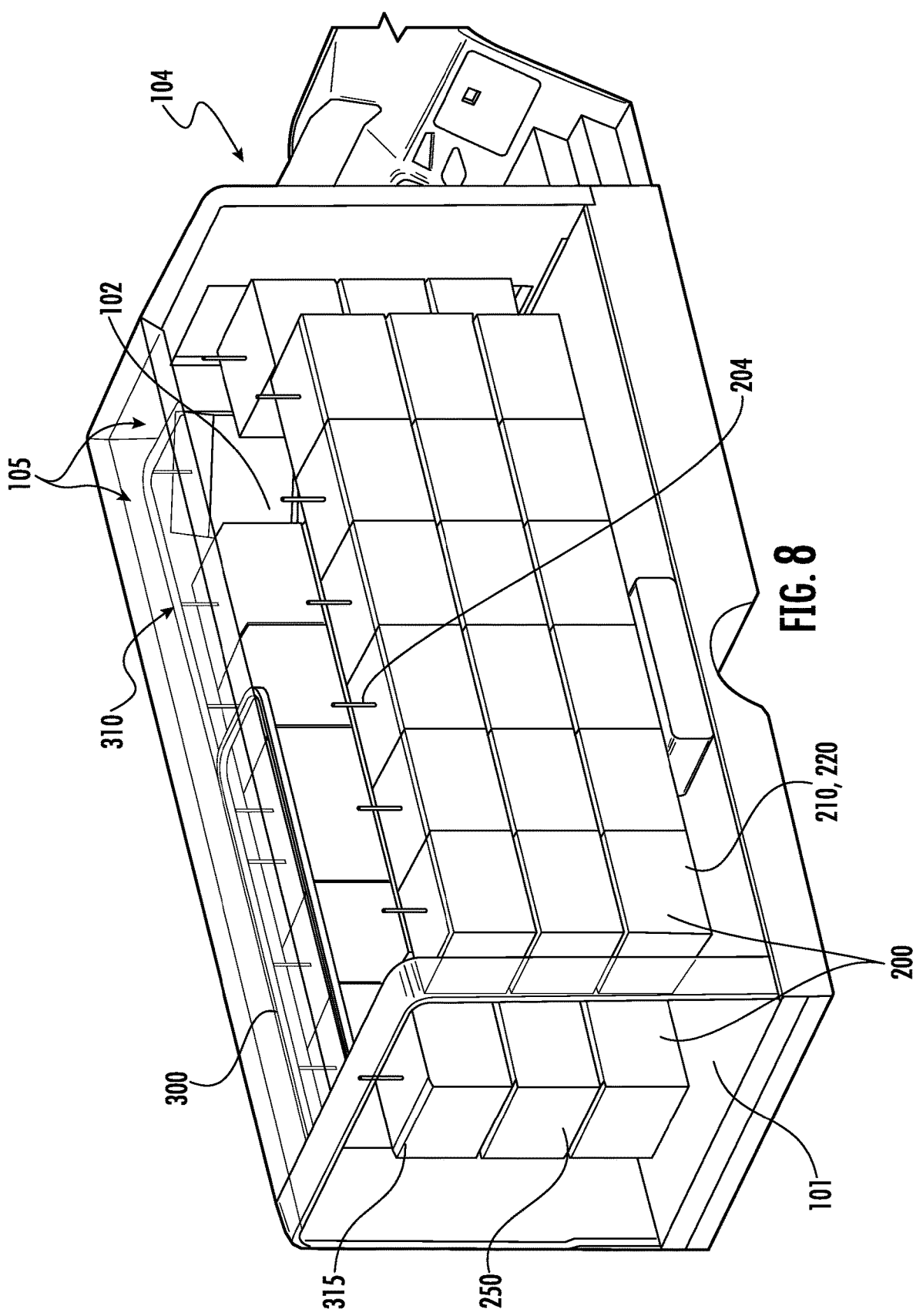
FIG. 8 is a perspective view of an in-vehicle cargo storage unit conveyor system in a vehicle, according to one or more embodiments.
Figure 9:
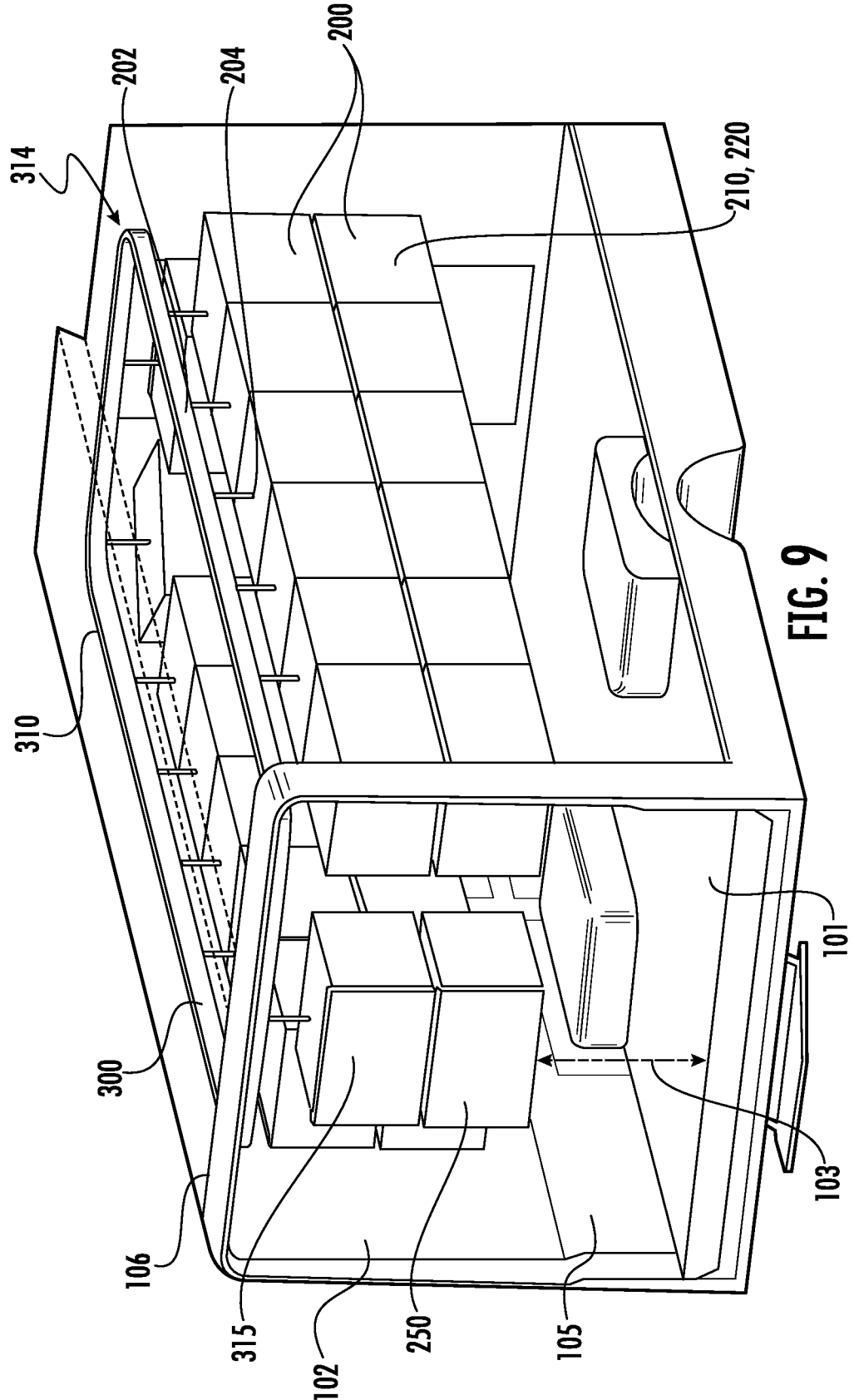
FIG. 9 is a perspective view of an in-vehicle cargo storage unit conveyor system in a vehicle, according to one or more embodiments.

In the examples shown in FIGS. 8-9, each CSU may have one or more bag totes 210 or trim box shells 220 to form the CSU, for example, as formed by the belt/cargo strap material that hang from the rails 300, and depiction of box-like individual totes is not intended to be limiting. As shown in FIG. 8, each CSU 200 may have three totes hanging from the rails 300 that would move together along the circuit 310 in the cargo space 102. In another example, as shown in FIG. 9, each CSU 200 may have two totes hanging from the rails 300 that would move together along the circuit 310 in the cargo space 102, leaving additional overflow cargo space 103 under each CSU for oversized cargo to be placed on the cargo floor 101. The additional overflow cargo space 103 may include the space between the bottom of a tote 210 and the floor 101. As such, the bag totes 210 may have one or more bags that form the CSU, and depiction of a single tote, two tote, or three tote construction is not intended to be limiting, and the totes may be constructed based on the desired shelving for the packages to be delivered in order to maximize space efficiency of the cargo space 102. Generally, there is clearance between the rails 300 and the top of the CSUs such that the storage space of the CSU 200 can be accessed by the driver without the rails interfering. In the configurations shown in FIGS. 8-9, the driver may be able to access the CSUs from the center of the vehicle cargo space. Similarly, the trim box shell 220 of FIG. 7 may be structured based on clearance below the bottom-most shelf to allow for oversized cargo to be placed thereunder on the cargo floor 101.

Although not shown in the Figures, in examples where the CSU is constructed as a bag tote 210, or where the box-shell 220 has removable shelving 222 and/or foldable, elastic, or collapsible wall structures, the CSU 200 may be a foldable or collapsible construction for when the CSU 200 is empty. In certain examples, the CSU 200 may include a modular construction for forming the box-shell 220 (see, e.g., FIGS. 7B-C). The CSUs 200 may be stored on the rails 300 in a collapsed state, or be removed from the rails 300 to be collapsed for storage. As such, as packages are emptied, the CSU 200 can be removed from the rails 300 and/or collapsed or folded to be stored to provide more space for the driver to reach other CSUs and move the CSUs around the cargo space 102. In further examples, the CSU may have detach-able or retractable vertical sides that can change the overall height of the CSU as based on the desired numbers of shelves on the CSU. In further embodiments, where the CSU has detachable or retractable vertical sides to vary the height of the CSU, the CSUs may be constructed of a certain height based on oversized cargo to be fit beneath the CSUs and the package volume to be secured on the CSUs for transport. As such, a customizable and optimizable cargo management solution is provided.

Although shown as generally box-shaped in FIGS. 1-9, the shape of the CSUs depicted is not intended to be limiting and other shapes for the CSUs is contemplated. For example, the CSU may be round, square shaped, or rectangular, and contain any suitable number of shelves with uniform or uneven spacing as based on the packages to be loaded on the CSU.

Figure 10:
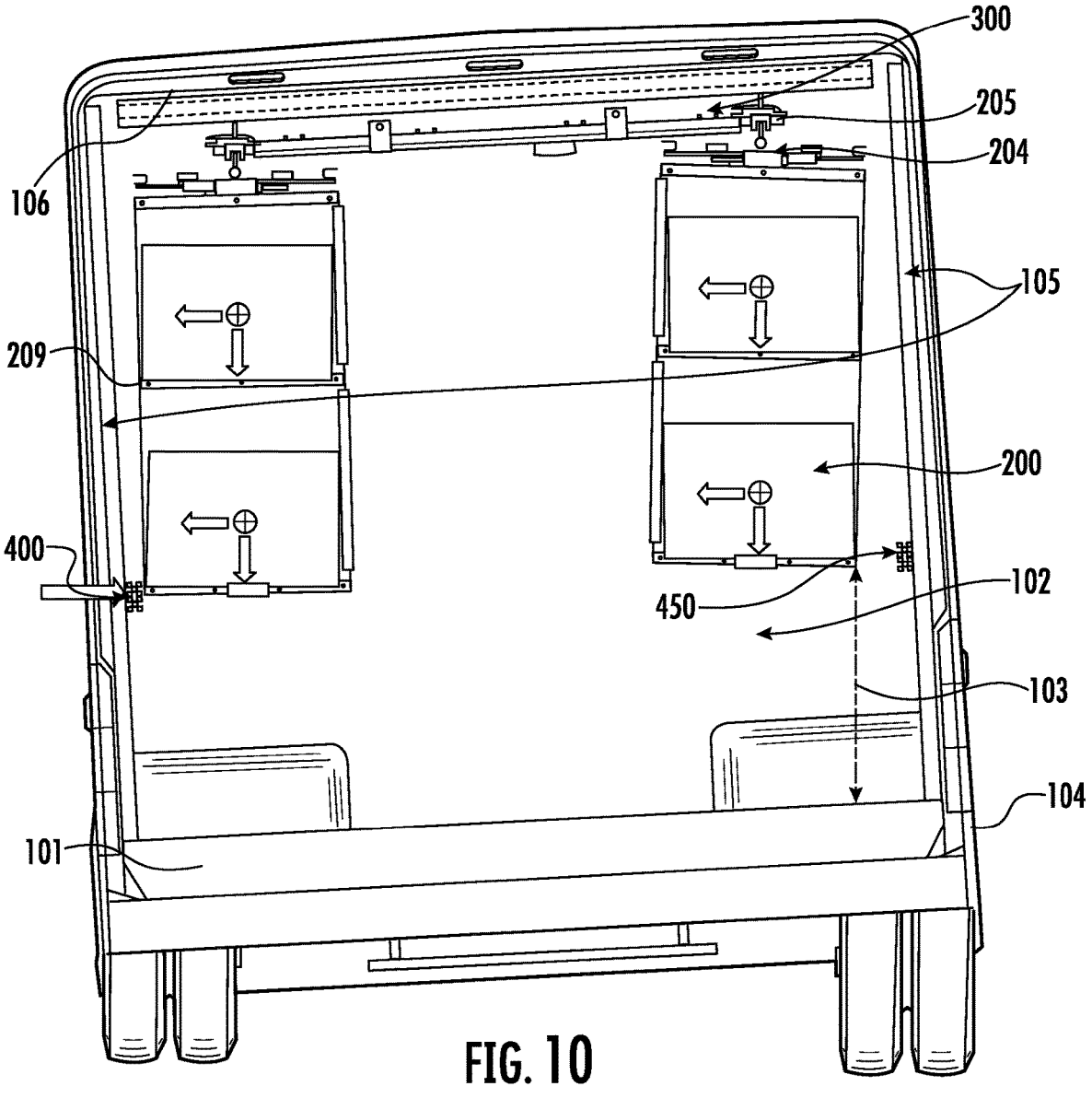
FIG. 10 is a rear view of a vehicle with an in-vehicle cargo storage unit conveyer system with an anti-sway system, according to various embodiments.

Generally, and as shown in FIG. 10, each CSU may include a variety of features to improve retention of packages and inhibit contact during movement about the cargo area 102 such as belts, ledges, railings, bumpers, or other mechanisms to secure cargo on the shelf and inhibit swinging of the CSUs. Further, each CSU may include covers that may be removable in order to retain packages within the CSU during movement, with the cover providing access to the CSU when desired. For example, the covers may be vertical shades/doors that can be pulled to the side or upward to provide access to the package cavity.

Figure 11:
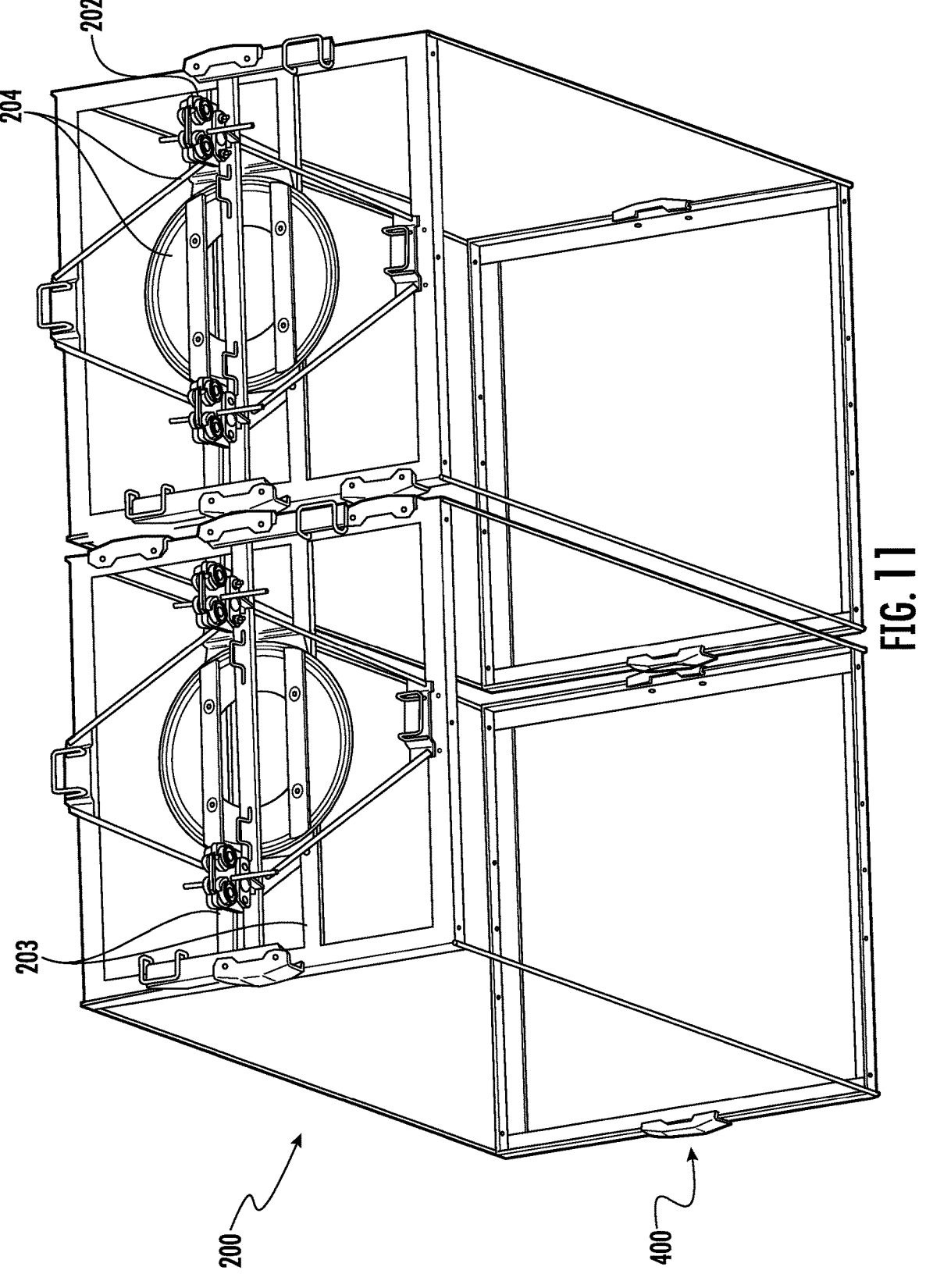
FIG. 11 is top perspective view of a CSU with an anti-sway system with bumpers, according to various embodiments.
Figure 12A:
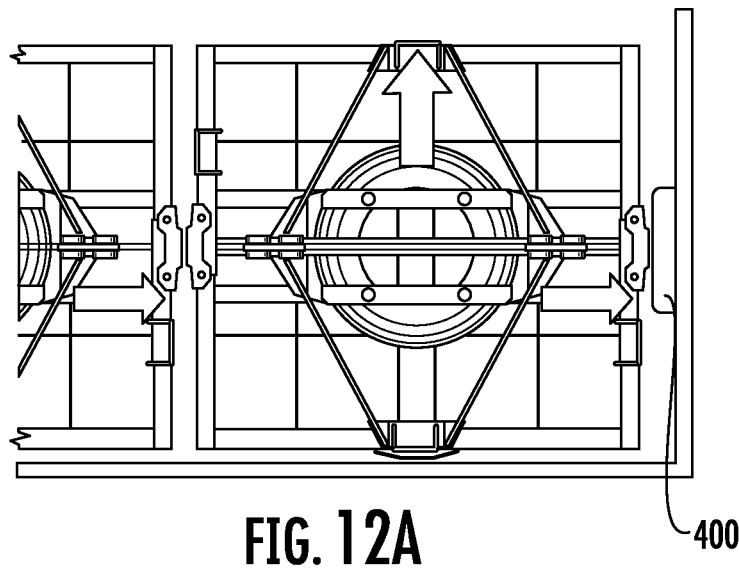
FIGS. 12A-B are a schematic diagrams of an in-vehicle cargo storage unit conveyer system with an anti-sway system with bumpers, according to various embodiments.
Figure 12B:
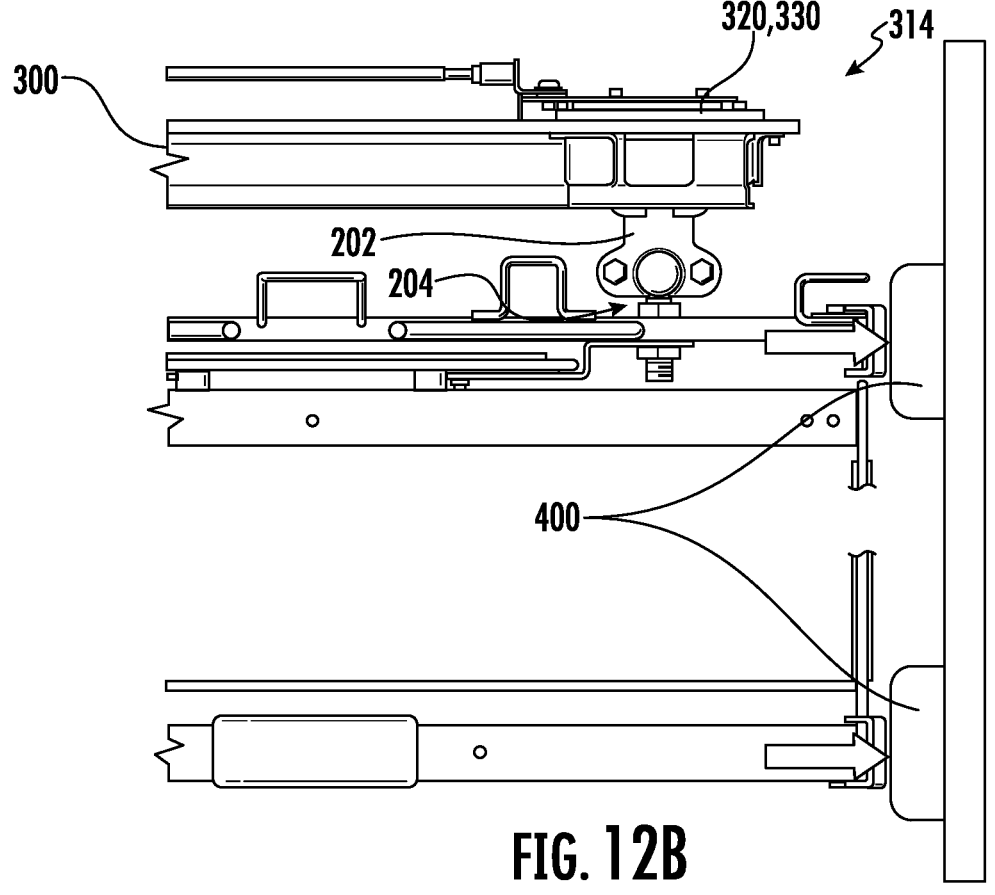

In various examples, as shown in FIGS. 10-12, the CSU 200 or walls 105 of the vehicle cargo space 102 may include bumpers 400 to soften impact of CSUs against the vehicle walls or against each other. The bumpers 400 may be provided on corners or sides of the CSU body 207 (see FIG. 11) or on the inner walls 105 of the cargo space 102 (see FIGS. 10 & 12). The bumpers 400 may be any suitable material such as, but not limited to polyaniline, plastic, Delrin, metal, or rubber, and may be any suitable size or shape to soften impact of the CSUs against the vehicle walls 105 or against each other. For example, the bumper 400 may be a bar that extends along the wall 105 of the vehicle 104. In other examples, the bumper 400 may be a discrete nub along the wall 105. Combinations of bumper types is also contemplated. Other features such as electronics, sensors, lighting and the like to facilitate movement about the cargo space and along the rails in each direction of the circuit are also contemplated in order to inhibit collision between CSUs and between CSUs and the vehicle walls 105, and more particularly in various embodiments, the hanging free end of the CSU from colliding with other free ends or the walls 105.

Possible additional features for stabilizing may include channels 450 defined on the CSUs or in the walls 105 or bumpers 400 (as shown in FIG. 10) which may engage a corresponding protrusion (not shown) in the wall 105 or CSU 200, respectively, when the CSU 200 is moving along a corner portion 214 or between corner portions 314 to stabilize the free end of the CSU 200, or in other embodiments, stabilizing plates (not shown) that engage the trolley and a surface of the CSU 200 to stabilize the CSU 200 on the rails 300. The protrusion may be elongated or include a set of protrusions that can cooperate with the channels to stabilize the CSU 200. Although shown as stabilizing at the corner portions 314, the features, plates, bars, or bumpers for stabilizing the CSUs may be incorporated at other locations along the circuit 310 as based on the likelihood of motion and direction of expected movement. For example, in another embodiment, to stabilize the CSU when travelling along the circuit 310 between the corner portions 314, the vehicle 104 may have a channel that extends cross-car in the lateral direction (Y-direction) to engage a protrusion in the CSU when traveling along the laterally extending portion of the circuit 310, or vice versa where the channel is on the CSU and the protrusions are cross-car protrusions extending laterally across the cargo space 102. Other features include blocks, plates, bars, or other retainers to inhibit motion of and stabilize the CSUs in certain positions, such as the middle positions (laterally, along the Y-axis). The stabilization features may restrict movement of portions of the CSUs 200 when in a hanging configuration from the rails 300, or in configurations when sitting atop a trolley 202 to avoid tip over of CSUs 200 (i.e., the channels 450 or protrusions 455 may be incorporated in the ceiling 106 to engage the top of the CSUs 200 that sit atop a trolley 202).

Examples of additional features to stabilize the CSU 200 during movement to, from, and at the corner portions 314 are provided in FIGS. 13A-I, including an anti-sway system 500 that may be incorporated in the cargo space 102. Referring to FIGS. 13A-I, examples of configurations of an anti-sway system 500 is provided. The anti-sway system 500 cooperates with the CSUs 200, the rails 300, and/or the walls 105, ceiling 106, or floor 101 of the vehicle cargo space 102 to inhibit swinging or rotation of the CSUs 200 (and, in certain embodiments, more particularly the free ends of the CSU relative to the top ends which are mounted to the rails 300). The anti-sway system 500 may include various railings 510 which are mounted to the floor 101, walls 105, or ceiling 106 of the vehicle cargo space 102, or combinations thereof, in order to contact the CSUs 200 to restrict movement of the CSUs 200 during movement of the vehicle 102. In the embodiment shown in FIG. 13B, the anti-sway system 500 may include an wall-railing such as a bumper 400 as the inner railing, as previously described, and another railing 510, which will collectively be referred to as railings 510. The railings 510 may stabilize the CSUs 200 when in a hanging configuration from the rails 300, or when sitting atop a trolley 202 to avoid tip over of CSUs 200. The railings 510 may be distributed around the vehicle cargo space 102 as based on the configuration of the rails 300, and maybe disposed at a forward end, rear end, towards the center of the cargo space 102, or combinations thereof. The railings 510 may include vertical members 512 and horizontal members 515 which cooperate and may be interconnected to form the railings 510 of the anti-sway system 500. The vertical members 512 and horizontal members 515 may be fixed together (e.g., by welding), or connectable to form the railings 510. As such, the railings 510 may be any suitable material with sufficient rigidity to inhibit swinging or tip over, or other undesired motion of the CSUs 200, such as, but not limited to, metal or plastic. Although railings are described herein, other components may inhibit swaying or otherwise stabilize the CSUs and may be used instead of railings or in addition to railings, such as, but not limited to, stabilizing plates between the rails 300 and the CSU 200.

Figure 13A:
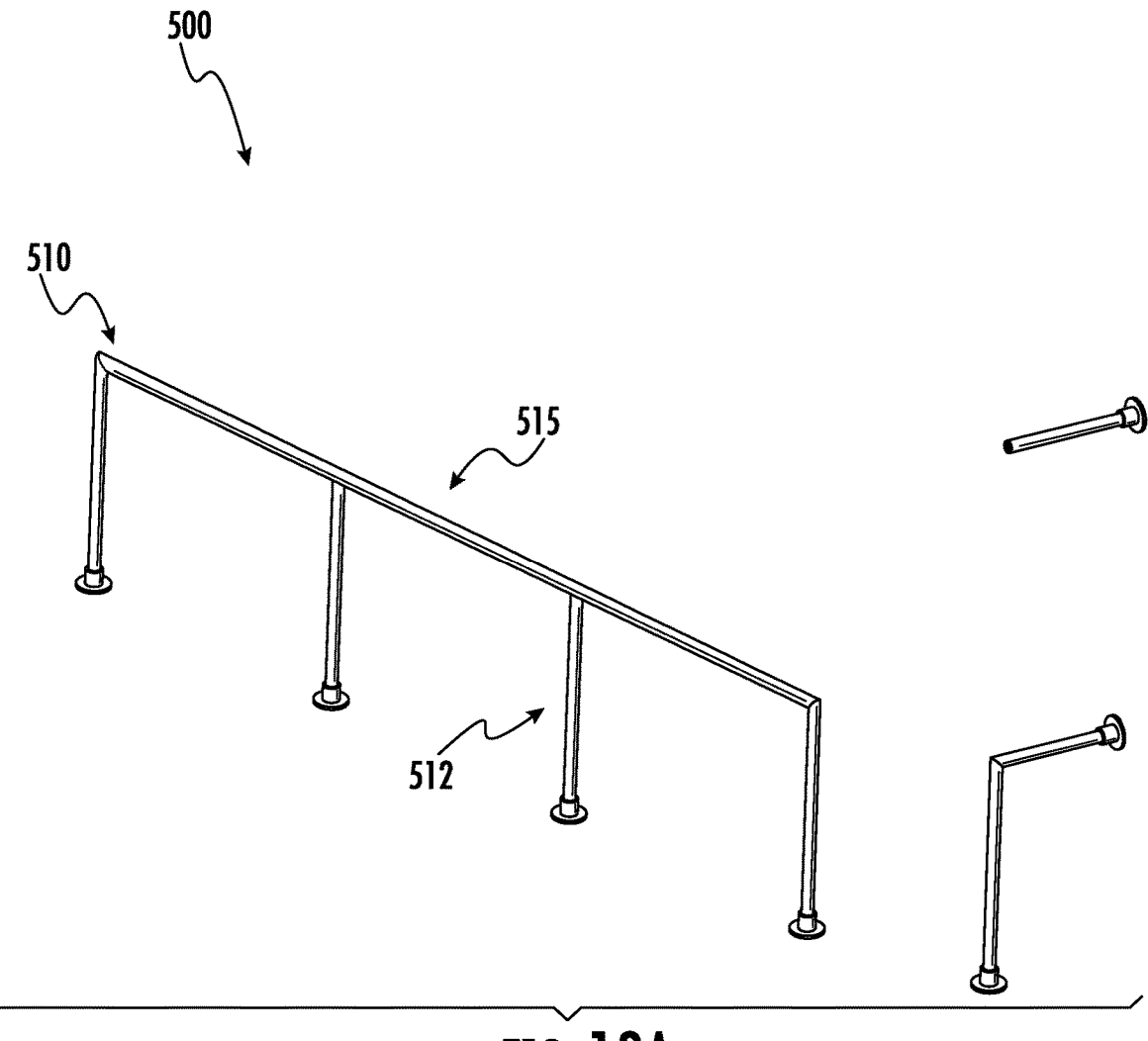
FIG. 13A is a perspective view of an anti-sway system for an in-vehicle cargo storage unit conveyer system, according to one or more embodiments.
Figure 13B:
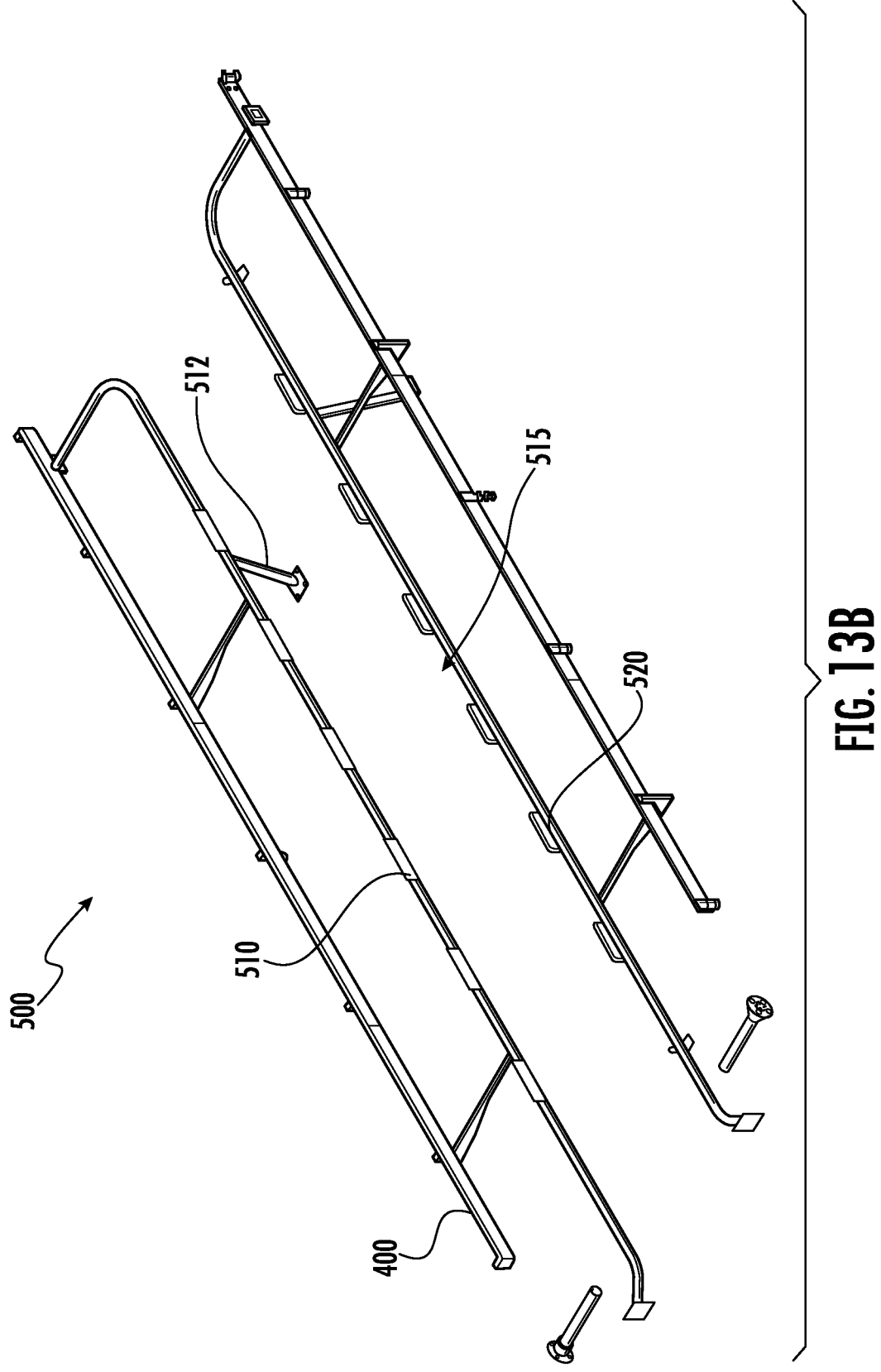
FIG. 13B is a perspective view of an anti-sway system for an in-vehicle cargo storage unit conveyer system, according to one or more embodiments.
Figure 13C:
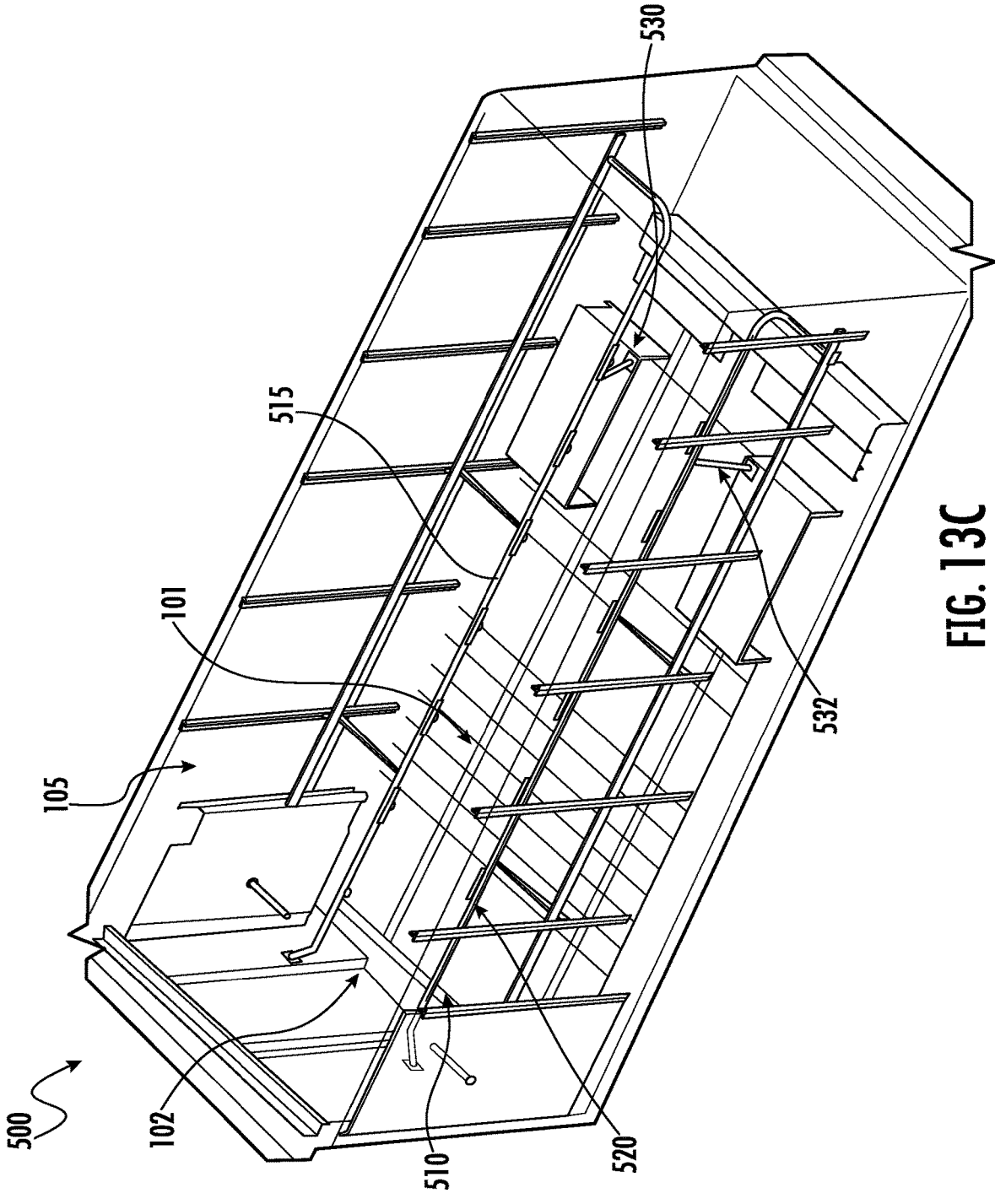
FIG. 13C is a perspective view of an anti-sway system in a vehicle with an in-vehicle cargo storage unit conveyer system, according to one or more embodiments.
Figures 13D, 13E, 13F:
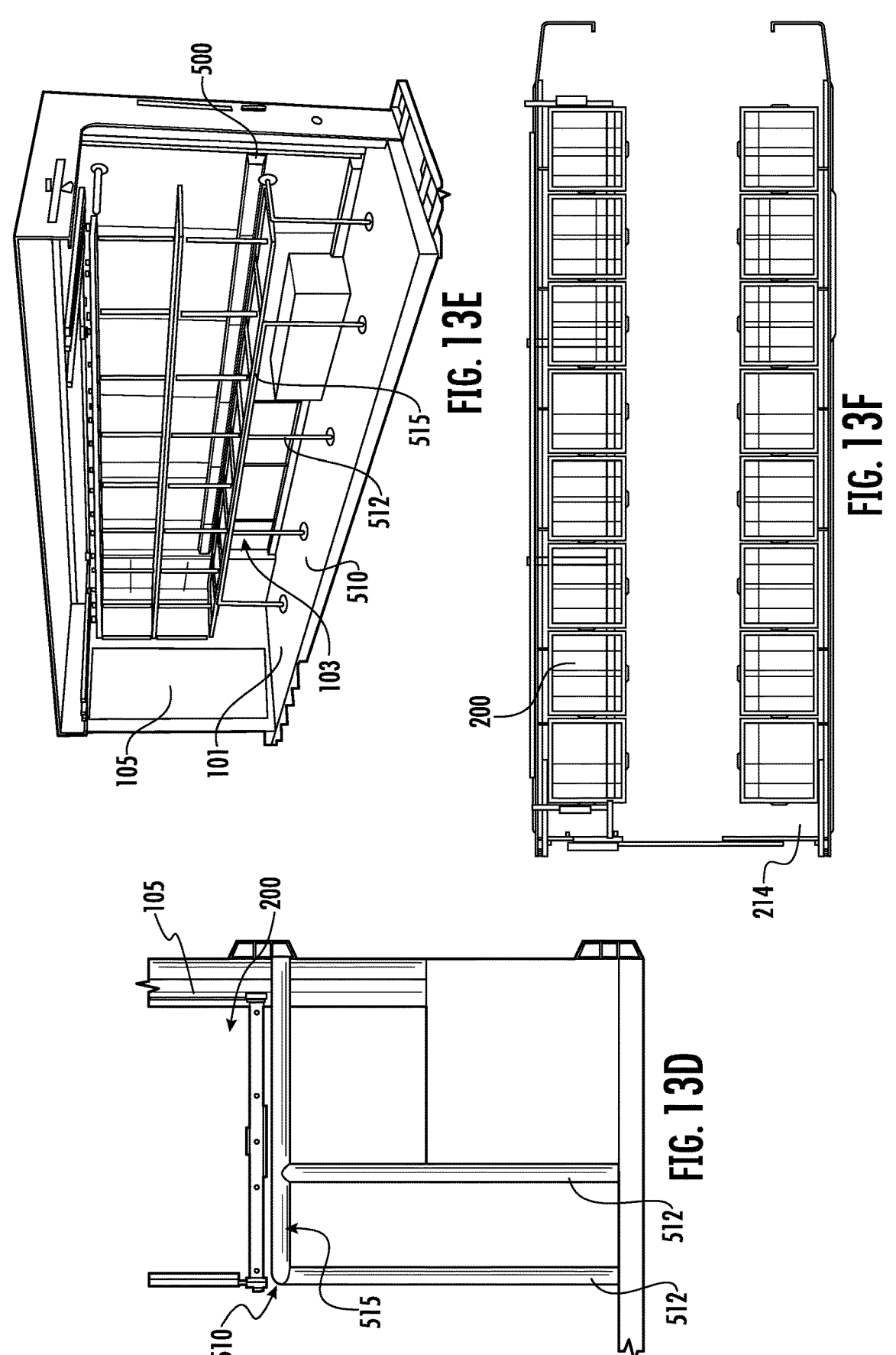
FIG. 13D is a rear-view diagram of an anti-sway system for an in-vehicle cargo storage unit conveyer system, according to one or more embodiments.
FIG. 13E is a perspective view of the anti-sway system of FIG. 13D in a vehicle.
FIG. 13F is a top view of the anti-sway system of FIG. 13D.
Figures 13G, 13H, 13I:
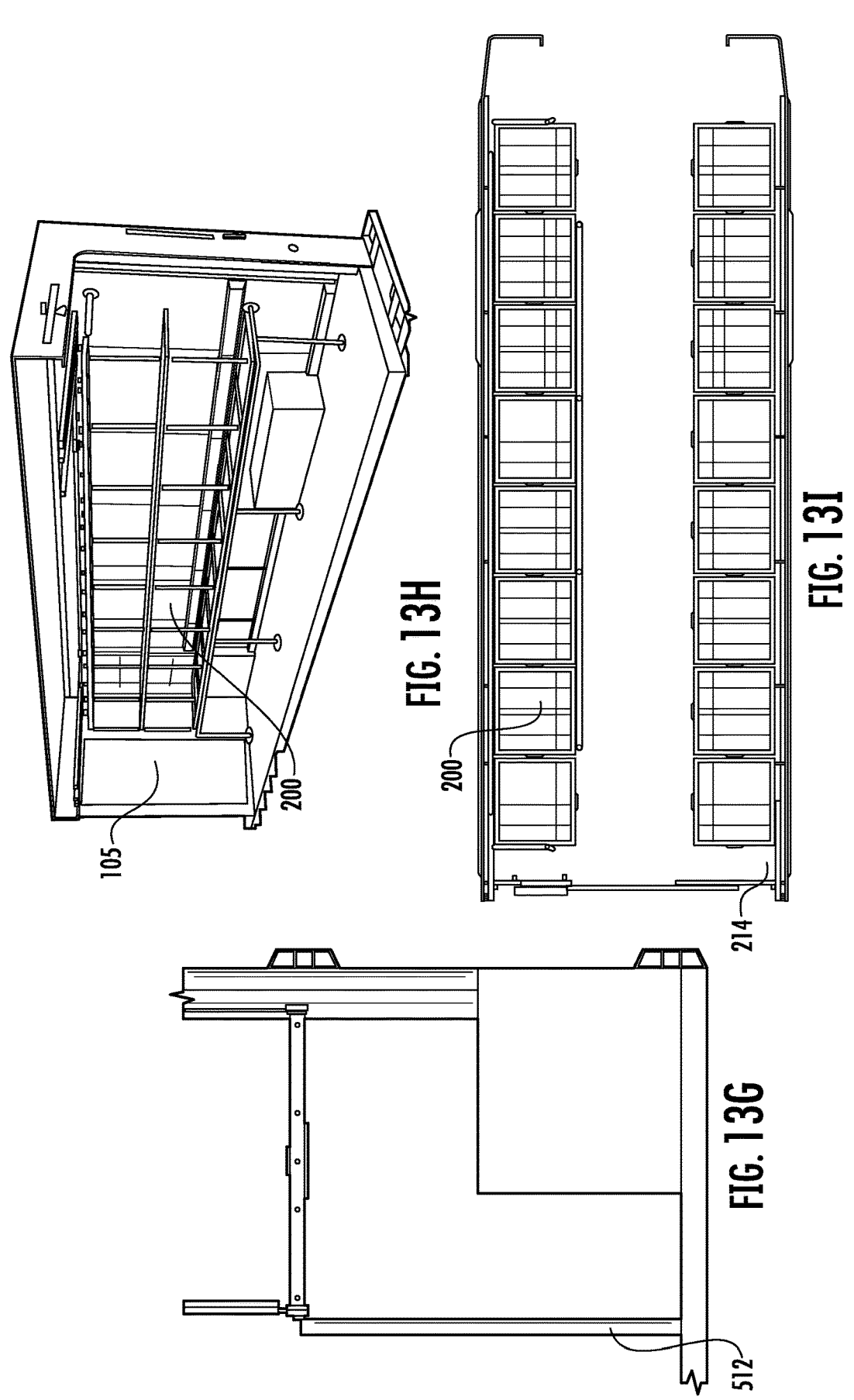
FIG. 13G is a rear-view diagram of an anti-sway system for an in-vehicle cargo storage unit conveyer system, according to various embodiments.
FIG. 13H is a perspective view of the anti-sway system of FIG. 13G in a vehicle with in an in-vehicle cargo storage unit conveyer system.
FIG. 13I is a top view of the anti-sway system of FIG. 13G.

In certain examples, the anti-sway system 500 includes railings 510 extending from the floor 101 of the vehicle cargo space 102 to restrict movement of the CSUs 200 and restrain overflow cargo stored on the floor 101 in overflow cargo space 103 from moving about the cargo space 102. The railings 510 may be U-shaped, L-shaped, or other suitable shape combining vertical members 512 and horizontal members 515 to form railings 510 that can inhibit undesired movement of the CSUs 200 as based on the rails 300 and the configuration of the in-vehicle conveyor system 100 within the vehicle cargo space 102. In various embodiments, and as shown in FIG. 13C, the anti-sway system 500 may further include lighting 520 (e.g., LEDs) to illuminate the areas around the CSUs 200 and improve visibility of packages stored in the CSU 200, as well as connector plates 530 between straps 532 connected to the railings 510 which facilitate cargo retention on the cargo floor 101.

Furthermore, the railings 510 may have a deployed position and a stored position. In the deployed positions, the railings 510 are positioned to contact the CSUs 200 during movement of the vehicle 104 in restrict unwanted movement of the CSUs. In the stored position, the railings 510 may be removed or otherwise moved and stored when the vehicle is stopped and the driver may need access to the CSUs 200 (as during loading of the vehicle or during a delivery stop). A controller may deploy or store the railings 510 based on activation of the anti-sway system 500 responsive to movement of the vehicle 104.

Generally, with reference to the Figures, the rails 300 may include various component rails that cooperate to form a continuous track between component rails to form the rails 300. The rails 300 may be provided as mono-rail 302, dual-rail 305, or additional multi-rail systems, and depiction of mono-rail and dual-rail embodiments is not intended to be limiting. The rails 300 in various configurations may include any number, combination, or selection of forward/aft rails 303 extending the X-direction of the cargo space 102 and lateral rails 304 extending in the Y-direction of the cargo space 102. The forward/aft rails 303 may be positioned toward the walls 105 (i.e., in the racetrack configurations), and/or may include a center rail 301 positioned toward the middle of the cargo space 102 and extending the X-direction. The lateral rails 304 span the cross-car direction, and may be a single rail from wall to wall, or may be split. Generally, the rails 300 may include any suitable number of rails extending in the X-direction and Y-direction, as based on the cargo space size and configuration, or as based on the desired circuits of travel for the CSUs thereon, and depiction of any particular embodiment or example is not intended to be limiting. As such, there may be 1, 2, or more fore/aft rails 303, and one or more lateral rails 304 in various embodiments. Furthermore, there may be embodiments where only fore/aft rails are contemplated, and a series of fore/aft rails allow for sequential delivery of a CSU to the predetermined location at the front or rear of the vehicle. As follows, various embodiments may include a series of lateral rails which allow for side access to CSUs in sequence (e.g., where the cargo space is accessible via side doors, like those used for beverage deliveries). In embodiments where the lateral rails 304 are split, the portions of the lateral rails 304 may be connected by a suitable mechanism or connector, including one or more rotaries 322, 332 to allow rotation of the CSU between the portions of the lateral rail 304 in some examples, or a center rail 301 between the lateral rail 304 portions to allow CSUs to flow from stored positions on the lateral rail 304 to the predetermined location 315 at the front or rear of the vehicle (and for other CSUs that are not to be recalled to be sent opposite to the predetermined location 315 along the center rail 301). Forward/aft rails 303, center rail 301, and lateral rails 304 may be connected to each other to form a continuous track by corner portions 314, which may be any suitable mechanism to allow the CSUs to change direction of travel in the cargo space 102.

In various embodiments, the corner portions 314 may be or include rotaries, corner turnstiles, corner radii, latches with hooks, gear and actuator (i.e., motor) mechanisms, or other suitable latching and transfer feature or combination thereof for changing direction of travel of the CSU 200 between rails 300 or portions of rails 300 and/or rotating the CSU (e.g., manual, motor, pneumatic, or hydraulic actuators). In certain examples, the corner portions 314 may further include additional features in latching mechanisms or gears that cooperate with swivel mechanisms 205 and the trolleys 202, thus synchronizing the translation along the rails with the rotation relative to the rails. For example, referring to FIG. 15A, the corner portions 314 may include actuators 350 that cooperate with the hooks 211*a*, 211*b* to latch with the center pin 206 of the swivel mechanism 205 when the trolley 202 enters the corner portion 314 for changing direction of travel. The hooks 211*a,b* thus can drive the movement of the trolley 202 in the cross-car or forward/aft directions, as based on which hook is engaged with the center pin 206. The CSU could then swivel in the corner or at a designated position along the circuit 310 by engagement of the swivel mechanism 205 with a rotary 322. In certain embodiments, the CSU may travel while also simultaneously swiveling the CSU by engagement of the swivel mechanism 205. In one or more examples, the CSU 200 may swivel per the swivel mechanism 205 via transfer of the center pin 206 as it moves through the corner and changes direction of travel. In other examples, latching mechanisms of the drive system may engage a transfer plate for changing direction of travel of the CSU from fore/aft to lateral, and while traveling laterally, initiating the swivel mechanism 205 (i.e., a gear 290 interfacing with a rack 291) to rotate the CSU (see FIG. 17B) to rotate the CSU. Thus, in certain examples, the CSU may rotate relative to the rails independent from the corner portion (e.g., via a swivel mechanism), or have the rotation tied to the corner portion either via the corner portion, via a rotary, or via a swivel mechanism. Further examples and configurations will be described below with respect to the rail configurations and with respect to the trolley 202 and swivel mechanism 205 configurations.

Examples of various configurations of rails will now be described. Although particular configurations are described and shown herein, this is not intended to be limiting, and other configurations and arrangements, as well as combinations of arrangements, features, rails, and corner portions, are also contemplated.

Figure 22B:
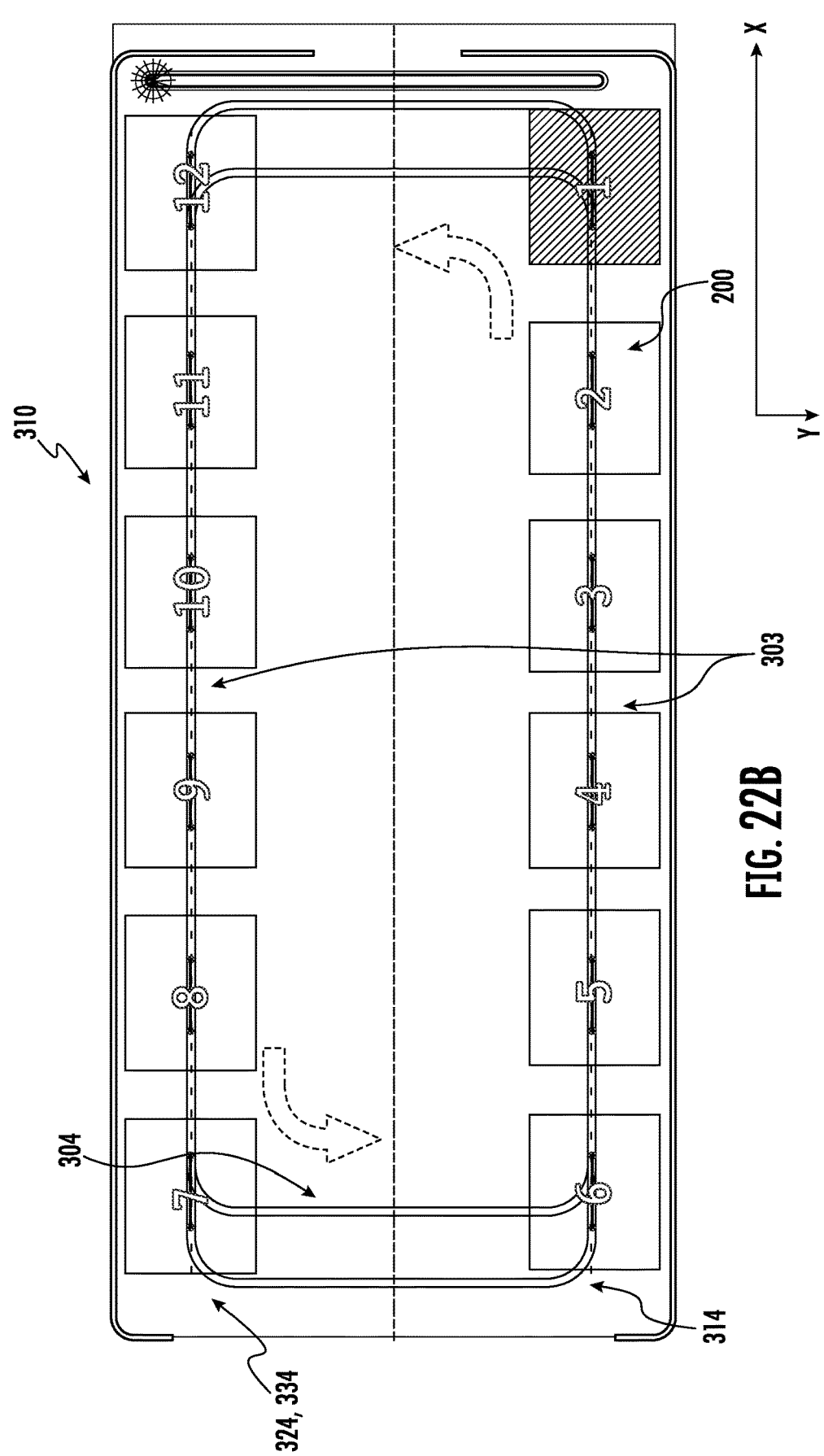
FIG. 22B is a schematic top-view of a diagram of FIG. 22A, according to various embodiments.

As shown in FIG. 22A, various configurations for the rails 300 are provided, summarizing the arrangements that will be described in FIGS. 22B-M. Generally, FIGS. 1-4, and 6-9 are continuous rail systems, having either mono-rail or dual-rail configurations in a racetrack type arrangement according to various embodiments. Certain examples further include a center rail 301, such as the examples in FIG. 22F-G, or lateral rails 304 towards the middle of the vehicle cargo space 102, as in the examples of FIGS. 22H-I. With reference to FIG. 22J, the rail system includes a center rail 301, with lateral rails 304 extending therefrom. Although only mono-rail and dual-rail arrangements are shown in the Figures, this is not intended to be limiting, and additional rails are also contemplated.

In FIG. 22B, according to an example, the circuit 310 is shown for a racetrack type configuration of the rails 300, having a dual rail 305 structure. Each CSU 200 (numbered) is secured to the rails 300 via two trolleys to follow the dual rail 305 track. The rails include forward/aft rails 303 extending in the X-direction, and lateral rails 304 extending cross-car (Y-direction) between corner radii 324, 334 at the corner portions 314. The drive system of FIG. 22B may be any suitable drive mechanism, and other systems for moving the CSUs 200 along the circuit 310 are also contemplated. Furthermore, although a counterclockwise direction of movement is shown for the circuit 310, this is not intended to be limiting, and the CSUs 200 may be moved in a clockwise direction, or optionally in either direction.

Figure 22C:
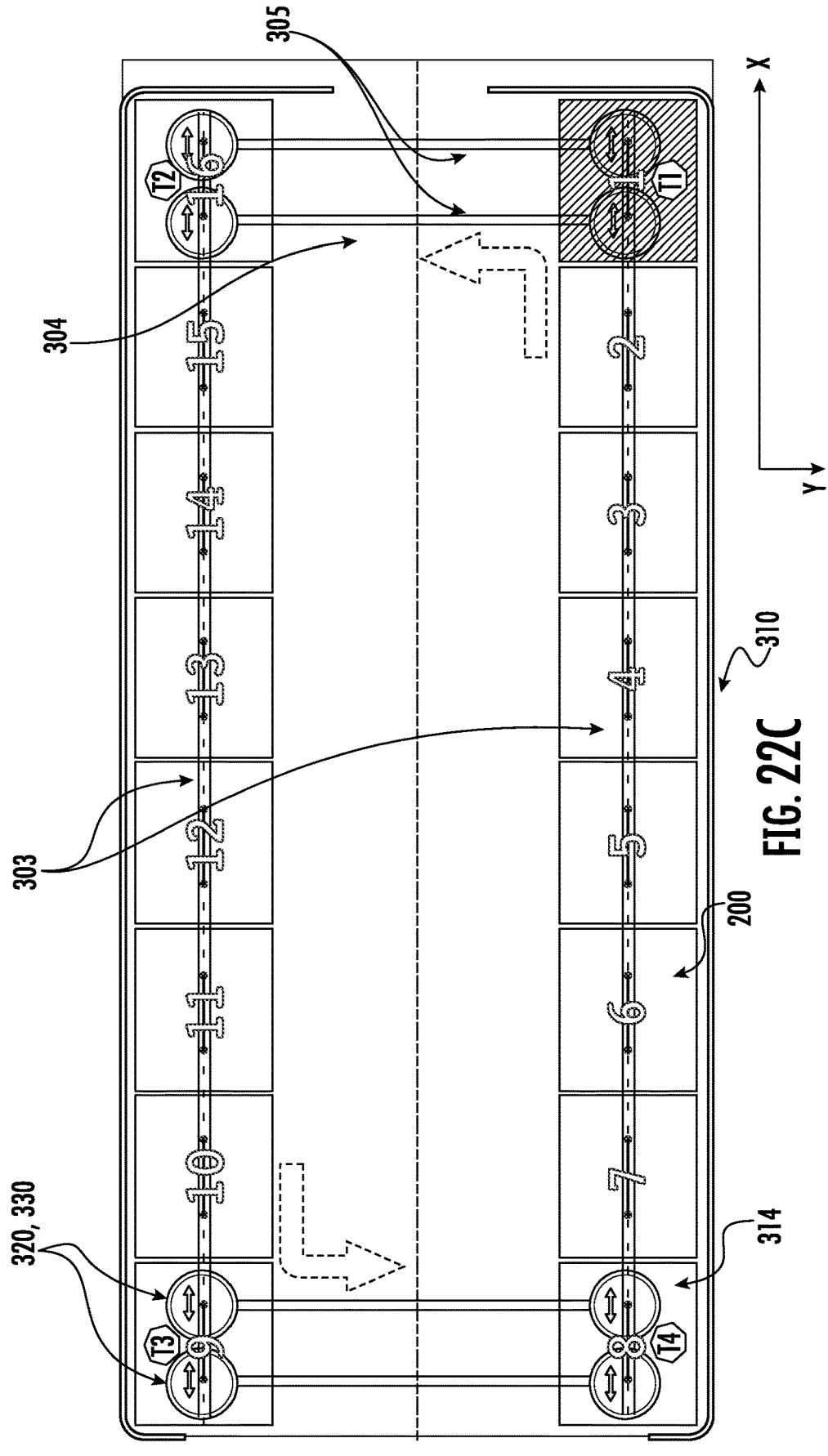
FIG. 22C is a schematic top-view of option 2A of the diagram of FIG. 22A, according to various examples.

In FIG. 22C, according to another example, the circuit 310 is shown for a racetrack type configuration of the rails 300, having a dual rail 305 structure. Each CSU 200 (numbered) is secured to the rails 300 via two trolleys to follow the dual rail 305 track. The rails include forward/aft rails 303 extending in the X-direction, and lateral rails 304 extending cross-car (Y-direction) between a pair of corner turnstiles 320, 330 at the corner portions 314 (corresponding to a respective trolley on the CSU 200). The corner turnstiles 320, 330 change which rails 300 between the forward/aft rails 303 and lateral rails 304 the CSU 200 travels on by aligning the track with the appropriate rail such that the trolleys can continue movement of the CSU in the new direction. Although two turnstiles are shown (based on a dual trolley system), this is not intended to be limiting, and any suitable number of turnstiles (one or more) are contemplated at the corner portions 314 as dependent on the number of rails, the number of trolleys, or combinations thereof. Furthermore, although a counterclockwise direction of movement is shown for the circuit 310, this is not intended to be limiting, and the CSUs 200 may be moved in a clockwise direction, or optionally in either direction.

Figure 22D:
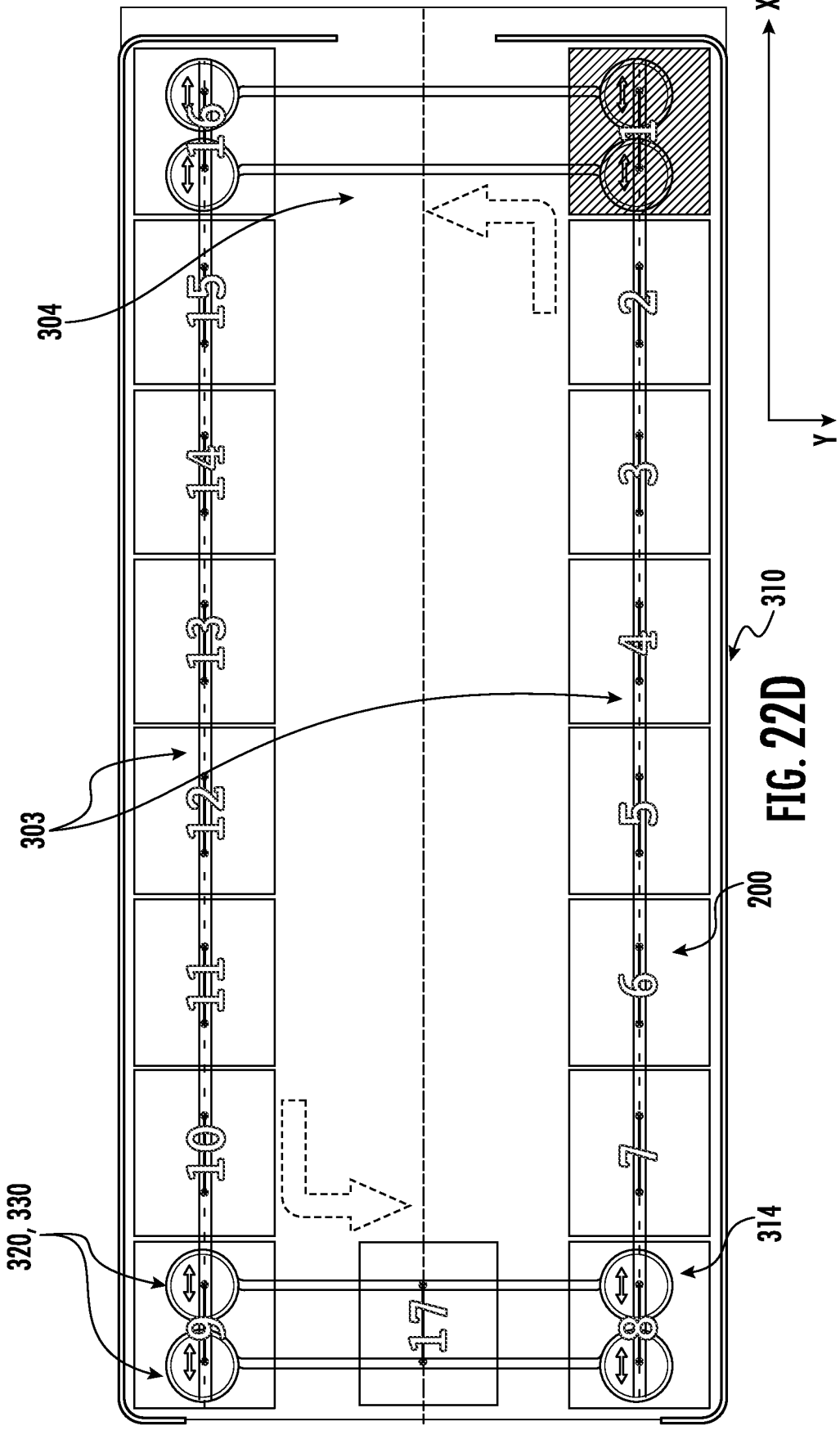
FIG. 22D is a schematic top-view of option 2B of the diagram of FIG. 22A, according to various examples.

FIG. 22D shows a similar system to FIG. 22C, with an additional CSU #17 included on the rails 300. The additional CSU #17 is positioned on the lateral rails 304 at the front or rear of the vehicle cargo space, while the other CSUs 200 are aligned along the walls 105. By storing a CSU 200 along the lateral rail 304, additional volume can be utilized for package storage. Although only shown on one end of the vehicle cargo space, an additional CSU 200 may be provided on the other lateral rail 304 to increase capacity. Furthermore, additional lateral rails 304 may be included with additional corner portions 314 to further increase capacity by having cross-car storage utilized along the length of the vehicle cargo space.

Figure 22E:
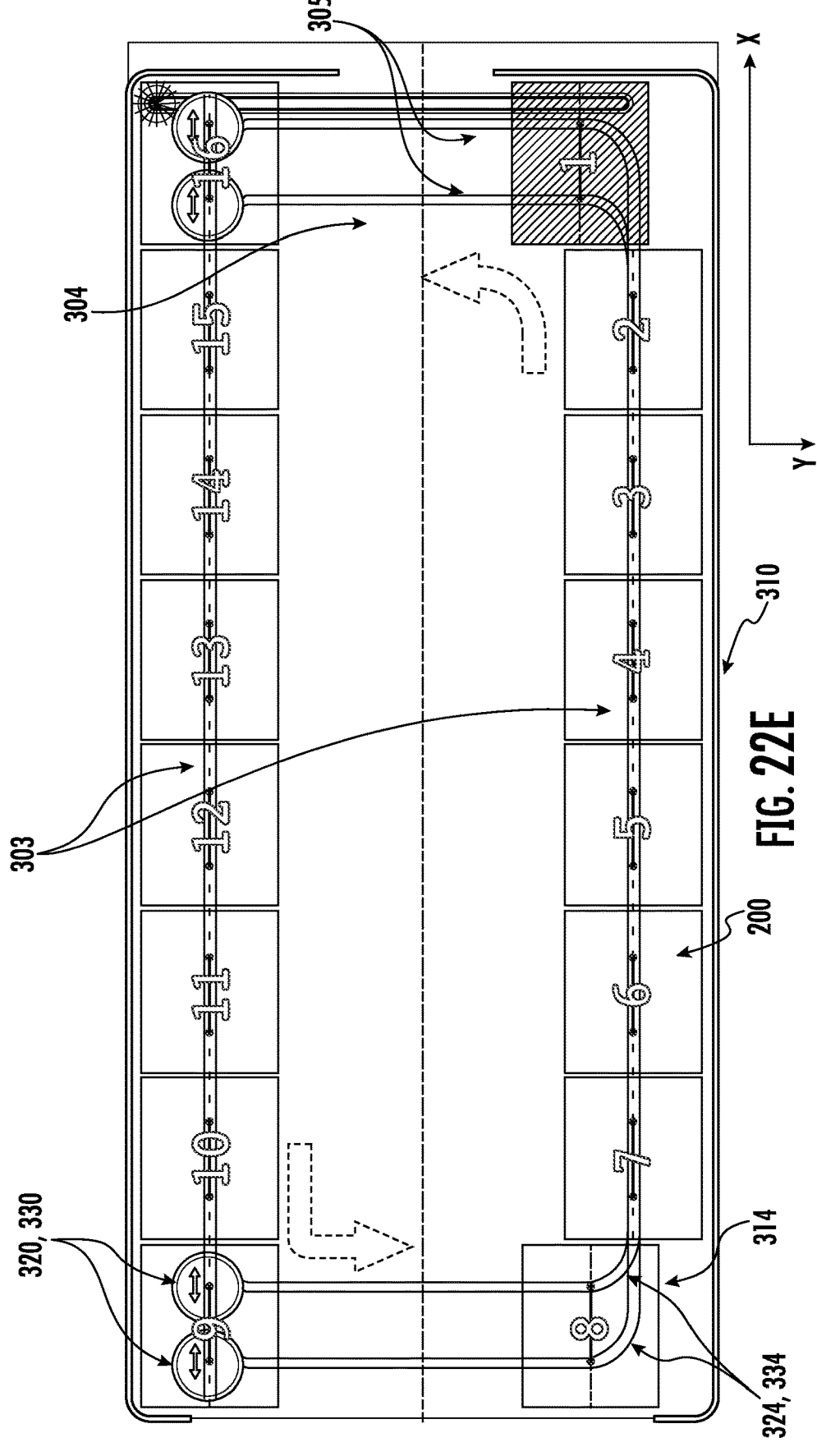
FIG. 22E is a schematic top-view of option 3 of the diagram of FIG. 22A, according to various examples.

FIG. 22E shows a combination system of rails 300 having a dual rail 305 track, having corner portions 314 with corner turnstiles 320, 330 along one wall 105, and corner radii 324, 334 along another wall 105. The positioning of CSUs 200 at the corner portions 314 is shown as CSUs #1, 8, 9, and 16 are in the corner portion 214 and changing direction of travel along the circuit 310. The drive system of FIG. 22E may be any suitable drive mechanism, and other systems for moving the CSUs 200 along the circuit 310 are also contemplated. Furthermore, although a counterclockwise direction of movement is shown for the circuit 310, this is not intended to be limiting, and the CSUs 200 may be moved in a clockwise direction, or optionally in either direction.

Figure 22F:
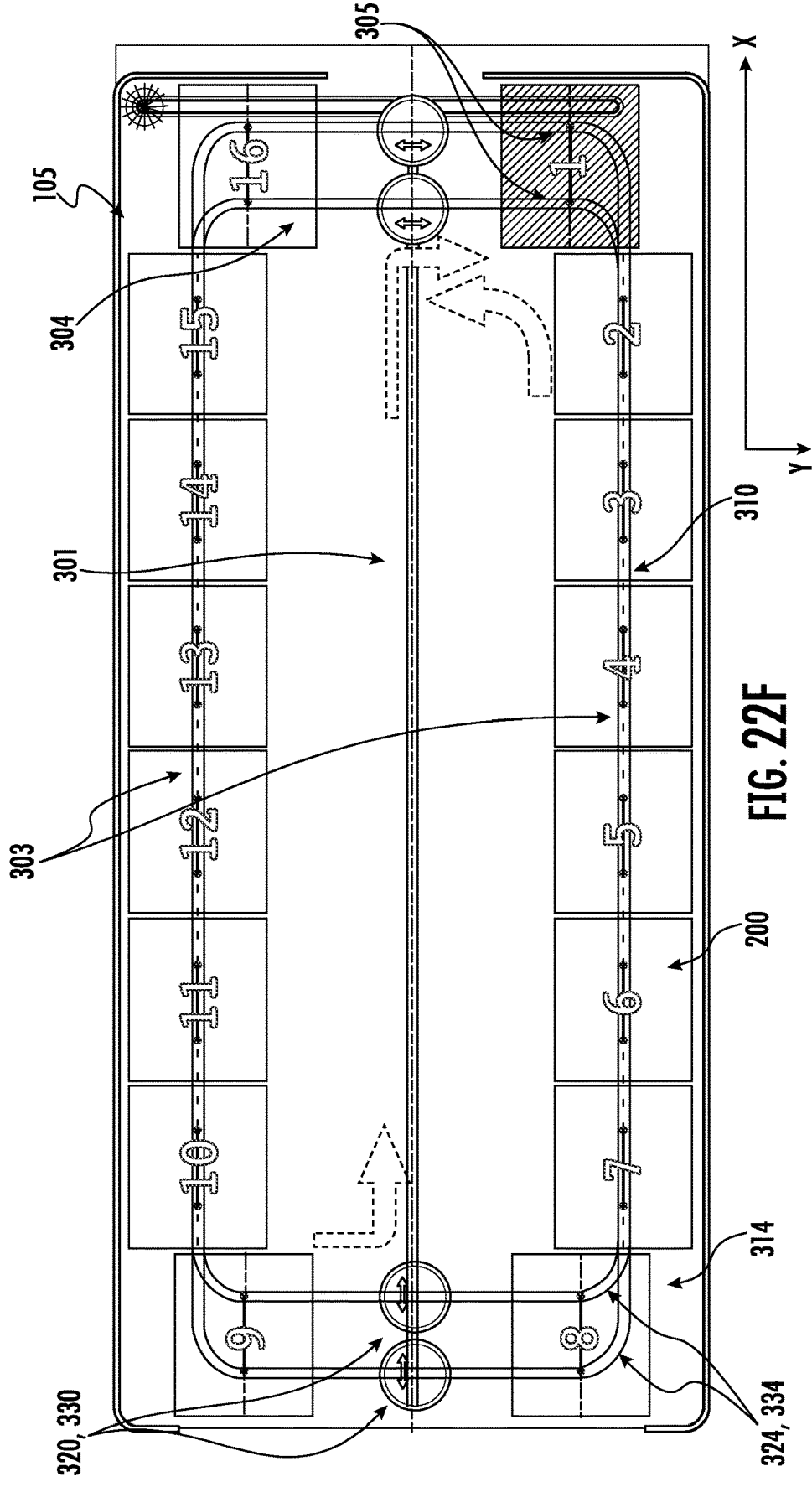
FIG. 22F is a schematic top-view of option 4 of the diagram of FIG. 22A, according to various examples.

Referring to FIG. 22F, according to an example, the circuit 310 is shown for a racetrack type configuration of the rails 300, having a dual rail 305 track. Each CSU 200 (numbered) is secured to the rails 300 via two trolleys to cooperate with the dual rail 305 track. The rails include forward/aft rails 303 extending in the X-direction, and lateral rails 304 extending cross-car (Y-direction) between corner radii 324, 334 at the corner portions 314. The example of FIG. 22F further includes a center rail 301 extending along the X-direction at the center of the vehicle. The center rail 301 is connected to the lateral rails 304 at the front and rear of the cargo space via turnstiles 320, 330, which allow for rotation of the trolleys 202 of the CSU 200 to travel along the center rail 301 to the front or rear of the vehicle, as desired based on the predetermined location for the circuit 310. As such, the turnstiles 320, 330 align the CSU 200 trolleys 202 with either the lateral rails 304 for cross-car travel (e.g., towards the walls 105), or with the center rail 301 for travel along the length of the vehicle cargo space, forming sub-circuits 311 within the circuit 310 for various CSUs 200. The drive system of FIG. 22F may be a any suitable drive mechanism, and other systems for moving the CSUs 200 along the circuit 310 are also contemplated. Furthermore, although a particular directions of movement is shown for the circuit 310, this is not intended to be limiting, and the CSUs 200 may be moved in any combinations of directions.

Figure 22G:
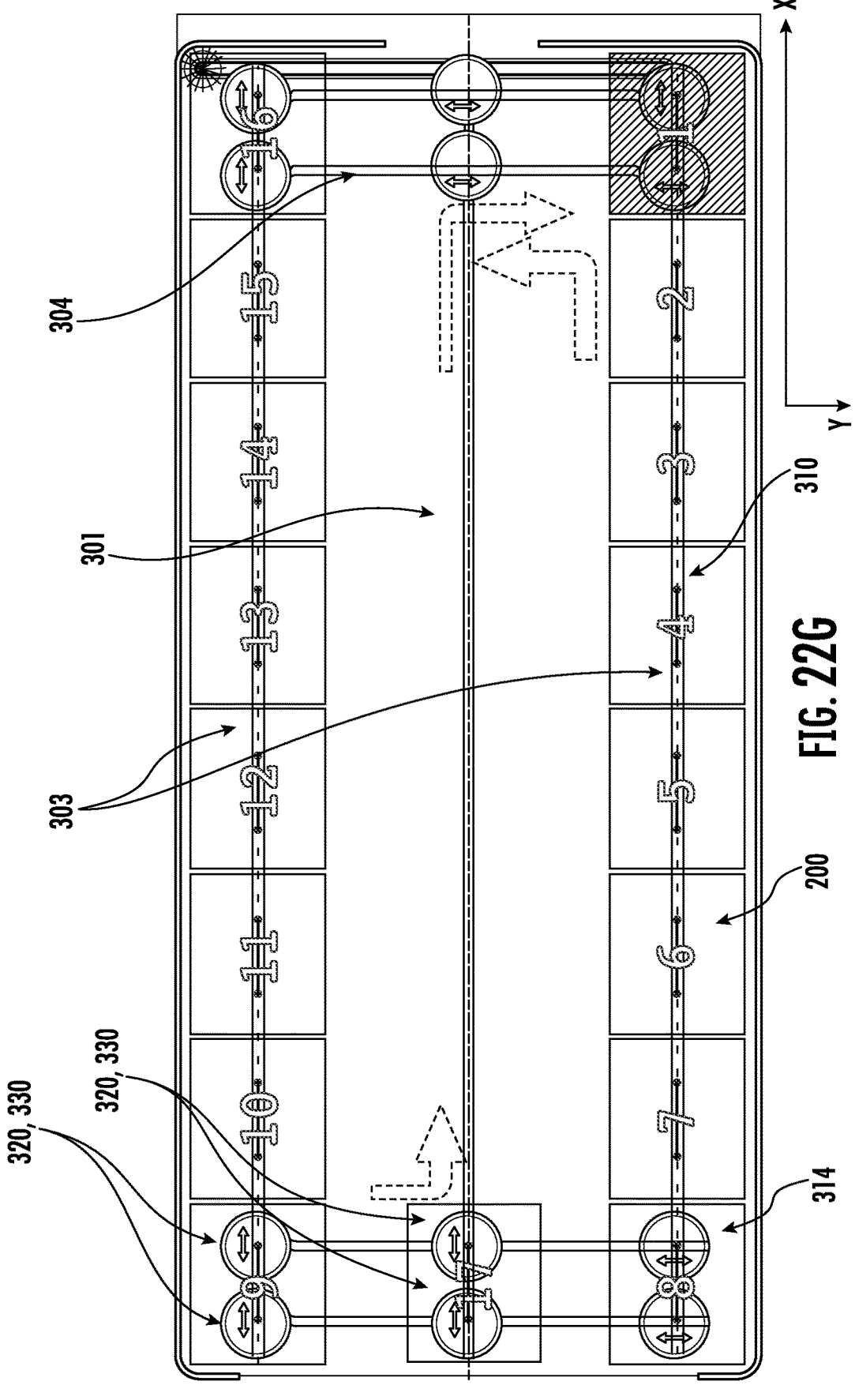
FIG. 22G is a schematic top-view of option 5 of the diagram of FIG. 22A, according to various examples.

FIG. 22G is similar to FIG. 22F, but includes corner turnstiles 320, 330 at the corner portions 314 as opposed to corner radii, and has similar features as described with respect to FIG. 22G.

Figure 22H:
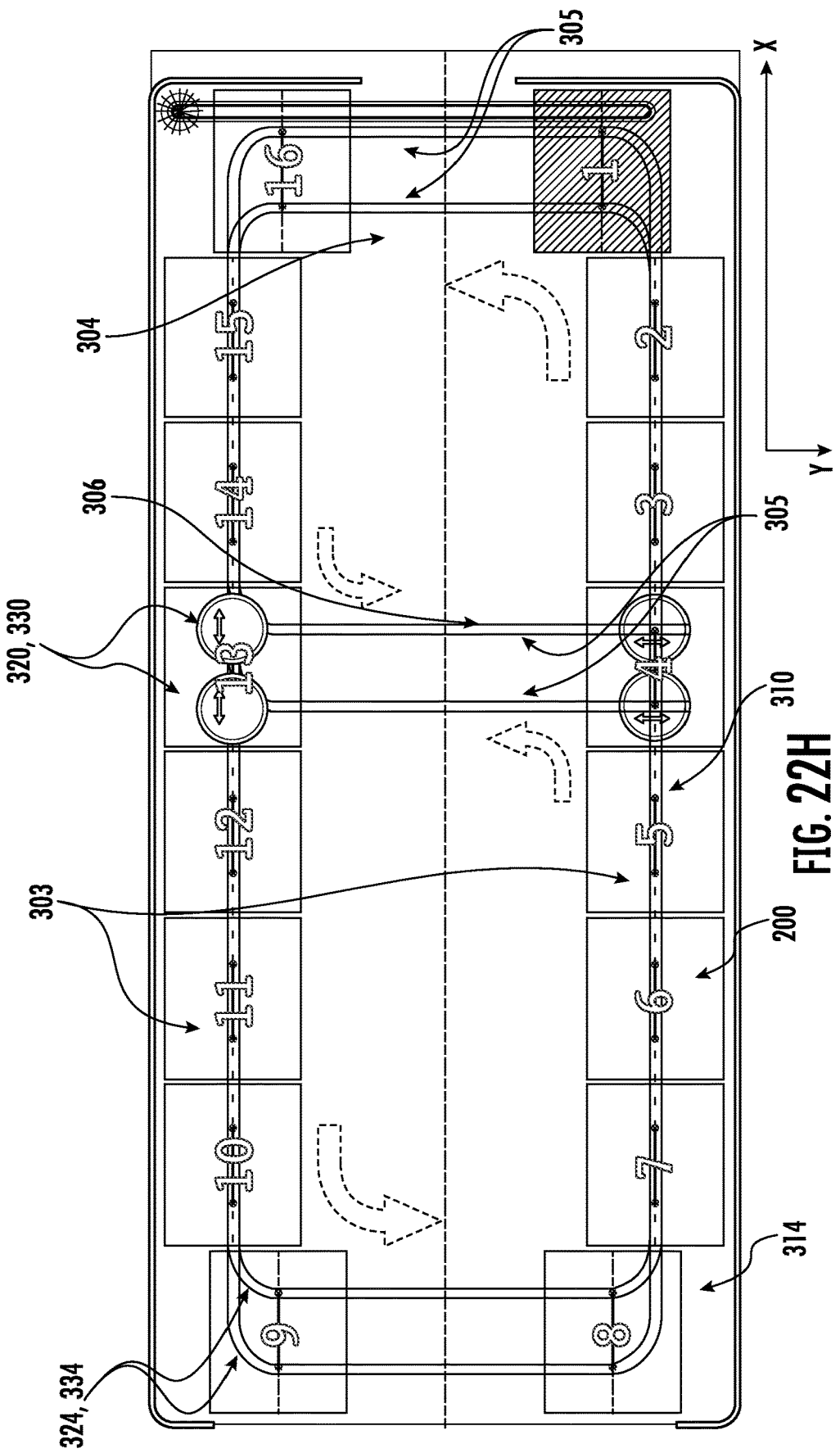
FIG. 22H is a schematic top-view of option 6 of the diagram of FIG. 22A, according to various examples.
Figure 22I:
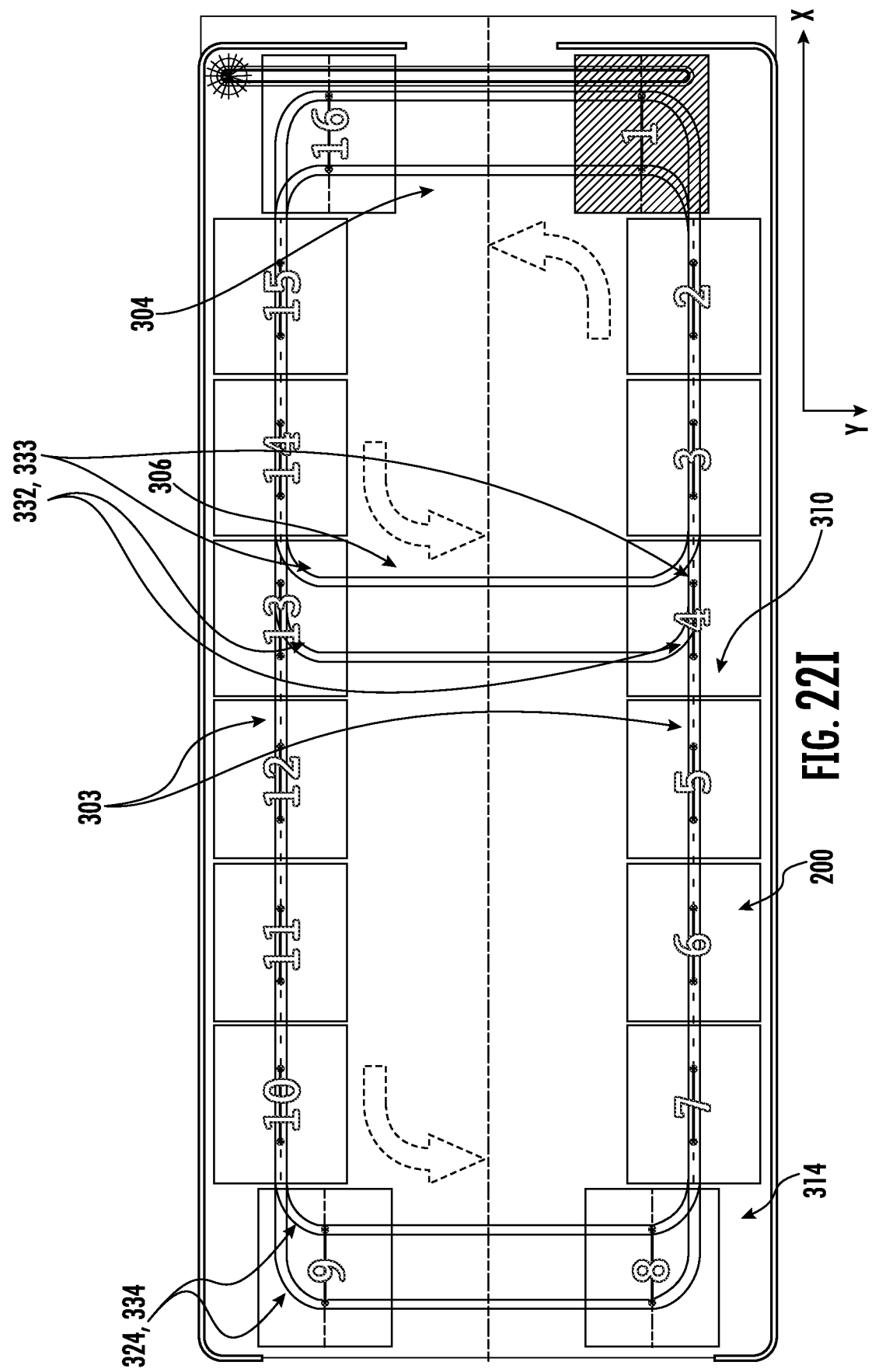
FIG. 22I is a schematic top-view of option 7 of the diagram of FIG. 22A, according to various examples.
Figure 22J:
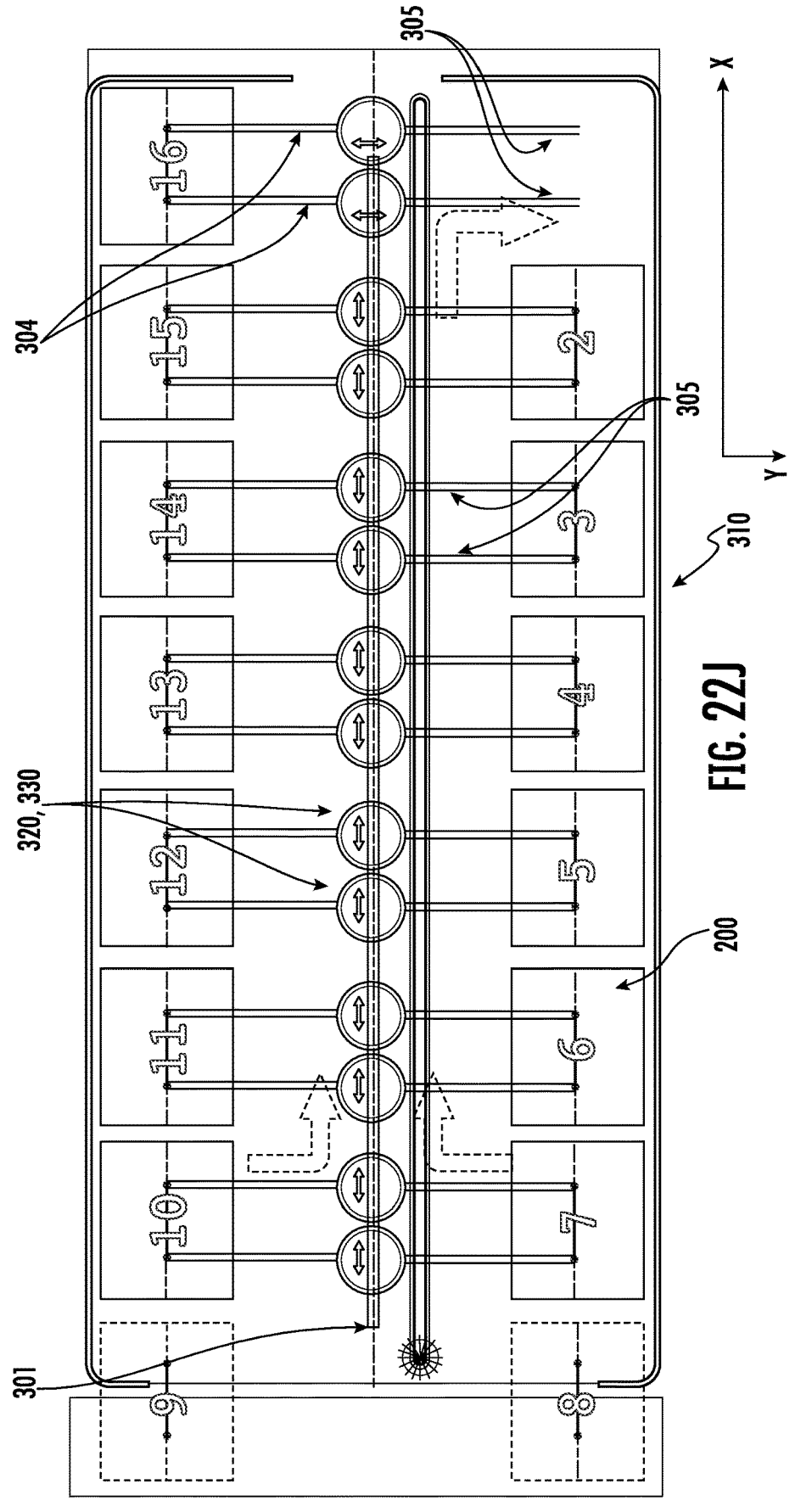
FIG. 22J is a schematic top-view of option 8 of the diagram of FIG. 22A, according to various examples.

FIG. 22H, according to another example, the circuit 310 is shown for a racetrack type configuration of the rails 300, having a dual rail 305 structure, with lateral rails 304, including a split loop rail 306 extending cross-car and disposed along the X-direction of the cargo space. Each CSU 200 (numbered) is secured to the rails 300 via two trolleys to follow the dual rail 305 track. The rails 300 include forward/aft rails 303 extending in the X-direction, and lateral rails 304 extending cross-car (Y-direction) between corner radii 324, 334 at the corner portions 314. The split loop rail 306 of the lateral rails 304 includes turnstiles 320, 330 to allow a directional change forming sub-circuits 311 within the circuit 310 as a shorter loops on either side of the split loop rail 306. Although the circuit 310 is formed using corner radii at the forward/rear of the cargo space and corner turnstiles at the split loop rail 306, this is not intended to be limiting and any combinations of corner portions 314 may be used consistent with the spirit of the disclosure. Similar to FIG. 22H, in the example shown in FIG. 22I, the split loop rail 306 may be connected via corner radii 324, 334 instead of turnstiles 320, 330. The drive system of FIG. 22H or 22I may be any suitable drive mechanism, and other systems for moving the CSUs 200 along the circuit 310 are also contemplated. Furthermore, although counterclockwise directions of movement is shown for the circuit 310 and the sub-circuits 311 this is not intended to be limiting, and the CSUs 200 may be moved in a clockwise direction, or optionally in either direction. FIG. 22J, according to another example, the circuit 310 is shown with rails 300, having a dual rail 305 structure of lateral rails 304, extending off of a center rail 301 disposed along the X-direction of the cargo space. Each CSU 200 (numbered) is secured to the lateral rails 304 and movable along the rails 300 via two trolleys to follow the dual rail 305 track to the center rail 301. The lateral rails 304 are connected to the center rail 301 via turnstiles 320, 330 to change direction of the CSUs 200 from the lateral cross-car direction to the forward/aft direction. The turnstiles 320, 330 may be a single turnstile, a pair of turnstiles, or combinations thereof as ased on the mount 204 and trolley 202 design for the CSU. Although the circuit 310 is formed using turnstiles, this is not intended to be limiting and any combinations of corner portions 314 may be used consistent with the spirit of the disclosure. The drive system of FIG. 22J may be any suitable drive mechanism, and other systems for moving the CSUs 200 along the circuit 310 are also contemplated. For example, although not shown in the Figures, the drive system may include pushers for pushing the CSU 200 from the lateral rail 304 toward the center rail 301 and onto the turnstiles 320, 330 for the directional change. Furthermore, although a direction of movement is shown for the circuit 310 this is not intended to be limiting, and the CSUs 200 may be moved in the opposite direction, or optionally in either direction.

Figure 22K:
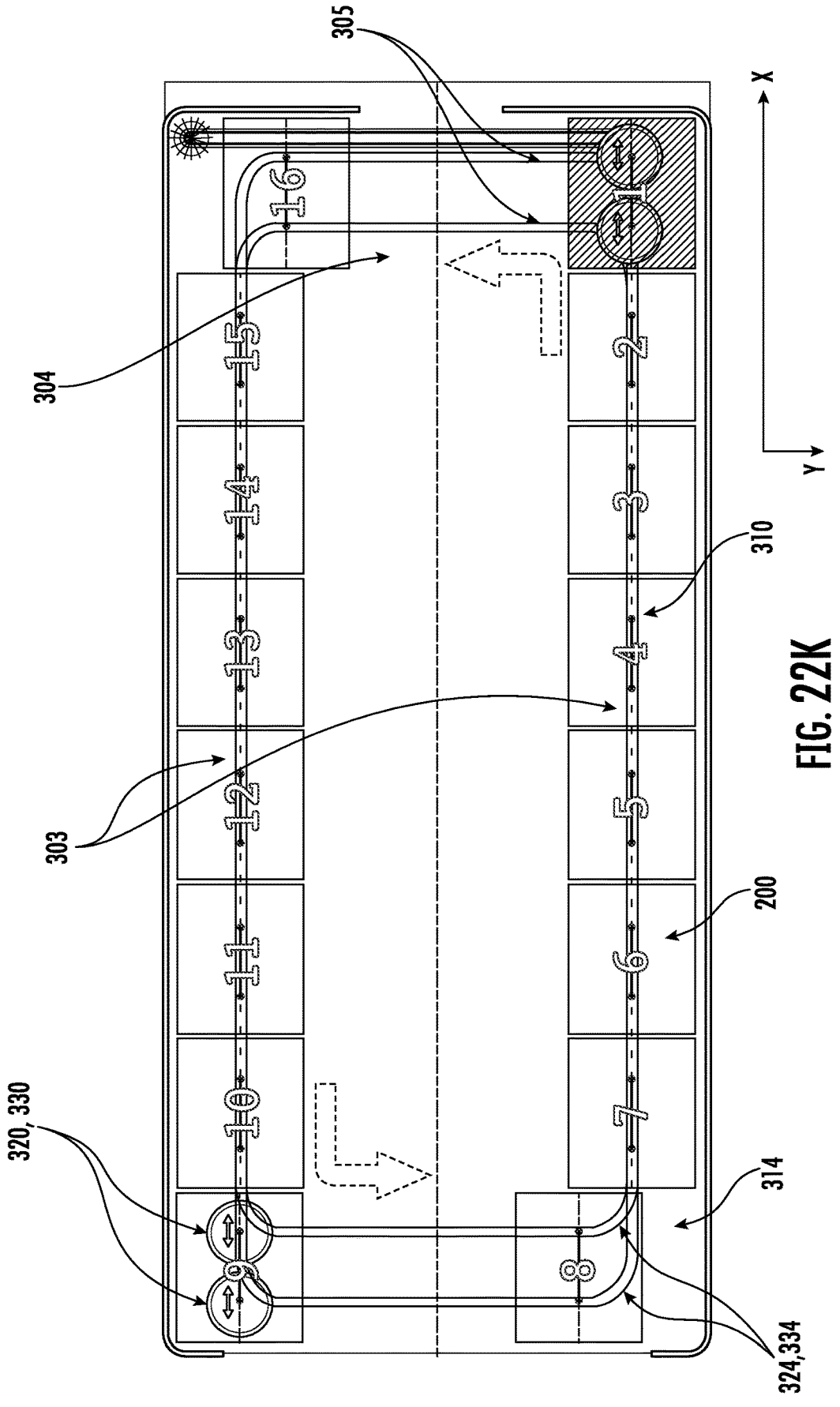
FIG. 22K is a schematic top-view of option 9 of the diagram of FIG. 22A, according to various examples.

Referring to FIG. 22K, according to another example, the circuit 310 is shown for a racetrack type configuration of the rails 300, having a dual rail 305 track. Each CSU 200 (numbered) is secured to the rails 300 via two trolleys to follow the dual rail 305 track. The rails include forward/aft rails 303 extending in the X-direction, and lateral rails 304 extending cross-car (Y-direction) between a pair of corner turnstiles 320, 330 at opposing corner portions 314 (corresponding to a respective trolley on the CSU 200) and corner radii 324, 334 at opposite opposing corner portions 314. Although shown on opposing corner portions 314, the positioning of certain corner portions 314 may be flipped, combined, or swapped as within the variations contemplated by the disclosure. The corner turnstiles 320, 330 change which rails 300 between the forward/aft rails 303 and lateral rails 304 the CSU 200 travels on by aligning the track with the appropriate rail such that the trolleys can continue movement of the CSU in the new direction. The corner radii 324, 334 allow the CSU 200 to slide from the forward/aft rail 303 to the lateral rail 304, and vice versa. Although two turnstiles are shown (based on a dual trolley system), this is not intended to be limiting, and any suitable number of turnstiles (one or more) are contemplated at the corner portions 314 as dependent on the number of rails, the number of trolleys, or combinations thereof. Furthermore, although a counterclockwise direction of movement is shown for the circuit 310, this is not intended to be limiting, and the CSUs 200 may be moved in a clockwise direction, or optionally in either direction.

Figure 22L:
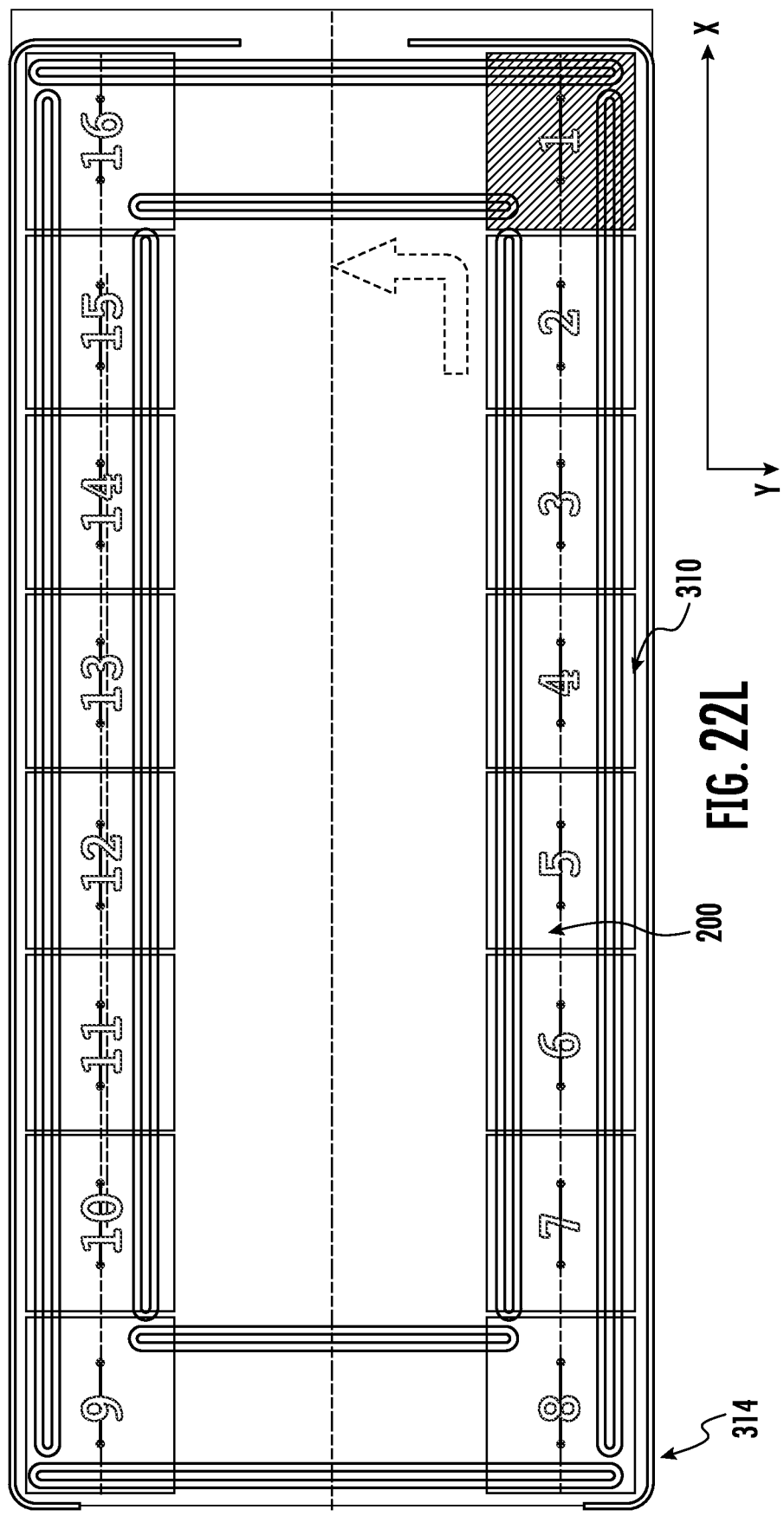
FIG. 22L is a schematic top-view of option 10 of the diagram of FIG. 22A, according to various examples.

In FIG. 22L, according to other embodiments, the CSUs 200 may be moved along the circuit 310 by a belt driven system, with the CSUs 200 riding on the belts (e.g., from above) via belt drive mechanisms for guiding the CSUs 200 along the circuit 310.

Figure 22M:
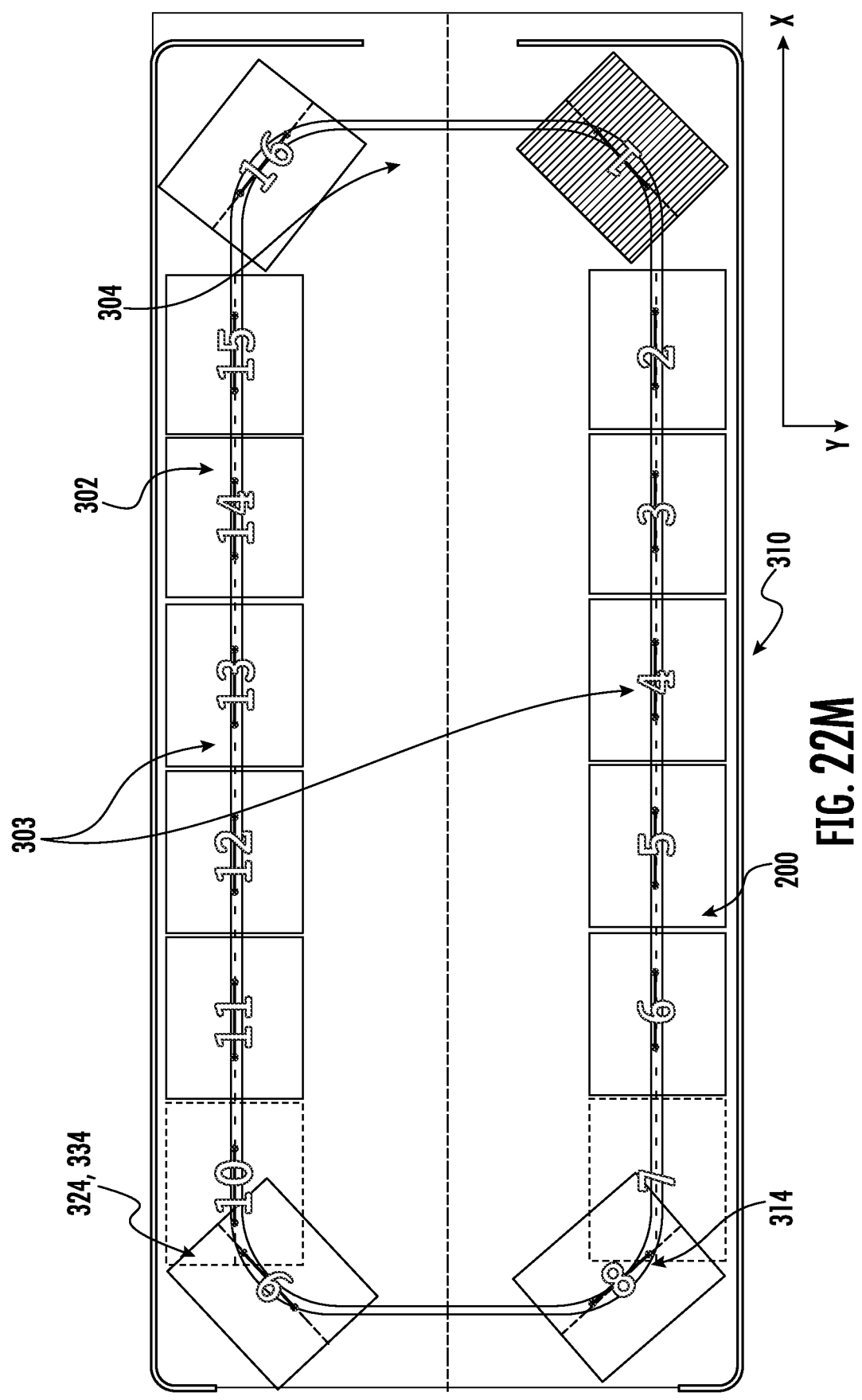
FIG. 22M is a schematic top-view of option 11 of the diagram of FIG. 22A, according to various examples.
Figures 23A, 23B, 23C, 23D:
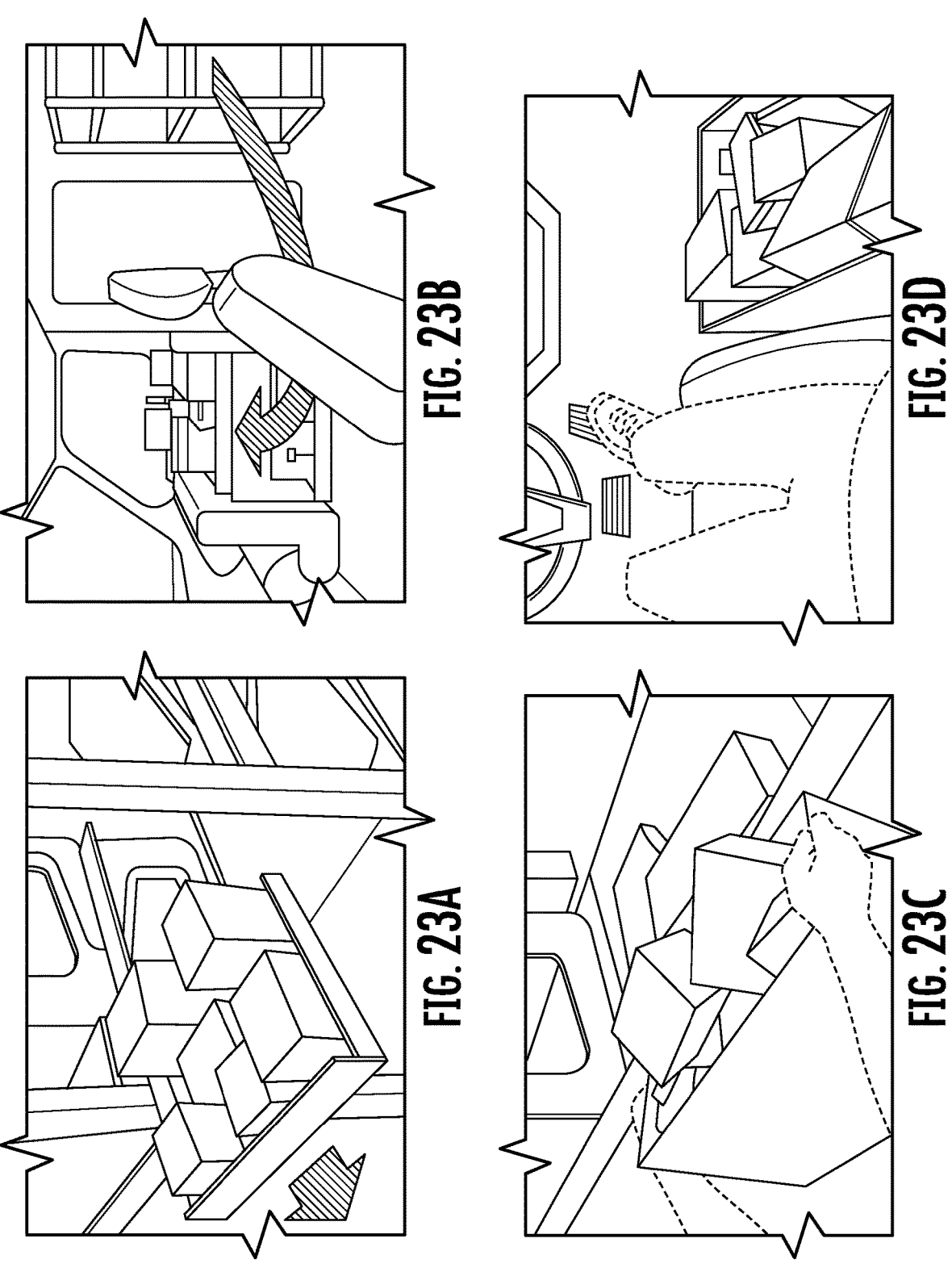
FIGS. 23A-D show examples of trays cooperable with the CSUs, according to one or more embodiments.

In the example shown in FIG. 22M, a monorail 302 single loop system is shown for the rails 300. The CSUs 200 may each mounted to the monorail 302 via dual trolleys, as shown in FIG. 22M. The monorail 302 single loop system includes forward/aft legs 303, and lateral legs 304, with corner radii 324, 334 at the corner portions 334 there between. When traveling along the monorail 302, at the corner portions 314, the CSUs 200 may be at an angle with respect to the walls 105. Furthermore, any direction of movement is contemplated for the circuit 310. The drive system of FIG. 23M may be any suitable drive mechanism, and other systems for moving the CSUs 200 along the circuit 310 are also contemplated, such as, but not limited to, belt drive, linear drive, chain drive, cable drive, and other suitable drive systems based on hydraulics, pneumatics, or a manual drive systems (e.g., pulley).

Figure 14A:
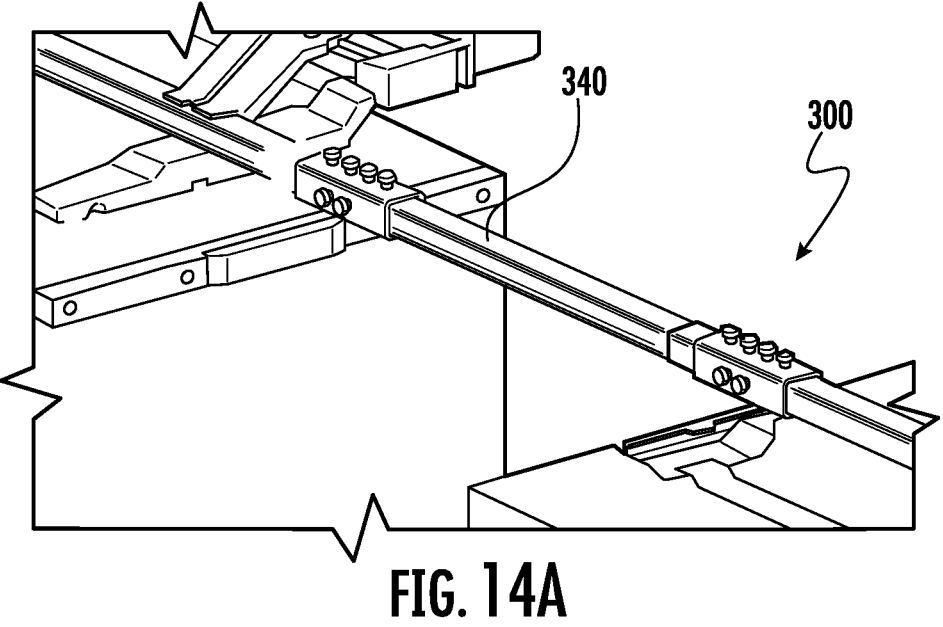
FIGS. 14A-B are schematic diagrams of a removable rail feature, according to one or more embodiments.
Figure 14B:
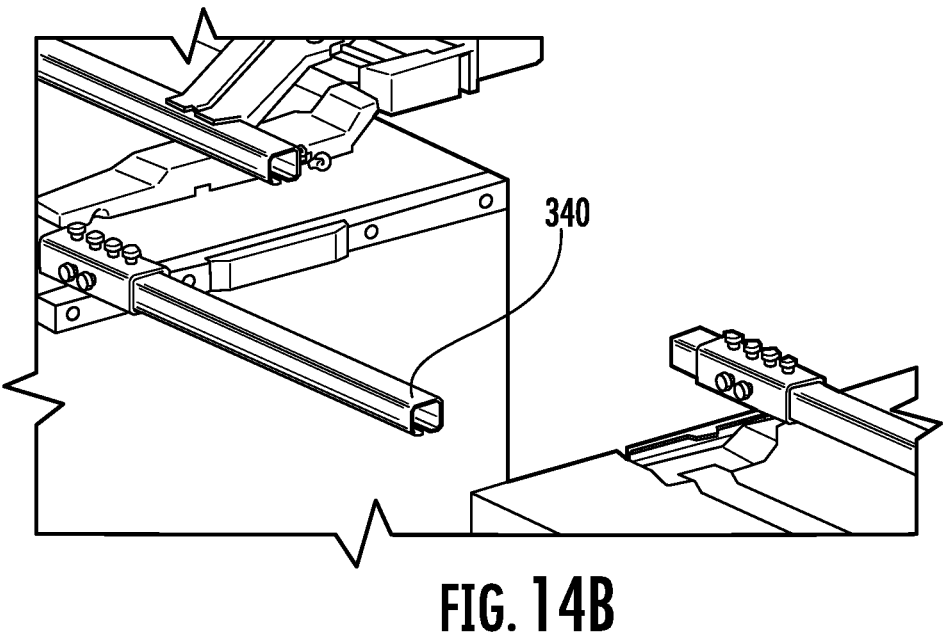

Although described as generally continuous, the rails 300 may include one or more portions 340 which are removable, as shown in FIG. 14, which allow for CSUs 200 to be inserted onto the rails 300 via installation of the trolley 202 on the rail 300 (either with or without the CSU mounted thereon). The portions 340 may be positioned at any suitable point in the rail 300 configuration, including, but not limited to, along the forward/aft rails 303 or the lateral rails 304. The portions 340 may be any suitable length, such as, but not limited to, up to 5 meters in some examples, up to 2.5 meters in other examples, and up to 1.5 m in yet other examples. In further examples, the portions 340 may each be 1 meter in length. The portions 340 may be removable from the rails 300 in any suitable manner, including, but not limited to, by screws securing the portions 340 to the rails 300 to form a continuous track for the trolleys 202 to slide upon for movement of the CSUs 200.

The in-vehicle conveyor system 100 may further include a drive system 600. The drive system 600 may initiate motion of the CSUs 200 and/or of a specified CSU 250 in order to move the CSUs 200 and the specified CSU 250 along the circuit 310 to reach a predetermined location 315 where a driver can access the specified CSU 250. In some embodiments, the drive system 600 may be incorporated with the rails 300 to provide forces to the CSUs 200 at the trolleys 202. In other embodiments, the drive system 600 may be incorporated on the individual CSUs 200 at the trolleys 202 to push the CSU 200 along the rails. The drive system 600 may be a manually driven or power-driven system. In examples where the drive system 600 is a manually driven system, the drive system 600 may include pulleys, or other suitable manually activatable driver, that cooperate to move the CSUs 200 responsive to manual engagement of a line, or may rely on physical manipulation of the CSUs 200 relative to the rails 300, e.g., by pushing the CSUs 200 along the rails 300. In other examples, the drive system 600 may be a power-driven system, which may include motors or other suitable actuators for a power driving mechanisms to activate movement of the CSUs 200 on the rails 300. For example, the power-driven system may include motors and drivers forming a linear driver system, a stepper system, or other suitable mechanism for initiating movement of the CSUs 200 on the rails 300, and may include one or more actuators (e.g., linear actuators or other suitable actuator) for driving the CSUs 200. Generally, the drive units may include lead screws, belt drives, gears, cables, chains, or combinations thereof, which may cooperate with a manual actuator or one or more motors for driving the drive system 600. In at least one embodiment, the drive system 600 may be a combination of a linear belt drive system and a cable driven system.

Referring to FIGS. 21A-J, an example of a drive system 600 for an in-vehicle conveyor system 100 is shown as a linear drive system, with a plurality of linear actuators which push the trolley 202 to move the CSU 200 along the rails 300, according to the circuit 310. Generally, the drive system 600 may be positioned above the rails 300, however this is not intended to be limiting, and in other embodiments, the drive system may be positioned adjacent to the rails or underneath the rails, as based on the configuration of the in-vehicle conveyor system 100 and the position of the CSUs 200. Although an example of a driver system 600 is shown on the rails 300, this is not intended to be limiting, and powering movement of the CSUs 200 on the trolley 202 is also contemplated. As such, the drive system 600 may include one or more linear drive units to move one or more CSUs 200 in one or more directions along the rails 300 as based on the circuit 310. The linear drive units may move a CSU 200 in a cross-vehicle arrangement (i.e., laterally in the Y-direction), fore/aft arrangement (i.e., forward/rear in the X-direction), or towards or out of corner portions 314 (i.e., corner turnstiles, radii, square corners, or other corner mechanism to result in change in direction). The one or more linear drive units may include one or more of, or a plurality of, linear actuators or belt drives, or linear belt drives (for example, stepper linear belt drives). In various embodiments, and as shown in FIG. 21, a linear actuator positioned at the corner portion 314 may have a home position aligning a corner mechanism with a first rail (i.e., a forward/aft rail 303) of the rails 300, and a second position aligning a corner mechanism with a second rail (i.e., a lateral rail 304) of the rails 300, with the first rail and second rail defining different sections of travel along the circuit 310. The linear actuator, when engaged, may extend to activate the corner portions 314 away from the home position (e.g., in embodiments with a turnstile, rotate the turnstile) and/or push CSUs through the corner portion 314. Additionally, in some embodiments, the CSU 200 may incorporate one or more wires that cooperate with the drive system 600 for the drive system to catch and advance the CSU along the system for cross-car transfer (in the lateral direction). As such, the cross-car wire transfer mechanism may operate in the lateral direction, while other drivers may operate in the fore/aft direction, for example, a hook and linear actuator may drive the fore/aft motion in various examples.

Figure 21A:
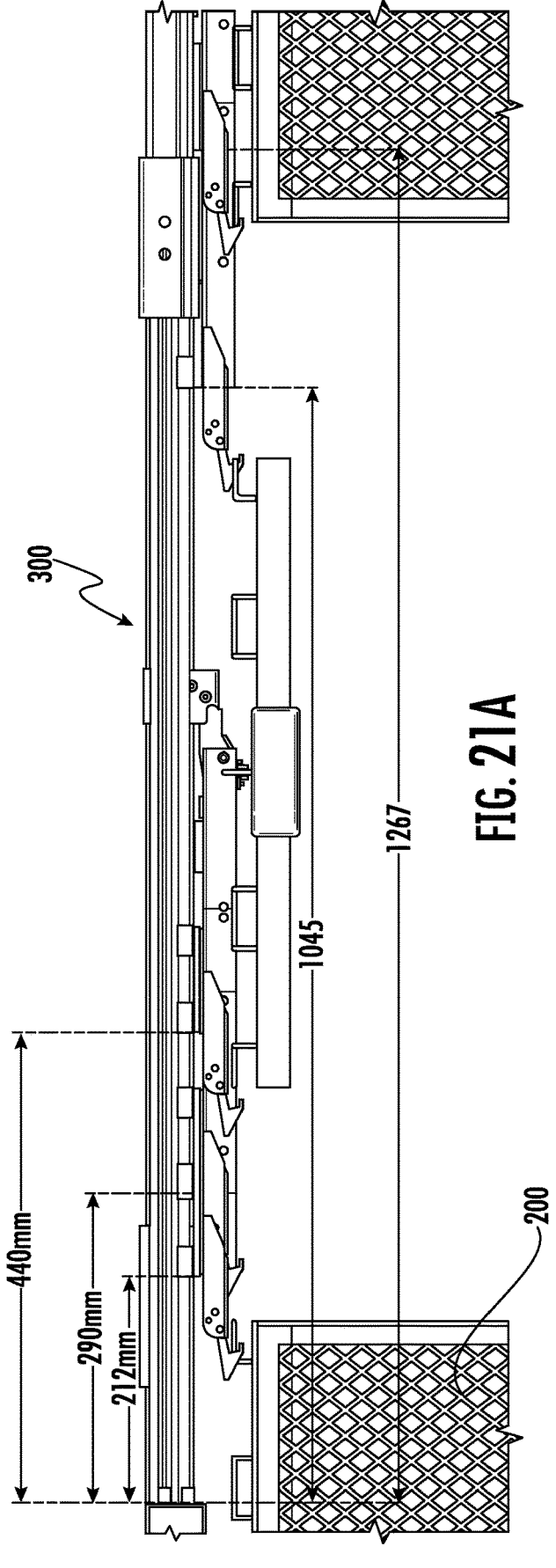
FIG. 21A is a partial schematic diagram of the step position stop points during movement of a CSU along an in-vehicle cargo storage unit conveyor system, according to one or more embodiments.
Figure 21B:
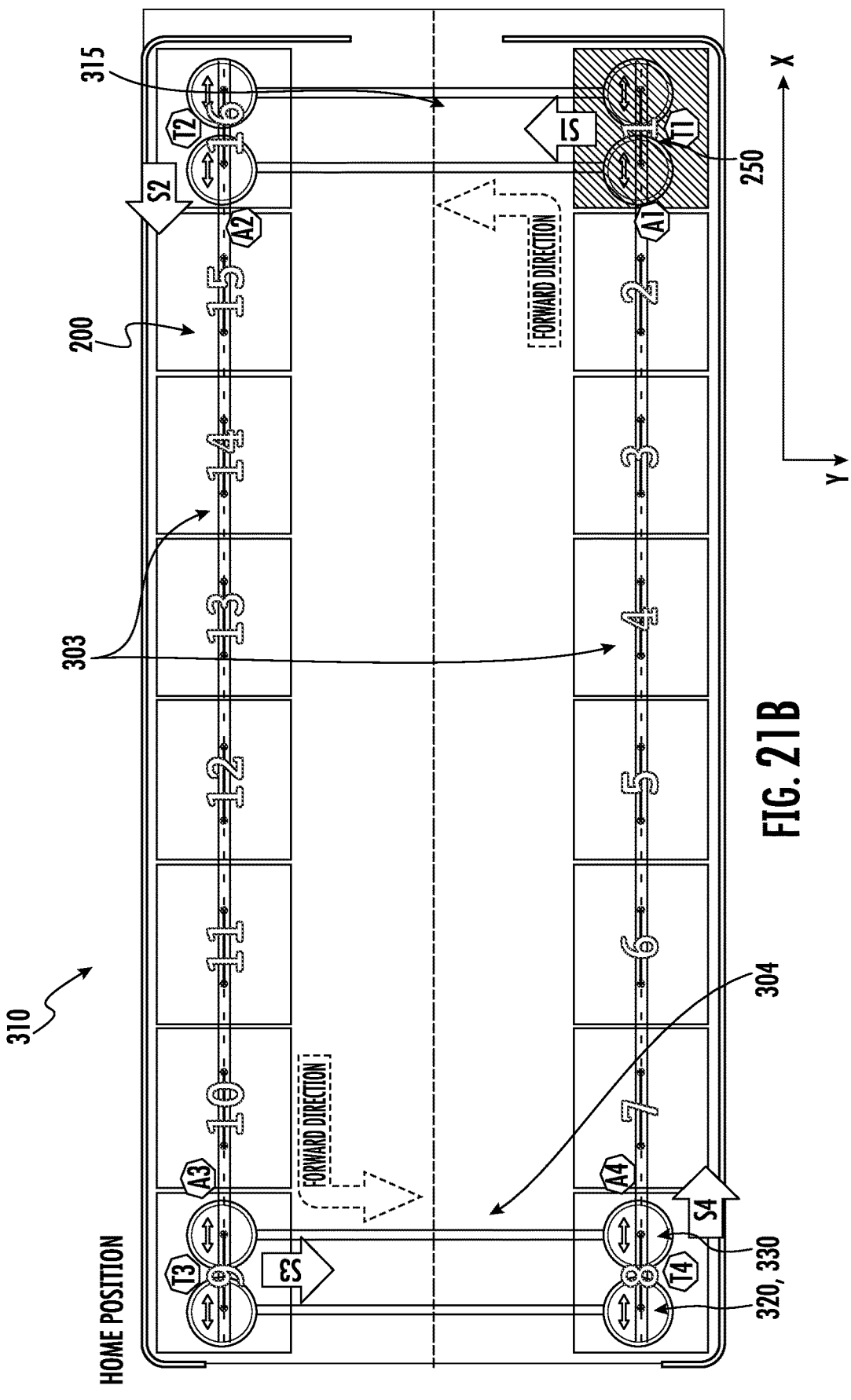
FIG. 21B is a schematic top-view diagram of a home position before CSU movement according to various embodiments.
Figure 21C:
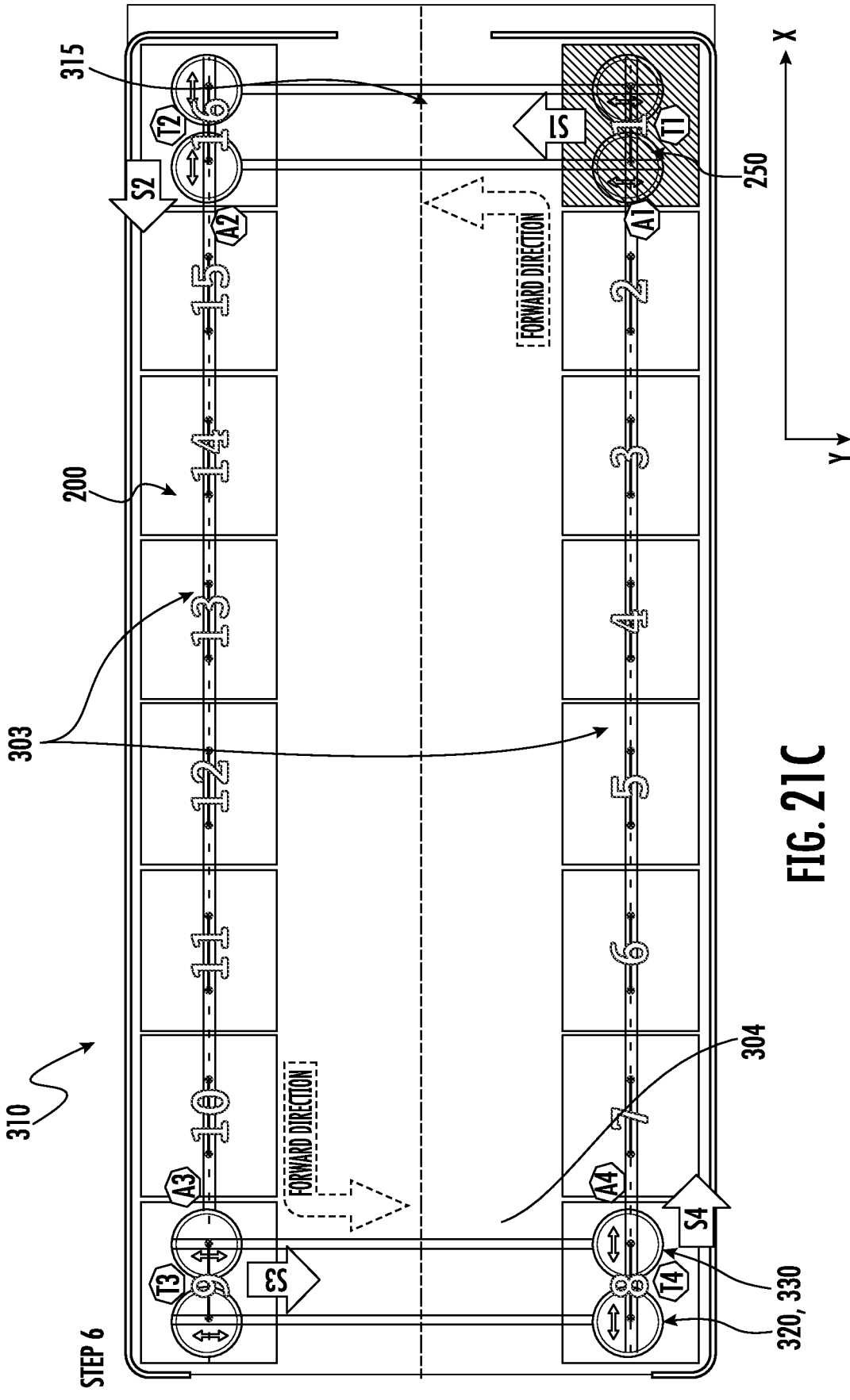
FIG. 21C is a schematic top-view diagram of step 6 in CSU movement, according to one or more embodiments.
Figure 21D:
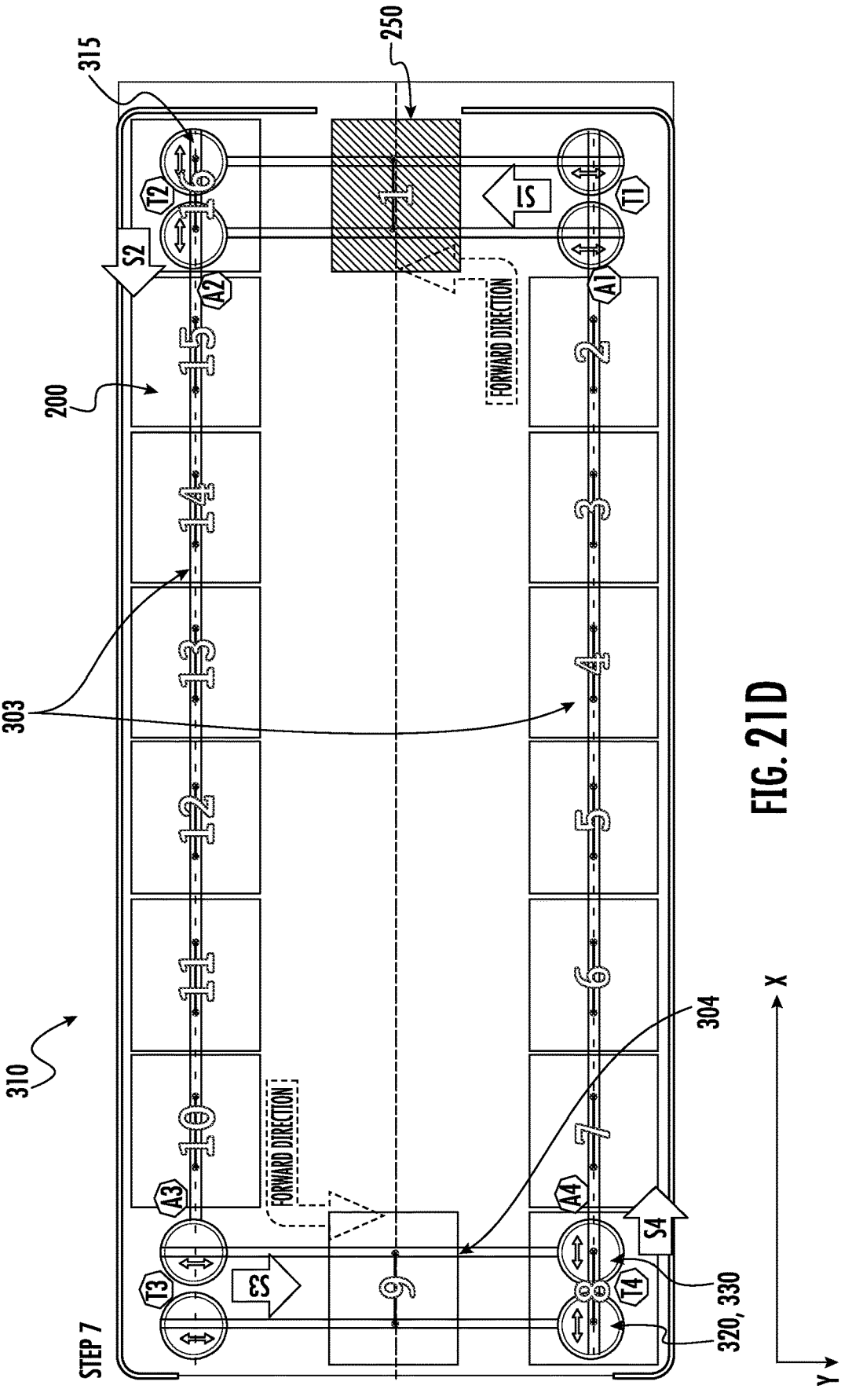
FIG. 21D is a schematic top-view diagram of step 7 in CSU movement, according to one or more embodiments.
Figure 21E:
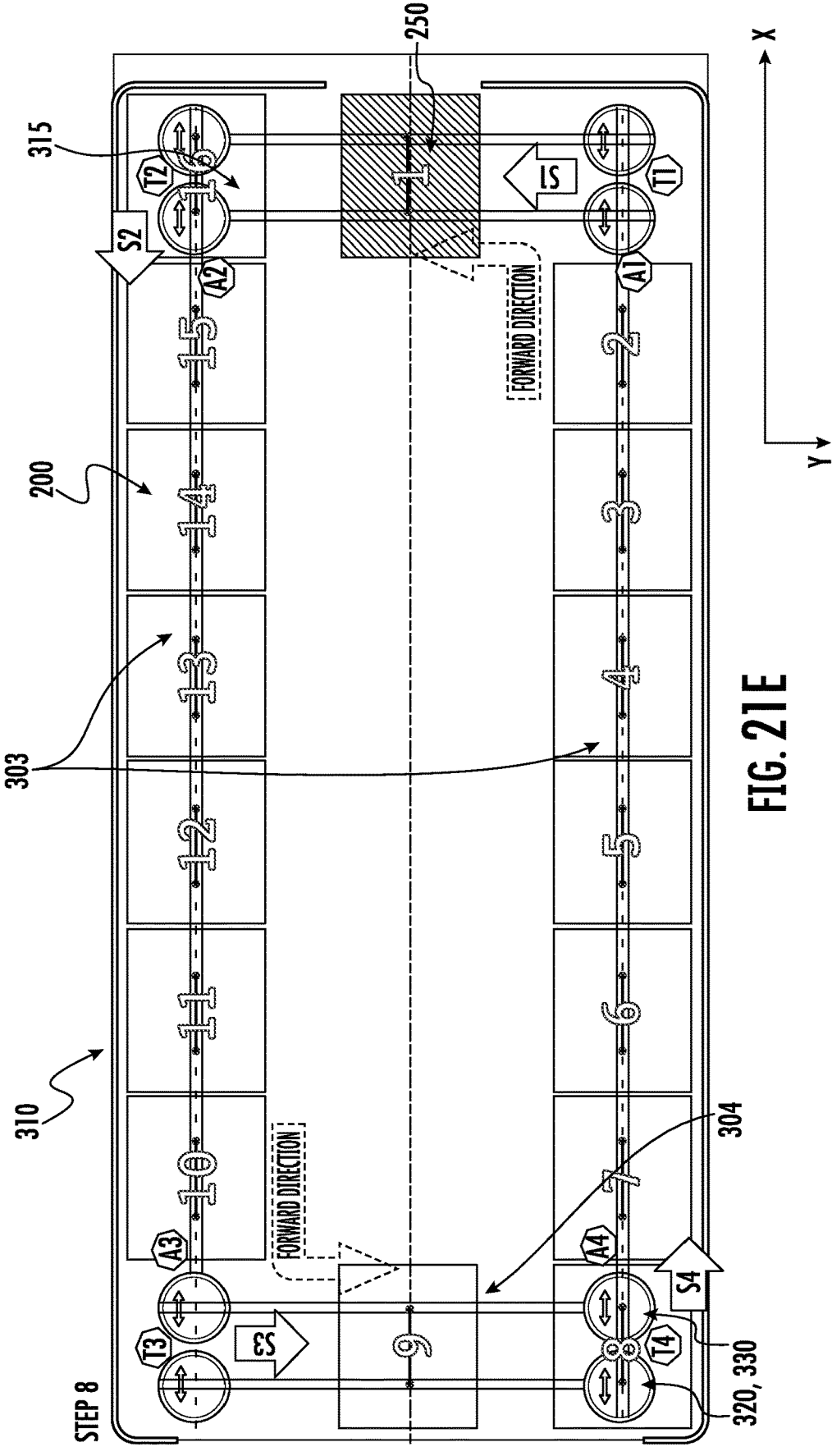
FIG. 21E is a schematic top-view diagram of step 8 in CSU movement, according to one or more embodiments.
Figure 21F:
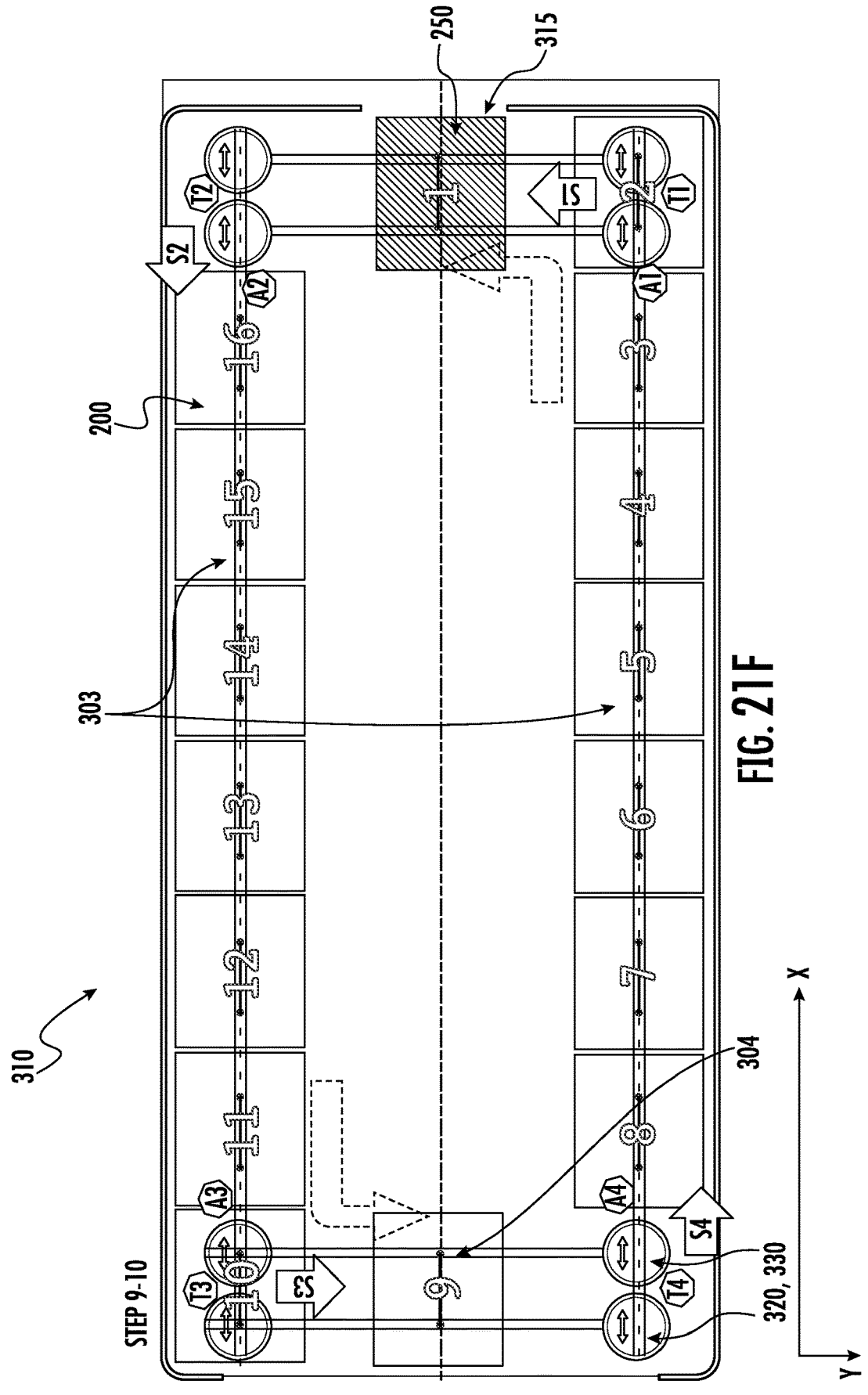
FIG. 21F is a schematic top-view diagram of steps 9-10 in CSU movement, according to one or more embodiments.
Figure 21G:
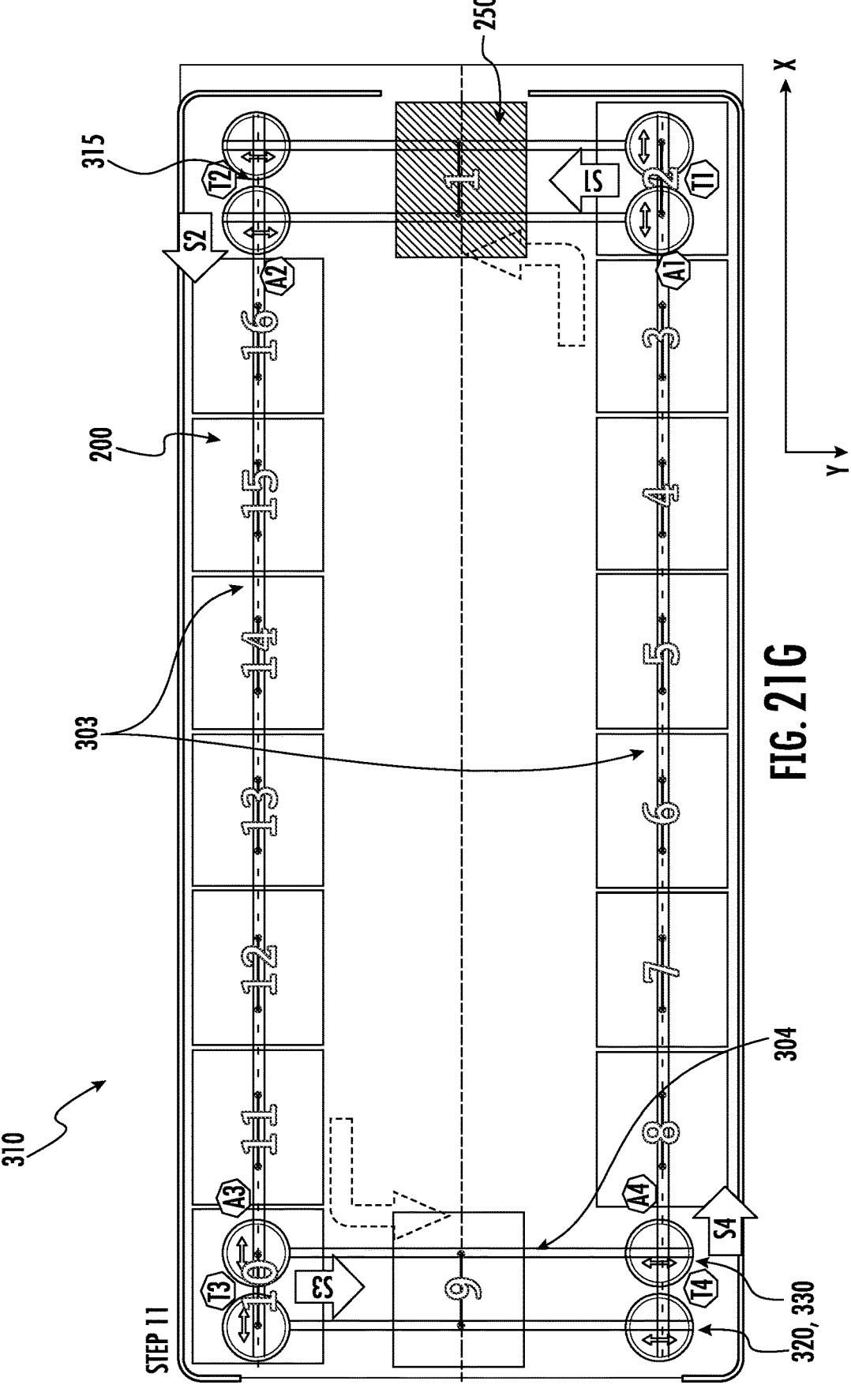
FIG. 21G is a schematic top-view diagram of step 11 in CSU movement, according to one or more embodiments.
Figure 21H:
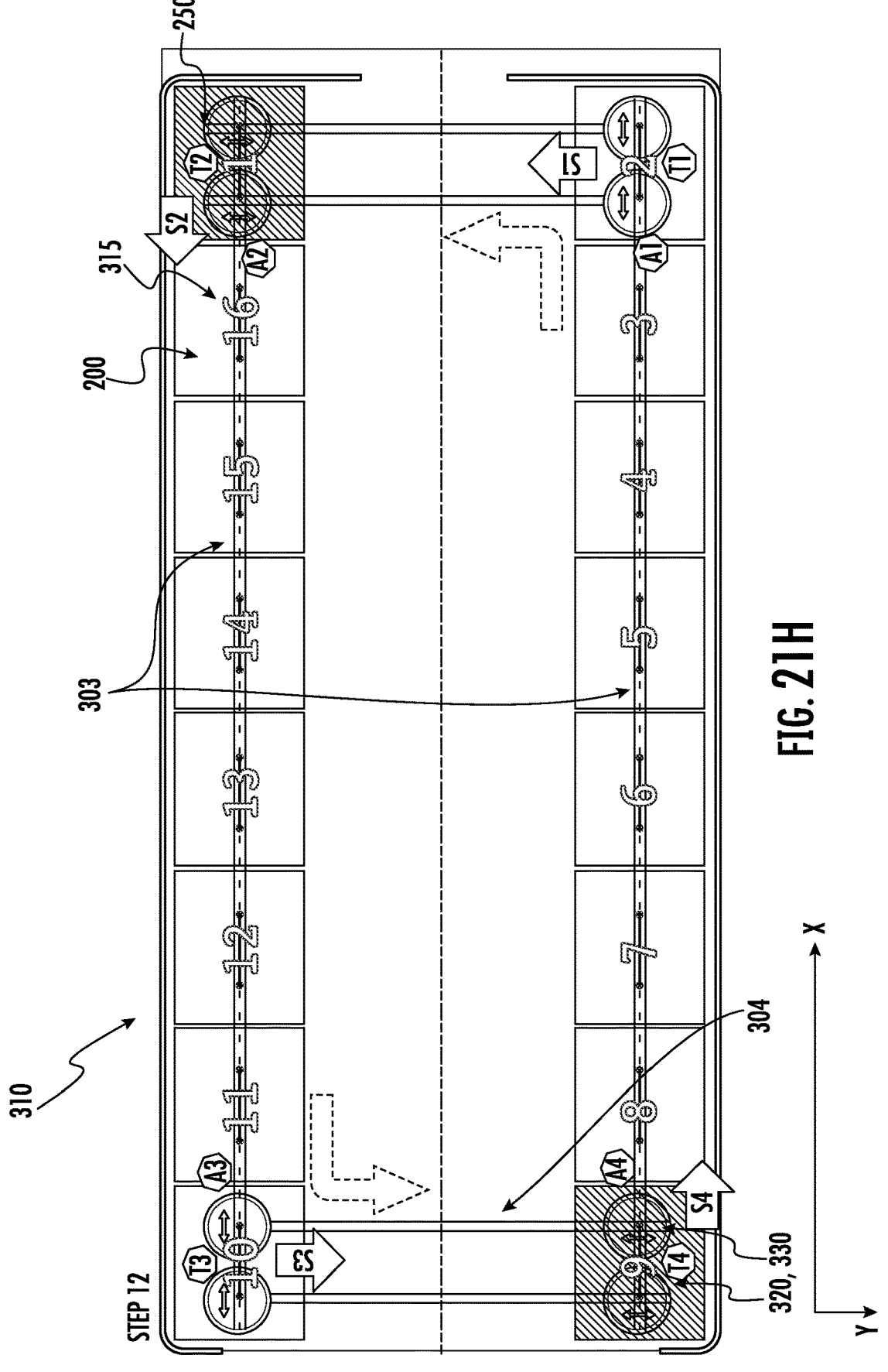
FIG. 21H is a schematic top-view diagram of step 12 in CSU movement, according to one or more embodiments.
Figure 21I:
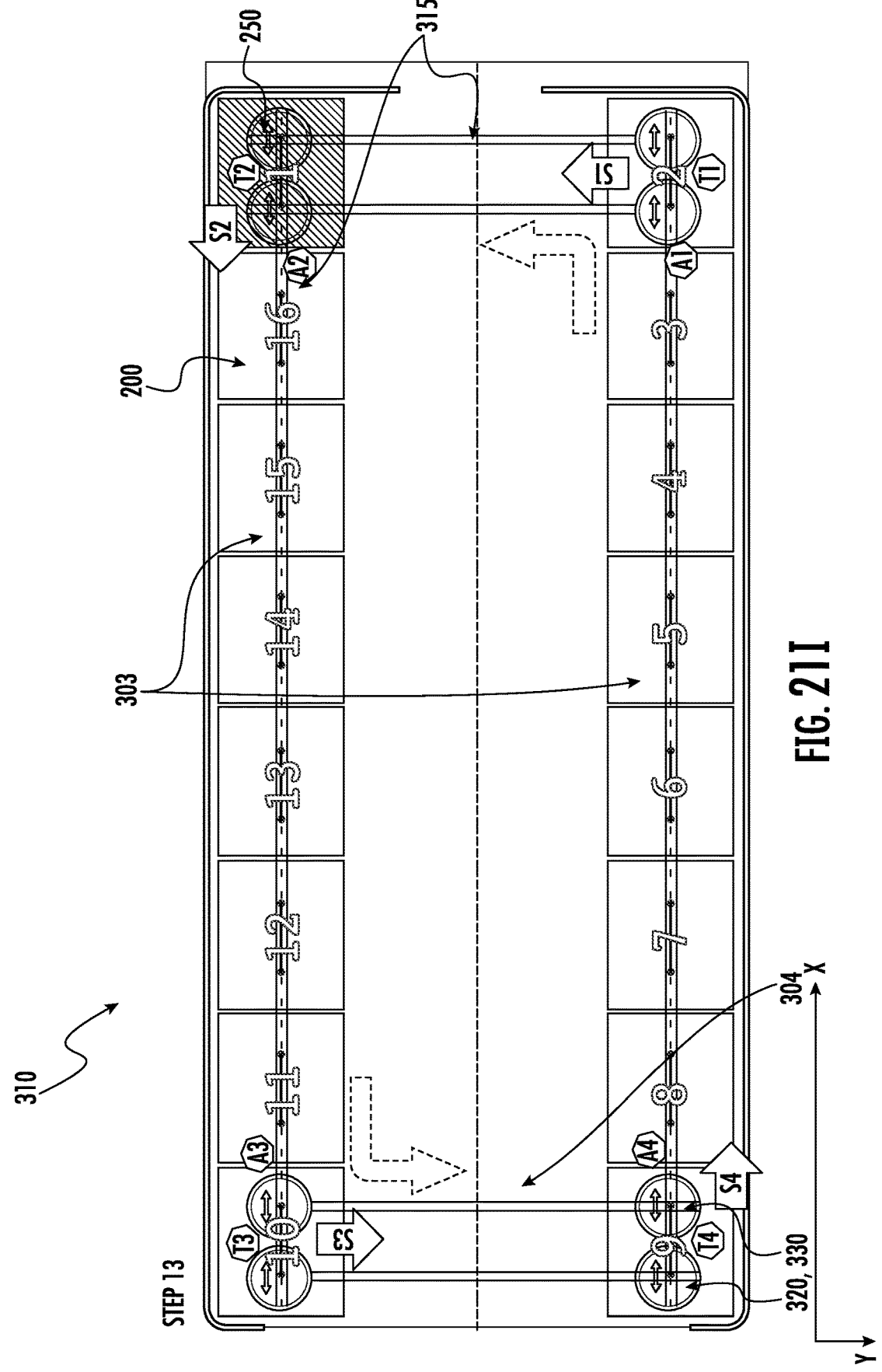
FIG. 21I is a schematic top-view diagram of step 13 in CSU movement, according to one or more embodiments.
Figure 21J:
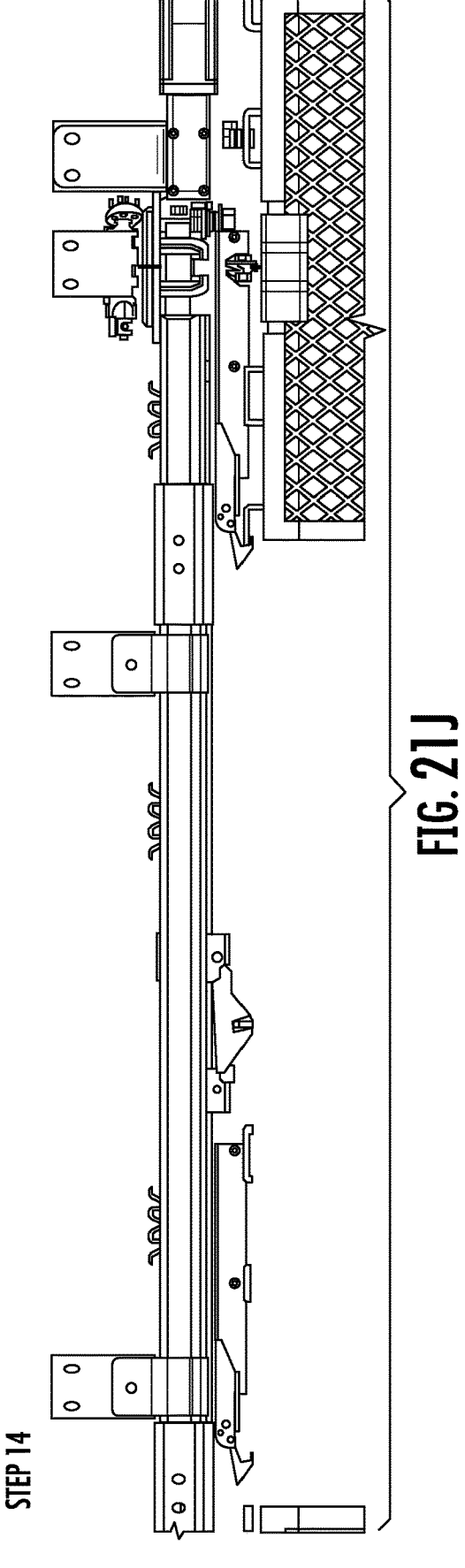
FIG. 21J is a schematic front diagram of steps 14-15 in CSU movement, according to one or more embodiments.

Furthermore, in various embodiments, and in the example shown in FIGS. 21A-J, operation of an example drive system 600 is provided for cross-transfer latching of CSUs, depicting the steps and travel from going latch to latch. The drive system 600 may include linear actuators A1, A2, A3, A4 as well as stepper linear belt drive units S1, S2, S3, S4 that operate to move the CSUs 200 (as numbered as steps in the Figures). Generally, additional or less linear actuators and stepper belt drive units may be contemplated, and replacement actuators or drive units or combinations of actuators of drive units may also be used. The linear actuators A1, A2, A3, A4 are in home position, aligning turnstiles 320, 330 in the fore/aft direction, such that the channels in the turnstiles 320, 330 are aligned with the fore/aft rails 303 (i.e., the Home/Load Position)). At home position (corresponding to steps 1 to 5 of positioning each feature in home position), the stepper linear belt drive S1 is inboard of passenger side CSU #1 and not engaged at start; the stepper linear belt drive S2 is rearward of the driver side CSU #16 and not engaged; the stepper linear belt drive S3 is inboard of driver side CSU #9 and not engaged; and the stepper linear belt drive S4 is at home position forward of driver side CSU #8 and not engaged. Although a particular home position is shown in FIG. 21B, any suitable home position that allows for efficient movement of the CSUs in the system is contemplated. The above positions reflect movement or positioning before operation of the system to move CSUs along the circuit. Furthermore, although described as a sequential movement, the movement may be discrete, and not be sequential, as based on the rail configuration. Furthermore, the CSUs may be moved manually either alone or while the system operates with an automated actuator or cable driven pusher.

At step 6, move 1 is initiated, where linear actuators A1 & A3 extend and then stop. In certain examples, they may operate for 1 or more seconds, 3 or more seconds, or 5 or more seconds. In an example, the linear actuators A1 and A3 extend for 3.5 seconds. Although a timing is provided as an example, the time for each step may generally be coordinated to allow for efficient and/or coordinated movement of the drive system 600 to move the CSUs 200 along the circuit 310, and may vary based on the rating of the actuators or the size of the vehicle, or other consideration, and the discussion of particular times is not intended to be limiting. Turnstiles T1 and T3 of turnstiles 320, 330 rotate 90 degrees from home position to second position, in line with the lateral rails 304. At step 7, moves 2-5 take place, and stepper linear belt drives S1 and S3 are activated to travel outboard to latch with CSUs #1 and #9, and bypasses the latch, followed up reverses direction to pull and engage with the CSU wire to pull and latch with the mid position latches stopping at center until fully latched. In an example, move 2 may be a rearward move from 290 mm Pt H to 212 mm Pt 2 at 50 mm/sec, however, the distance traveled and speed/rate of travel may vary as based on the size of actuators, CSUs, the cargo system, and the vehicle, and discussion of particular movement and speeds is used as only an example. Move 3 may be a forward move from 212 mm Pt 2 to 252 mm Pt 3 at 50 mm/sec, move 4 is also a forward move from 252 mm Pt 3 to 1009 mm Pt 4 at 100 mm/sec until contacting the center latch, and move 5 is a forward move from 1009 mm Pt 4 to 1045 mm Pt 5 at 50 mm/sec until fully latched. At step 8, move 6 takes place, and linear actuators A1 & A3 are retracted and stopped, and the turnstiles T1 and T3 rotate 90 degrees to be inline with the forward/after rails 303. In one or more examples, this step 8 may begin upon the CSU clear the turnstiles 320, 330. Move 6 may be retracting the linear actuators for 3.5 seconds, however other times may be required as based on the configuration and size of the vehicle.

At step 9, stepper linear belt drives S2 and S4 are activated until engaged with CSUs #16 and #8 for move 7. This step 9 may occur more slowly than previous steps, in one or more examples. At step 10, the stepper linear belt drives S2 and S4 move CSUs 8 to 2 and 16 to 10 forward one CSU position, for moves 8 and 9, which also includes holding the centering CSUs 2 & 10 with the turnstiles T1 and T3. In the example being used for the movement, move 7 may be a rearward move from 516 mm Pt h to 423 mm Pt 7 at 100 mm/sec; move 8 may be a forward move from 423 mm Pt 7 to 1000 mm Pt 8 at 100 mm/sec; and move 9 may be a forward move from 1000 mm Pt 8 to 1103 mm Pt 9 at 50 mm/sec, followed by the hold/stop motion.

At step 11, turnstiles T2 and T4 rotate to the cross car position, ready to receive CSUs #1 and #9 at move 10 by linear actuators A2 and A4 retracting. At step 12, the drive unit latches and carries CSUs #1 and #9 cross car to the outside wall aligning with turnstiles T2 and T4, with move 11 being rearward and move 12 being forward. Move 10 may be retracting the linear actuators for 3.5 seconds, however other times may be required as based on the configuration and size of the vehicle. Move 11 includes S1 & S3 moving rearward from 1045 mm Pt 5 to 440 mm Pt 10 at 100 mm/sec, and move 12 includes S1 & S3 move forward from 440 mm Pt 10 to 1267 mm Pt 11 at 50 mm/sec.

At step 13, the turnstiles align for aft direction for the vehicle to complete the move of one set of CSUs via linear actuators A2 and A4 extending for move 13. At step 14, the stepper linear belt drives S1, S2, S3, S4 return to home position (ready to repeat steps for CSU's 2 and 10 cycle), via moves 14 and 15 which move S1 and S3 rearward. Move 13 may be extending the linear actuators for 3.5 seconds, however other times may be required as based on the configuration and size of the vehicle. Move 14 may include S1 & S3 moving rearward from 1267 mm Pt 11 to 290 mm Pt H at 300 mm/sec and move 1 may include S1 & S3 moving rearward from 1267 mm Pt 11 to 290 mm Pt H at 300 mm/sec.

Generally, the speed of movement of each CSU may be based on the drive mechanism used, and in certain examples may vary from 25 mm/sec to up 500 mm/sec or more. The distance traveled and rate of travel may generally vary based on factors such as, but not limited to, vehicle size, number of cargo storage units, length of rails, rating of actuators, and other considerations. Moreover, each step and move may have a different distance of travel and time to complete the step, as based on the size of the CSUs, the geometry of the rails and corner portions, or spacing between the CSUs. The linear actuators and linear drive units described here in may be any suitable linear actuator, such as, but not limited to a two-way actuator for motion of the CSUs in two directions. In various embodiments, the drive units may include one or more actuators, and may include, in certain examples, 4 1 way actuators, 6 2 way actuators, or combinations of 1 way and 2 way actuators. As such, each drive system 600 may include a drive component for actuating movement of the CSUs 200 along the rails 300.

Generally, the CSU 200 is mounted or secured to the rails 300 via one or more trolleys 202. The trolleys 202 may include various features to secure or removably secure the CSU 200 to the rails 300, and the trolleys 202 and/or rails 300 may further include latches, locks, hooks, biased hooks, pins, gear and barrel sets, gear and motor sets, or fasteners to facilitate retention on the rails 300, as well as transfer between rails 300 and corner portions 314 and/or rotaries 324, 334. Examples of features include hooks, channels, or pins which facilitate movement on the rails 300 as well as the corner portions 314.

In one example, as shown in FIG. 10, the mount 204 may cooperate with a trolley 202 via a ball joint that connects the mount 204 with the trolley 202. In the example of FIG. 10, and similar examples where the trolley 202 may swivel via swivel mechanism 205, when the CSU 200 is moving and requiring a change in direction (i.e., to cross-car travel from forward/aft travel), the trolley 202 swivels (e.g., 90 degrees via a channel alignment) to allow the cross car travel, while the ball joint of the mount 204 maintains the CSU 200 at the same orientation while the trolley 202 swivels. FIG. 11 shows another example of a CSU 200, with a mount 204 for affixing to a swivel bearing 299 (not shown in FIG. 11) of the swivel mechanism 205, the mount 204 being secured to the cross-rails 203 cooperating with trolleys 202. The mount 204 of FIG. 11 may optionally include other features (i.e., wires) to allow for transfer or movement of the CSU, as well as for facilitating rotation of the CSU relative to the rails, however in other embodiments, the CSU may be stationary.

In other various examples, as shown in FIGS. 17-20, variations for the trolley 202 and swivel mechanism 205 are shown, along with examples of the mount 204. In the example shown in FIG. 17A, the trolleys 202 are secured to an underbody 275 of the swivel mechanism 205, which is secured to cross rails 203 of the CSU (not shown). The swivel mechanism 205 cooperates with the trolleys 202 and the mount 204, and also includes a transfer plate 295 over the assembly for latching with features of the drive system for travel in the fore/aft or lateral direction.

Figures 17A, 17B:
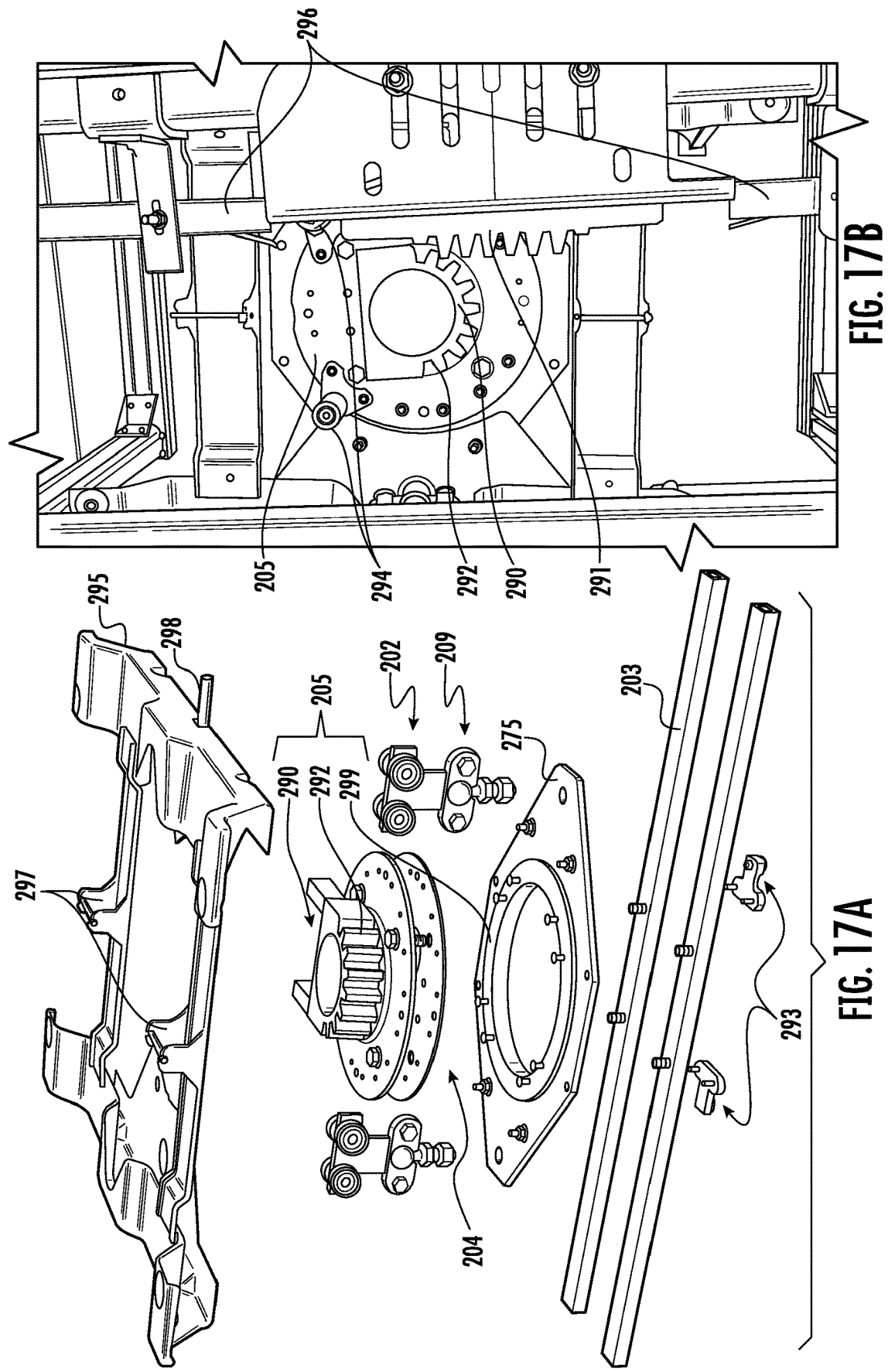
FIG. 17A is an exploded view of a swivel mechanism with a trolley and CSU mount, according to one or more embodiments.
FIG. 17B is a plan view of the swivel mechanism of FIG. 17A with swivel roller guides.

For example, the transfer plate includes fore/aft connectors 297 for fore/aft movement upon latching with the drive system for transfer along the forward/aft rails 303, and a lateral connecter 298 for lateral movement upon latching with the drive system for transfer along the lateral rail 304. The swivel mechanism 205 includes a gear 290 with teeth 292 that allow the orientation of the CSU to rotate when the trolley 202 undergoes a change in direction of travel, while the transfer plate 295 facilitates movement in the direction desired. In various embodiments, the change in direction of travel may be via any other component such as, but not limited to, a corner portion (e.g., a corner turnstile, rotary, or corner radii) as described previously, or a center pin as will be described below, and the description of a transfer plate for changing direction via latching is not intended to be limiting. The swivel mechanism 205 may also include ball stops 293 which can control swivel of the CSU. FIG. 17B shows a plan view of the swivel mechanism 205, including a roller bushing/bearing 294. When the gear 290 hits the rack 291 for the swivel mechanism 205, the CSU is rotated to provide better access to the cargo or to facilitate movement of the CSU to the other side of the vehicle cargo space 102. The roller bushing/bearing 294 rotates into a guide 296 to keep the swivel mechanism 205 from over turning.

Figure 18A:
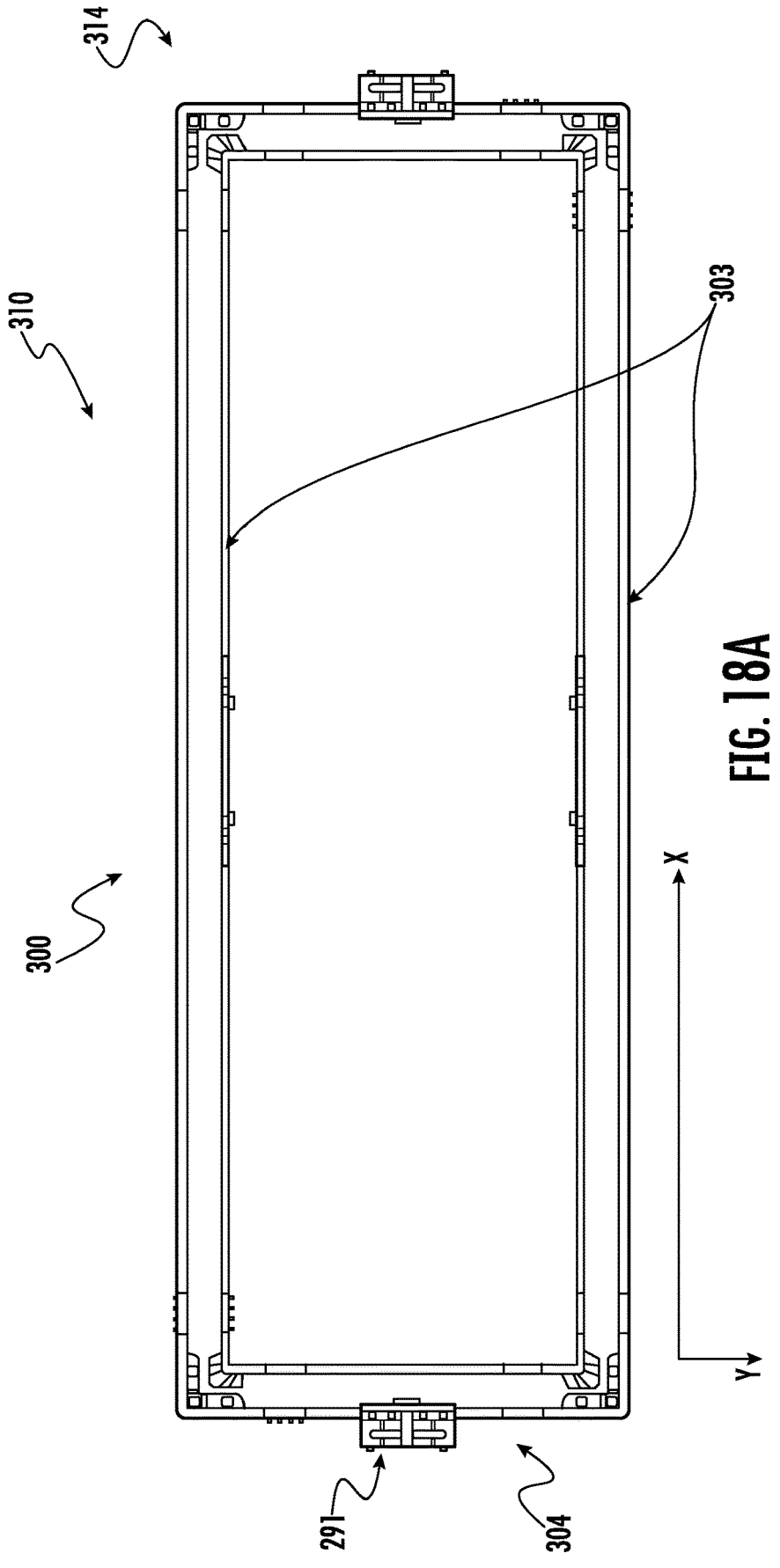
FIG. 18A is a top view of an in-vehicle cargo storage unit conveyer system, according to various embodiments.
Figures 18B, 18C:
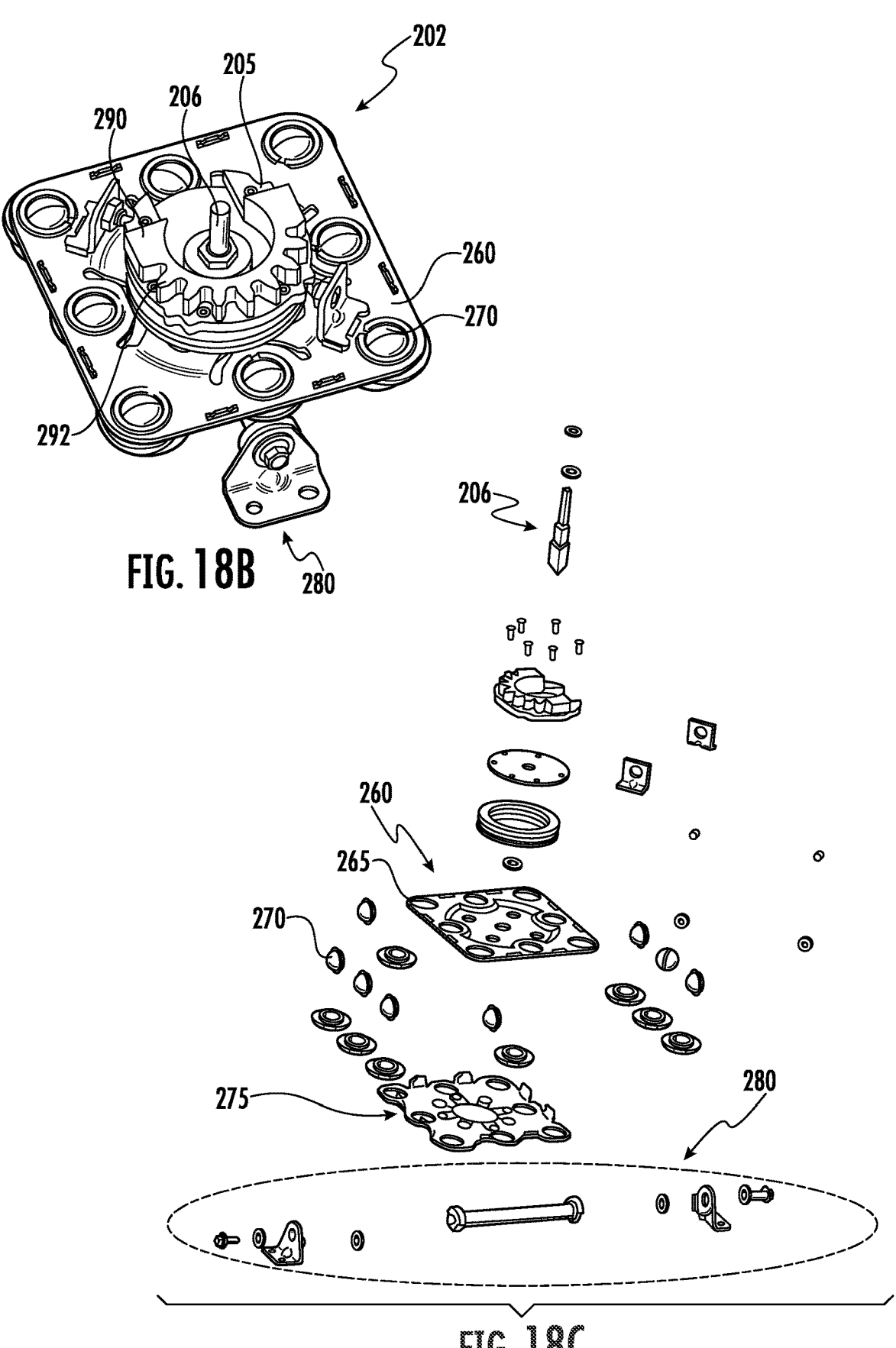
FIG. 18B is a schematic view of a trolley and swivel mechanism according to various embodiments, cooperable with the system of FIG. 18A.
FIG. 18C is an exploded view of the trolley and swivel mechanism of FIG. 18B.

In the other examples shown, for example in FIG. 18B, another example for the trolley 202 is shown. The trolley 202 may include a plate 260 with one or more openings 265 defined therein. Although depicted as a plate 260, other structural bodies are contemplated, and a plate is not intended to be limiting. Furthermore, although shown as a generally square plate, the plate may be any suitable shape as based on engagement with the rails, and depiction of a square plate is not intended to be limiting. The trolley 202 also includes bearings 270 disposed in the openings, and supported by the underbody 275 of the swivel mechanism 205 to allow movement of the trolley 202 along the rails 300 while cooperating with the swivel mechanism 205. Thus, although a plate with bearings is shown in FIG. 18B, other trolleys 202 are also contemplated, that would allow for the trolley 202 to translate along the rails 300 in one or more directions (e.g., wheels), and depiction of a bearing system is not intended to be limiting. A center pin 206 extends through plate 260 and the underbody 275 and attaches to the connector 280 to support and swivel the CSU 200. In certain embodiments, the center pin 206 may also facilitate holding together the features of the trolley 202, and secure the trolley 202 with the swivel mechanism 205. In the embodiments of FIGS. 18B, 19B, 19C, and 20B, the swivel mechanism 205 and/or trolley 202 may cooperate with a center pin 206 which facilitates transfer between fore/aft rails and lateral rails, and allows for change in direction of movement of the CSU, while also rotating the CSU. Thus, the center pin 206 allows for CSU rotation, while the trolley orientation remains the same. The trolley 202 in various embodiments, such as those shown in FIGS. 18B, 19B, and 20B, further includes a connector 280 for securing the trolley 202 to the CSU 200 or mount 204, with the connector 280 including any suitable fasteners cooperable with a surface or feature on the CSU to secure the CSU 200 to the trolley 202. For example, where the connector 280 includes a bar, the CSU 200 may be hooked or clasped onto the bar. In other embodiments, the bar of the connector 280 may cooperate with the CSU when the swivel mechanism 205 turns the orientation during a change in direction of travel, as will be discussed with reference to FIGS. 19A-D. For example, the swivel mechanism may turn the bar of the connector 280 such that the CSU rotates relative to the trolley 202.

In a further example, as shown in FIGS. 18A-C, the trolley 202 may include a gear 290 on either side of the plate 260 and underbody 275, such that the gear 290 can engage mechanisms on the rails to retain the CSU in a position, or facilitate rotation of the CSU 200 at various parts of the rails 300. The gear 290 may work with the rails via any suitable gear arrangement, such as, but not limited to, a worm and ring gear, a motor and gear set, a stepper motor gear, a back drive motor and gear, or other suitable feature. Furthermore, the gear 290 may include a plurality of teeth 292, corresponding to stop positions for the CSU 200 about a vertical axis of rotation. Although gears are disclosed herein, other mechanisms are also contemplated in order to provide further control on the rotation of the trolley with respect to the rails 300.

Figure 19A:
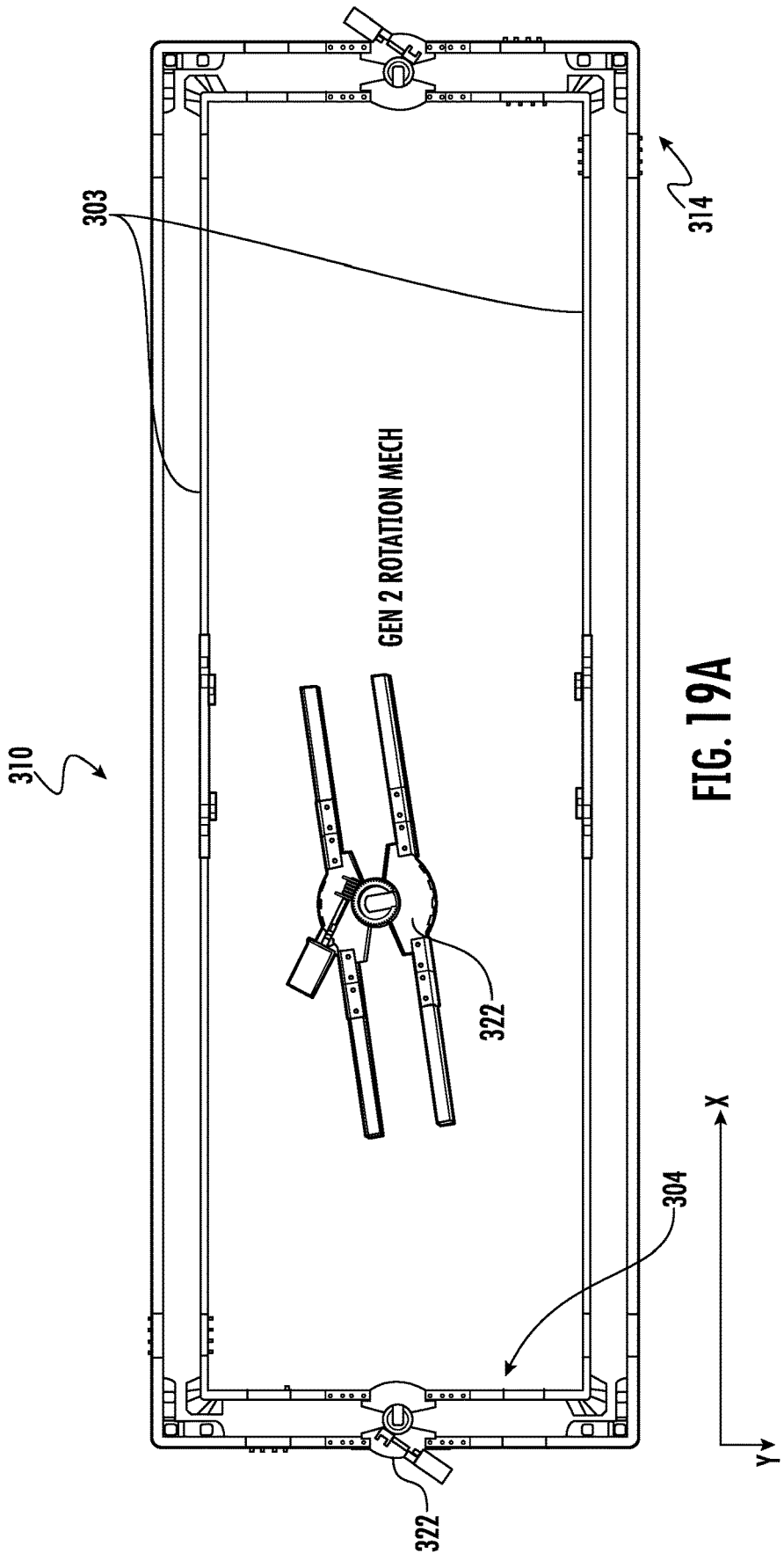
FIG. 19A is a top view of an in-vehicle cargo storage unit conveyer system with a power swivel drive, according to one or more embodiments.
Figures 19B, 19C, 19D:
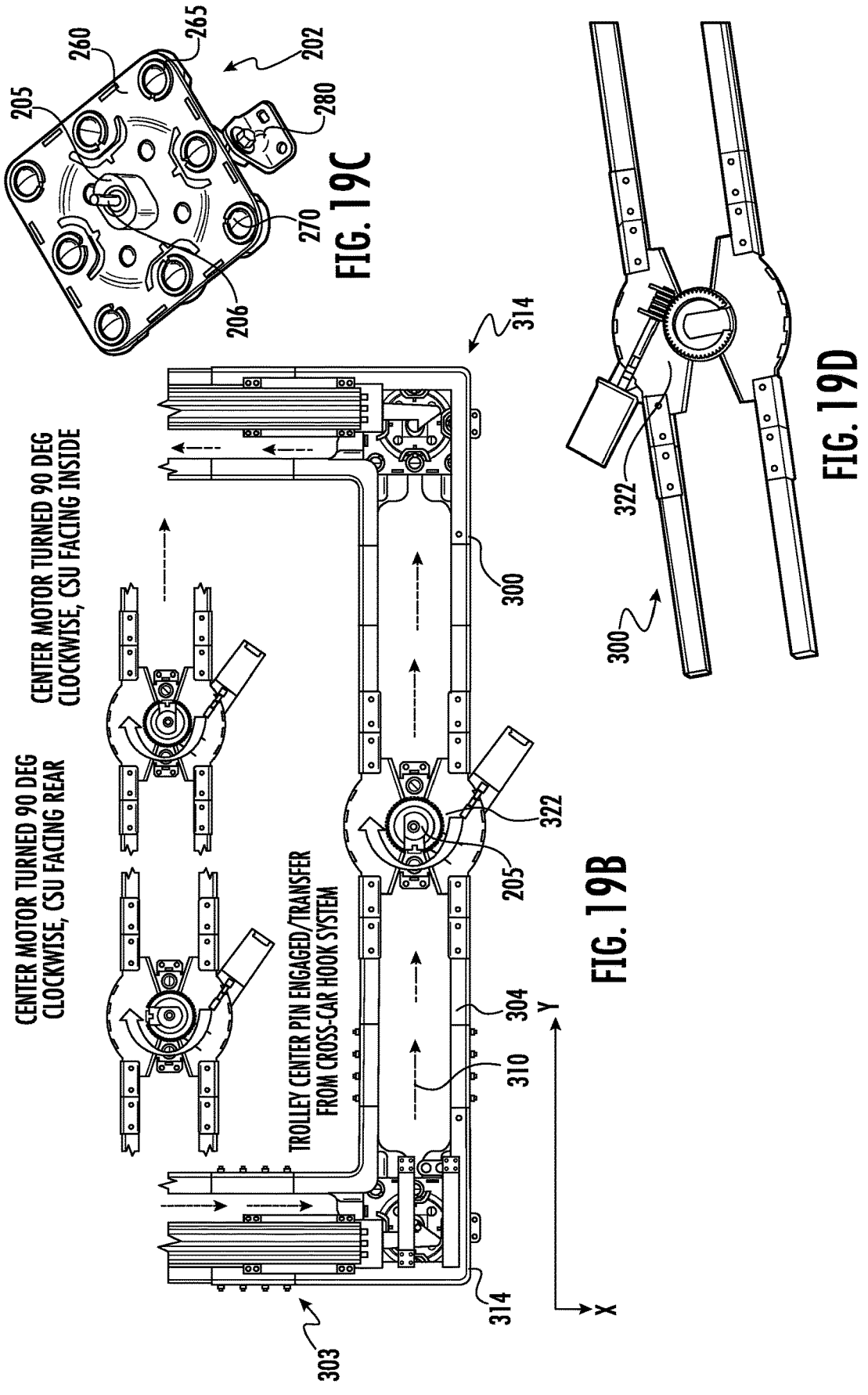
FIG. 19B is an enlarged partial view of the in-vehicle cargo storage unit conveyer system of FIG. 19A, having a rotation mechanism for a trolley and swivel mechanism according to various embodiments.
FIG. 19C is a perspective view of the trolley and swivel mechanism shown in of FIG. 19B.
FIG. 19D is a perspective view of the rotation mechanism of FIG. 19B.
Figures 20A, 20B:
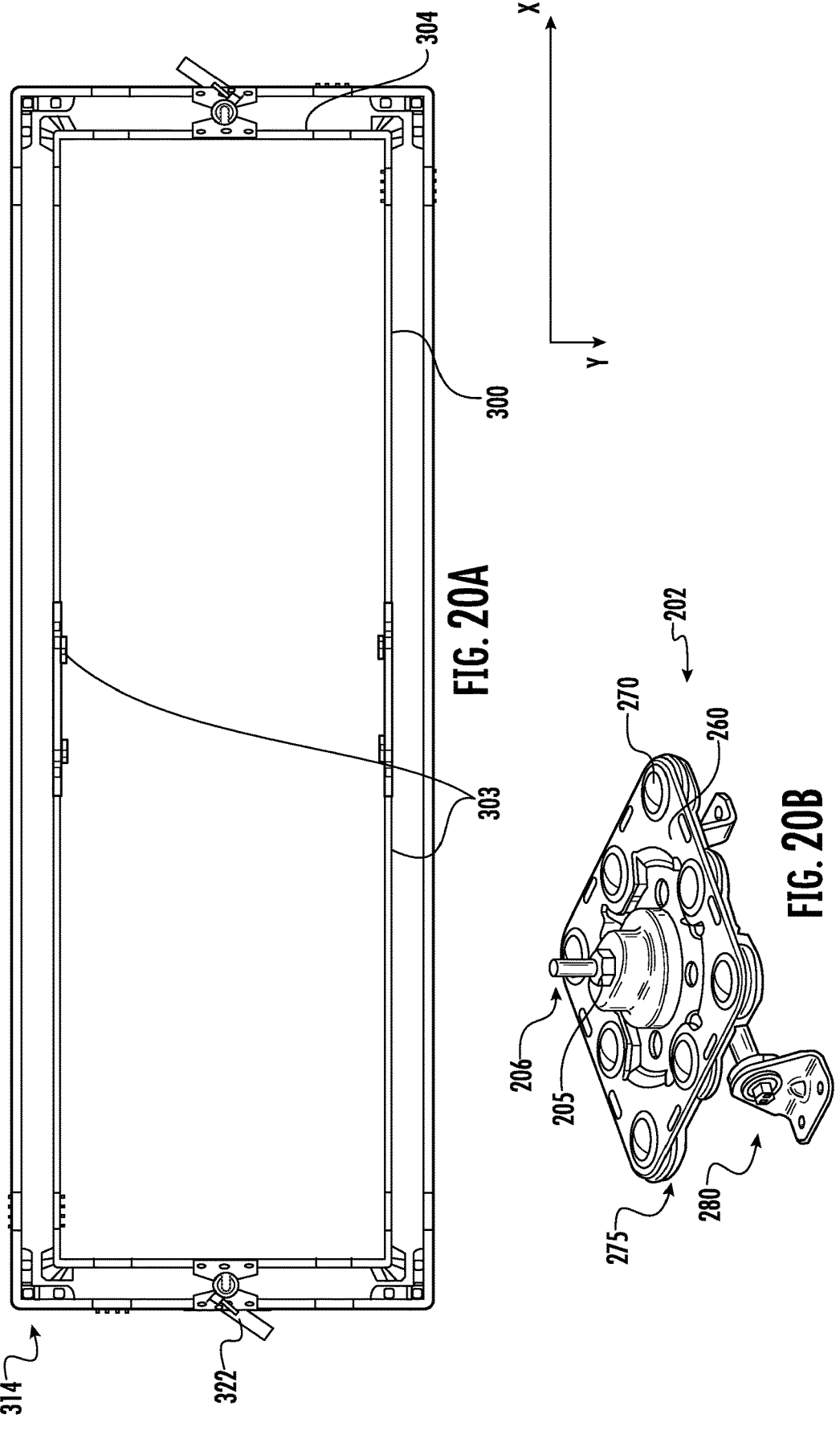
FIG. 20A is a top-view of an in-vehicle cargo storage unit conveyer system, according to various embodiments.
FIG. 20B is a perspective view of a trolley and swivel mechanism, according to various embodiments, cooperable with the system of FIG. 20A.

Referring again to FIGS. 19A-D, the rotation of the CSU along the rails 300 may be along the lateral rails 304, which include rotation mechanism (e.g., a rotary 322) for changing the orientation of the CSU. The rotary 322 may have a similar construction to a turnstile 320 in some embodiments (not shown), which have channels for the bearings to travel along, which align with the trolley 202 in a first direction, and upon rotation of the trolley 202 within the rotary 322, the trolley 202 is in a different orientation such that the bearings are repositioned, and the trolley 202 can continue along the rails 300 while the CSU is also rotated. However, in various examples, as shown in FIGS. 19A-D, the swivel mechanism 205 is shown as a power swivel mechanism, and may allow for the CSU to rotate without rotation of the orientation of the trolley 202. Thus, as shown in FIG. 19B, the rotary 322 disposed along the lateral rails 304 allow for rotation of the CSU via the swivel mechanism 205, while the trolley 202 remains oriented in the rails 300 for travel. In the example shown in FIG. 19B, a center motor turns the swivel mechanism 205 to change the orientation of the CSU 90 degrees or 180 degrees as based on the direction of rotation for the rotary 322. Additionally, when the trolley 202 is in the corner portion 314, the center pin 206 allows for transfer between hooks from the fore/aft rail 303 and the lateral rail 304 to allow for cross-car transfer toward the rotary 322 along the circuit 310. The trolley 202 includes the center pin 206 for engagement with hooks (not shown) at corner portions 314 in order to change directional movement of the trolley 202 along the rails 300, and more particularly, retain the trolley 202 on the appropriate directional rail for travel. Although shown as a pin and hook arrangement, the features may be swapped between the rails and trolley, and other features may be used in order for the trolley to engage the rails when traveling in a first direction, and engage other rails when travelling in a different direction from the first. Furthermore, although counterclockwise directions of movement is shown for the circuit 310 and the sub-circuits 311 this is not intended to be limiting, and the CSUs 200 may be moved in a clockwise direction, counterclockwise, or optionally in either direction.

The in-vehicle conveyor system 100 and CSUs 200 may further each or both include various electronics to facilitate cargo management, including, but not limited to, lighting, lasers, or other indicators for flagging specified CSU 250 within the cargo space 102 for ease of identification. In certain examples, the system may include lasers for tracing CSU 200s and circuits 310 along the floor 101. Furthermore, the rails 300 may be electrified or otherwise conductive to provide power to the CSUs 200. In some embodiments, the power may support climate control systems on the CSUs 200, in addition to lighting, sensors, scanners, or other suitable mechanisms that facilitate operation of the in-vehicle conveyor system 100 and organization of the CSUs 200. In other variations, the CSUs 200 may include a power supply thereon (e.g., a battery) to support climate control systems on the CSUs, indicators, or other features including motors or drivers for moving the CSUs 200 around the circuit 310.

For example, in embodiments having indicators, the indicators, such as lights, may facilitate identification of a CSU 200 by the driver, as based on an upcoming delivery stop. In certain embodiments, the indicators may be on each CSU 200 itself, on the rails 300 adjacent to the specified CSU 250, and/or may be on a control panel showing which CSU 200 is the specified CSU 250. Upon activation of the indicator (e.g., illumination of the light), the driver may recall the specified CSU 250 to the predetermined location 315. In other embodiments, upon activation of the indicator, the driver may enter the cargo space 102 and approach the specified CSU 250 for access to cargo thereon. In further examples, the indicators may lead the driver by illuminating a path to the specified CSU 250.

Figure 24:
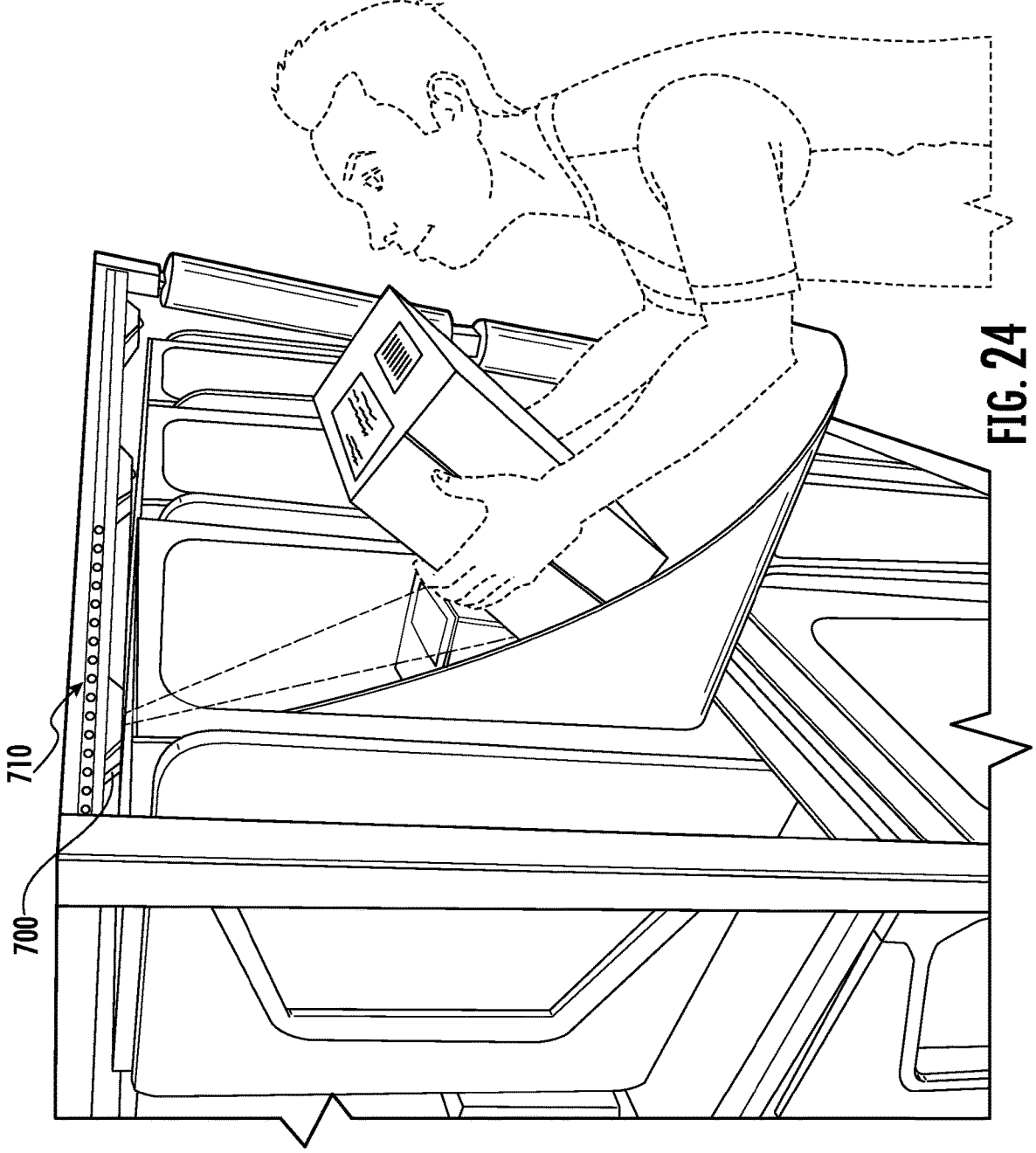
FIGS. 24-25 shows schematic illustrations of various examples of accessories cooperable with the CSUs, according to various embodiments.

Each of the CSUs 200 may further include features to facilitate access to packages or identification of packages. For example, non-limiting and combinable examples include lighting within the CSUs 200, retractable or removable covers to restrict access to the CSUs when the covers are deployed, modular shelving and walls constructing the CSU, or extending trays that may slide out from the CSU 200 to allow easier access to packages stored in the package cavity associated with the shelf in which the tray corresponds. The trays may be removable or fixed with the shelving, and may allow the driver to remove one or more packages more easily via access on the tray. For example, the driver may remove the tray from the CSU and take the tray to the driver cabin so the driver does not need to return to the CSU for retrieving packages that are queued for delivery on a particular street or in a particular zone. The trays may be expandable to form a bin, or may cooperate with a bin for the driver to fill packages therein from the CSU. FIGS. 23A-D show examples of the trays that can be used along with the CSUs. In the example shown in FIG. 24, the CSU may include a scanner 700 mounted on the CSU shelves to scan packages as the driver loads or unloads the package. The CSU may include a deployable tray which extends the shelf when in a deployed state, and provides a cover for the CSU package cavity when in the retracted state. Further, indicators 710 (e.g., lights) may be incorporated on the CSUs in order to facilitate package identification by the driver, as shown in the example of FIG. 24. For example, after a CSU is recalled to the predetermined location, the indicators 710 corresponding to a package cavity or shelf in the CSU may be in an activated state in order to help the driver identify packages associated with the delivery location or stop. Indicators for other package cavities or shelves may remain inactive during the time which the indicators 710 corresponding to the package cavity or shelf in the CSU are activated.

Figure 25:
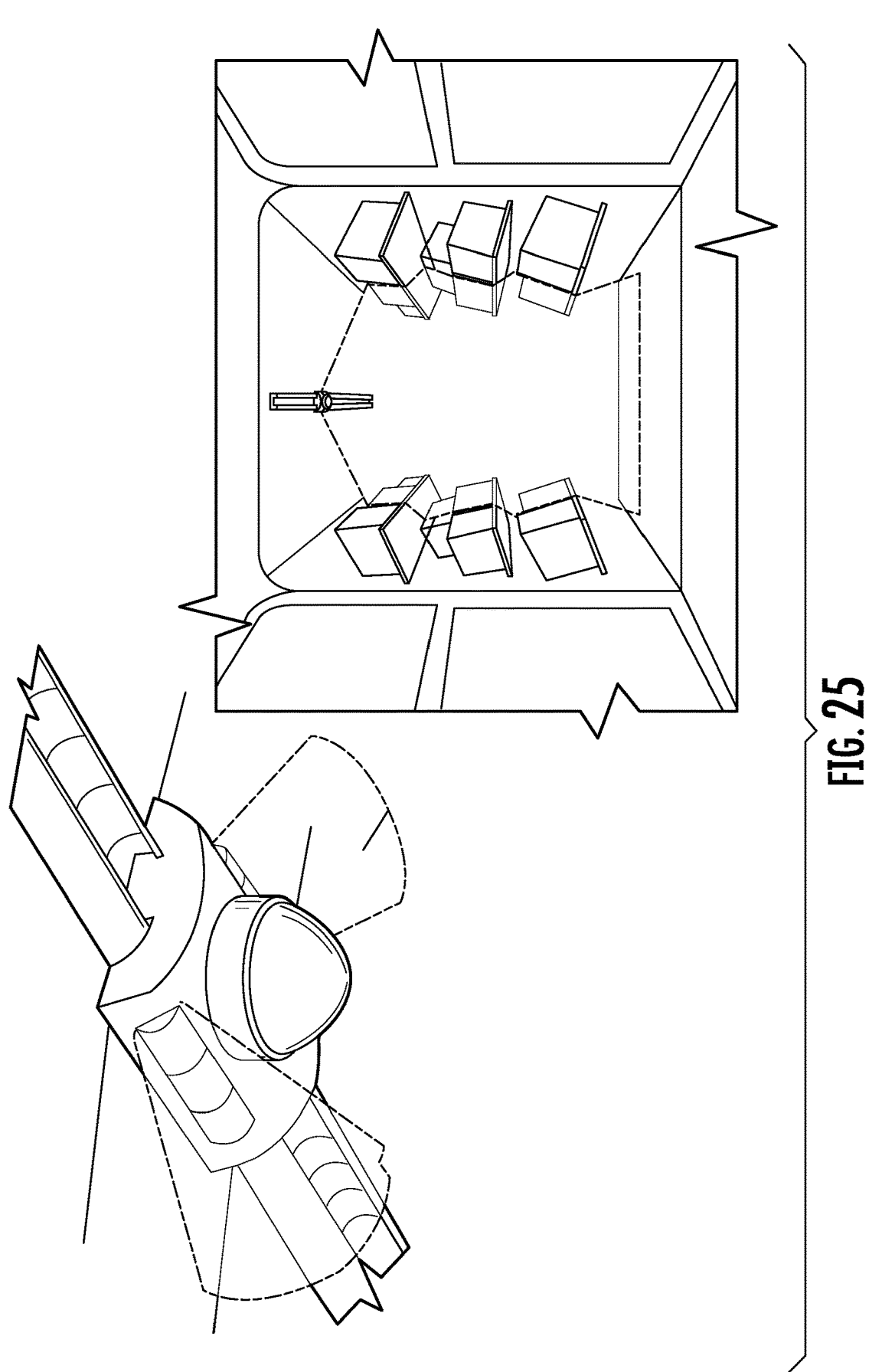

Generally, various considerations for moving the CSUs 200 and determining the travel path are contemplated. The overall system may allow for intelligent loading (i.e., based on a predetermined route), and securing cargo in CSUs as based on package size and weight. For example, heavier packages may be stored on a more rigidly constructed CSU (i.e., plastic vs. a MOLLE material), and larger packages may be stored in package cavities that are larger based on the spacing of the shelves within the CSUs. Furthermore, the shelves as previously discussed may be movable by the loader to customize the package cavity size for loading packages thereon. Moreover, the position of the rails with respect to the walls, ceiling, or floor may be determined based on the CSU size and in order to maximize volume for packages loaded in the vehicle cargo space. The in-vehicle conveyor system may also work along with vehicle on-board diagnostics in order to determine range (e.g., electric vehicle range or fuel range) of the vehicle based on weight of the packages loaded thereon, and, in some examples, update range as packages are unloaded via incorporation of weight sensors. Other systems may also cooperate with the in-vehicle conveyor system, such as the vehicle HVAC system may further cooperate with CSUs in order to heat or cool packages containing food or other temperature sensitive objects. The CSUs may also include other accessories powered by the rails or otherwise electrically connected to a vehicle power source or independent battery, such as UV lights for sanitizing the packages and security cameras for package security and identification and tracking as shown in the example of FIG. 25, other scanners (e.g., bar code scanners) for package identification or tracking, as well as stabilizers or locks not described herein. The accessories may be mounted to the rails or the CSUs, or may be incorporated on the vehicle walls, ceiling, or floor, and depiction of any particular arrangement in FIG. 25 is not intended to be limiting.

Figures 26A, 26B, 27:
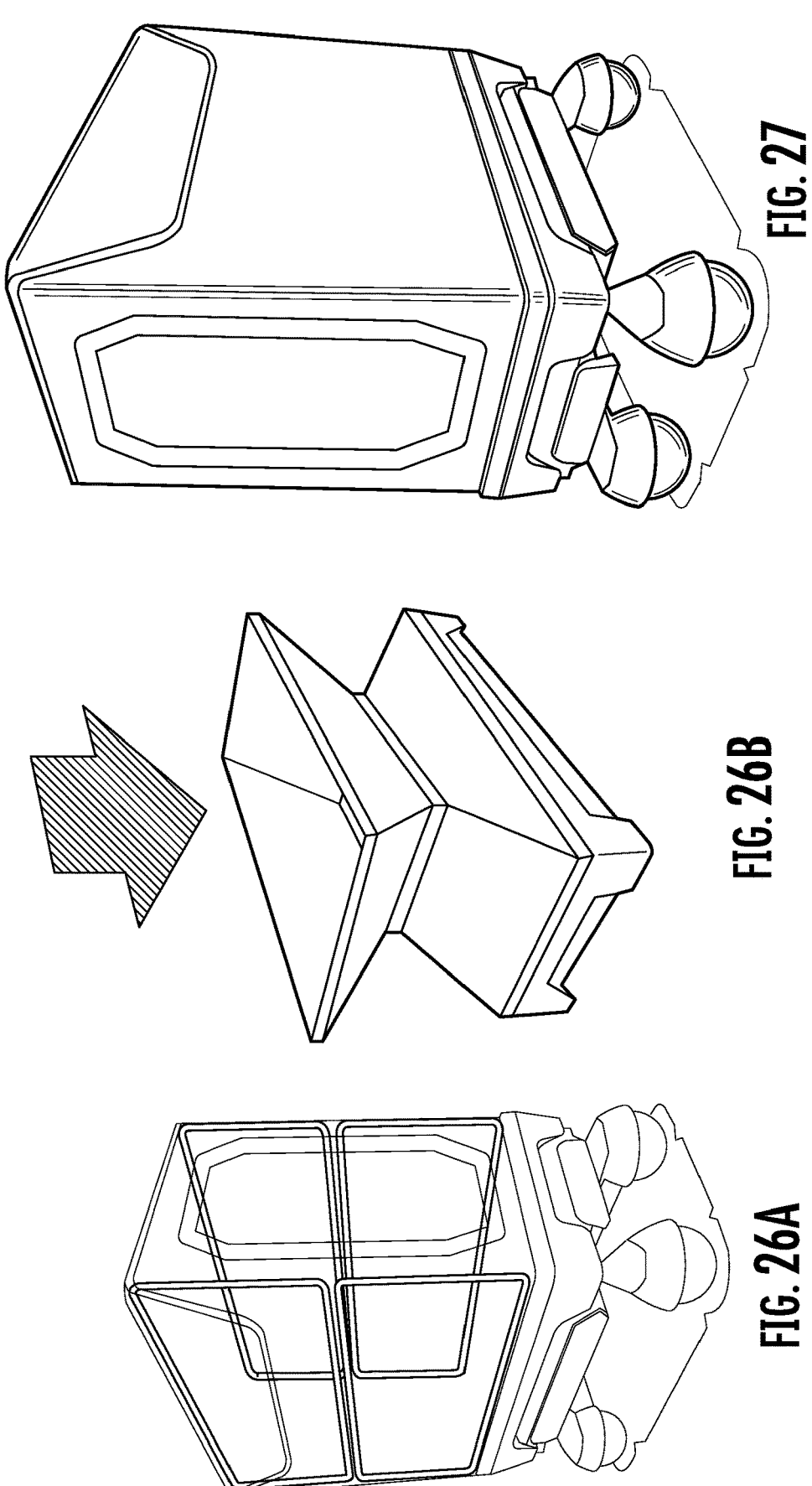
FIGS. 26A-B show a foldable CSU, according to one or more embodiments.
FIG. 27 shows a CSU with wheels, according to one or more embodiments.

When detached from the in-vehicle conveyor system, the CSUs 200 may have any suitable features to facilitate logistical management when off-board the vehicle. For examples, the CSUs may be foldable, as shown in FIGS. 26A-B, or may optionally further include wheels for facilitating travel along a surface as shown in FIG. 27. The wheels may be mounted to the CSU, or may, in other embodiments, be placeable on a wheeled board for movement. The wheeled board may be powered by a battery or may manually movable. In certain examples, the height of the wheeled board may be adjustable to facilitate loading of the CSU thereon.

In various examples, the in-vehicle cargo conveyor system 100 may be secured to the floor, walls, or ceiling of the vehicle cargo space in any suitable manner. For example, the in-vehicle cargo conveyor system 100 may be mounted to the walls and/or ceiling via a substructure reinforcement of the walls and/or ceiling to better bear the load of the in-vehicle cargo conveyor system, the CSUs, and all the components for each respectively, as well as their operation and movement. Although not shown in the Figures, the substructure may be any suitable structure of a suitable strength material to bear the load of the system, cargo, and CSUs. Various considerations may include the efficiency and overall weight of the vehicle when selecting a material and/or configuration of a substructure. For example, steel, aluminum, carbon, composite materials, other suitable load bearing type material, or combinations thereof may be considered.

According to one or more embodiments, a cargo management system includes a CSU 200 that may be movable along a circuit 310 defined as a travel path on rails 300 of an in-vehicle conveyor system 100. In various examples, where the system is based on an automated instruction, a controller (not shown) actuates drive mechanism(s) to move the CSUs 200 along the circuit 310, and more particularly, moves a specified CSU 250 to a predetermined location 315 along the circuit 310. However, in other embodiments, the controller may be manually activated to move a specified CSU 250, as based on manual instruction. In embodiments where the system is driven manually, the driver may manually actuate the movement of the CSUs and a controller may be optionally included. In examples with a controller and where the instruction is automated, the controller may actuate the drive mechanism(s) based on data, such as location data, delivery data, logistical information, GPS data, predetermined delivery paths/routes, delivery zones, or other suitable data associated with the packages on the CSU, the CSU, or the vehicle route that is relayed to the controller via sensors or scanners. The sensors or scanners may collect data related to positions of certain CSUs within the cargo space 102, which packages are on certain CSUs, and may further correlate the data at the controller with GPS data of the vehicle, a predetermined route or delivery path, or a delivery zone of the vehicle. As such, a specified CSU 250 can be recalled to a predetermined location 315 for easy access by the driver to the contents of stored in the specified CSU 200, while other CSUs 200 are moved efficiently out of the way. For example, the predetermined location 315 may correspond to a front area of the cargo space 102 or a rear area of the cargo space 102 (as defined along the Y-axis). At the front area of the cargo space 102, if the driver is able to access the specified CSU 250 within the vehicle, the CSU 250 may be rotated to have an accessible side face the interior of the vehicle as opposed to the outer walls 105. At the rear area of the cargo space 102, if the driver is accessing the specified CSU 250 from outside the vehicle, the CSU may be rotated to have the accessible side face the outer walls 105. Furthermore, in various embodiments, the predetermined location may be a centralized position along lateral rails 304 at the front or rear of the cargo space 102 to facilitate driver access to the specified CSU 250 brought to that location.

Thus, a cargo management system, in at least one embodiment, includes a controller and may be in wireless communication with the in-vehicle conveyor system 100 and CSUs 200 via electronics located on the vehicle or on the CSUs 200 for integrating the system 100 and CSUs 200 within the cargo management system.

The controller may be in communication via any suitable manner, such as but not limited to, WIFI, Bluetooth, a hardwire, or other wireless or wired electrical communication. The controller may provide instructions and/or generate instructions for operating the system 100 and moving CSUs 200 along the rails 300. For example, the controller may provide instructions for actuating the system, and in particular, the drive system 600, to move a specified CSU 250 from the CSUs 200 from a first location to another predetermined location based on data associated with the cargo or packages on the specified CSU 250 (e.g., delivery address, among other data).

The system may include sensors, scanners, or other processors that may also facilitate collection and transfer of logistical, locational, identifying or any other information about the cargo on a particular CSU to the controller. For example, the controller may be configured to receive information (e.g., logistical data or perishability data) from other sources such as a predetermined delivery route, logistical databases, the cargo itself, or other sources such as customer purchasing systems or on-vehicle GPS systems, in order to instruct the in vehicle conveyor system 100 to move CSUs according to the information.

In an example, each CSU 200 may be configured to specifically coordinate or operate within the in-vehicle conveyor system 100, having a circuit 310 of travel on the rails 300. The in-vehicle conveyor system 100 may be thus used to organize or sort cargo by various parameters such as order due date, geographical location, type of goods, etc. Thus, the controller may instruct the in-vehicle conveyor system 100 to move CSUs 200 as based on data indicative of logistical details, location, due dates, etc. as based on the determinations of various sensors, scanners, or data.

In another example, the in-vehicle conveyor system 100 may be configured to specifically coordinate or operate within a vehicle such that the vehicle can be efficiently loaded via coordinated control of a loading platform with the CSUs 200 loaded thereon via movement of the CSUs 200 along the rails 300 (allowing forward/aft movement without requiring personnel in the vehicle cargo space 102). Upon loading into the vehicle on the rails 300, each CSU 200 may be movable in the forward/aft direction or lateral direction as based on the rail configuration and the data associated with the CSU or packages loaded thereon to provide an efficient positioning of the CSUs for delivery. Thus, the CSUs 200, the in-vehicle conveyor system 100, the drive system 600, and the controller (not shown) may be configured to communicate back and forth transferring and receiving data or information between each other, using various sensors, scanners, or processors.

The in-vehicle conveyor system 100 may be used to move each of the CSUs 200 independently, collectively, or simultaneously. The data or information used to automate instructions for movement of CSUs may include any suitable data or information related to the packages, the CSUs locations, the vehicle location, delivery zones or predetermined routes, in addition to logistical information used to coordinate transporting cargo or specific payloads from a first location or destination to a second location or destination via vehicle 104. For example, the controller may receive information that cargo on a specified CSU 250 is ready for or upcoming delivery.

The controller 720 may then instruct the in-vehicle conveyor system 100 to move the specified CSU 250 to the predetermined location 315 such that all CSUs 200 move along the rails to new locations (in the racetrack configurations). In embodiments with the split loop, certain CSUs may move along the sub-circuit 311 while other CSUs remain stationary. Furthermore, in the center rail embodiments, only CSUs on the lateral rail corresponding to the specified CSU 250 may be moved in order for the specified CSU 250 to be brought to the forward or rear of the vehicle cargo space 102 based on the desired predetermined location 315. The recall of the specified CSU 250 may be based on the data related to the cargo items thereon, or other parameters as previously discussed.

In a refinement, the controller may instruct the in-vehicle conveyor system 100 to move CSUs 200 within the cargo space 102 as based on a predetermined delivery route or path, to organize the CSUs according to the delivery route or an inputted change to the route. The controller may repeat any number of steps for the CSUs to reach the desired ordering.

The controller may, in certain further embodiments, operate with the anti-sway system or bumpers 400 to inhibit the CSUs 200 from interfering with one another, or avoid collisions and/or disturbances against each other or the walls 105 of the cargo space 102. The controller may further control other parameters such as, for example, speed of the CSUs 200 by way of control of the drive system 600. The controller may further communicate with additional onboard devices (e.g., driver control panel) or remote devices or facilitate communication of the in-vehicle conveyor system 100 or CSUs 200 with the additional onboard devices (e.g., driver control panel) or remote devices.

In another embodiment, a method of managing cargo is provided. The method 800 includes providing an in-vehicle conveyor system 100 as described above, and securing CSUs 200 as described above with cargo thereon onto rails of the in-vehicle conveyor system 100. The in-vehicle conveyor system may receive or convey information to the controller which may then transfer instruction to drive system to move a specified CSU 250 to a predetermined location 315 along a circuit 310 defining the travel path of the CSUs.

The CSUs may provide information related to the cargo, its location, destination and/or delivery zone to the controller. For example, the controller may request location information from the CSU for packages loaded thereon and/or provide instructions to the drive system for moving the CSUs. In some embodiments, the CSUs are all moved simultaneously on the rails. Additional information may be supplied to the in-vehicle conveyor system 100, such as the predetermined location 315, such that the CSU may be swiveled or rotated for the driver to access the contents of the CSU.

Thus, according to one or more embodiments, a cargo management system is provided, along with an in-vehicle conveyor system with rails, with cargo storage units (CSUs) mounted thereto. The in-vehicle conveyor system allows movement of the CSUs within the cargo space along the rails, as may be based on data related to the cargo on a specified CSU in order for the specified CSU to reach a predetermined location along a circuit defined by the travel path planned for the CSU. As such, the CSU can be transported within a vehicle to facilitate logistics, organization, and maintenance of cargo. Features for connecting the CSUs with the rails, examples of rail configurations with cross-car movement, and drive systems are also provided, in addition to swivel mechanisms and anti-sway systems in various examples.

Aspects.

Aspect 1. A system for moving cargo comprises an in-vehicle conveyor system mounted in a vehicle cargo space, the in-vehicle conveyor system comprising one or more rails, the rails mounted to walls, floor, or ceiling of the vehicle cargo space; and one or more cargo storage units attached to the in-vehicle conveyor system, each of the one or more cargo storage units secured to the rails such that the one or more cargo storage units are raised with respect to a floor of the vehicle cargo space and defining a circuit as based on a travel path of the one or more cargo storage units, wherein, upon instruction, the cargo storage units are movable along the circuit to move a specified cargo storage unit to a predetermined location.

Aspect 2. The system of claim 1, wherein the instruction is based on delivery data of packages loaded in the specified cargo storage unit.

Aspect 3. The system of aspects 1 or 2, wherein the instruction is further based on location information, a predetermined path or route, or GPS data of a vehicle in which the in-vehicle conveyor system is provided.

Aspect 4. The system of any of aspects 1 to 3, wherein the predetermined location is a front portion of the circuit or a rear portion of the circuit, corresponding to a front of a vehicle and a rear of a vehicle, respectively.

Aspect 5. The system of aspect 1, wherein the rails are provided as a monorail track, dual rail track, or combinations thereof.

Aspect 6. The system of any of the preceding aspects, wherein each of the one or more cargo storage units comprises one or more shelves.

Aspect 7. The system of aspect 6, wherein the one or more shelves are unevenly spaced to define package cavities in the cargo storage unit of varying size.

Aspect 8. The system of any of the preceding aspects, wherein the one or more cargo storage units are rotatable about a vertical axis with respect to the rails.

Aspect 9. The system of any of the preceding aspects, wherein the one or more cargo storage units are each individually secured to the rails via one or more trolleys.

Aspect 10. The system of aspects 1, 8, or 9, wherein the one or more cargo storage units hang from the rails via dual trolleys.

Aspect 11. The system of aspects 1, 8, 9, or 10, wherein one or more of the trolleys comprise a hook, ball joint, gear and barrel, hanger frame, or combinations thereof.

Aspect 12. The system of any of the preceding aspects, wherein the in-vehicle conveyor system is manually driven, power driven, belt driven, cable driven, or chain driven Aspect 13. The system of any of the preceding aspects, wherein one or more of the one or more cargo storage units comprises one or more bumpers Aspect 14. A device for moving cargo comprises an in-vehicle conveyor system mounted in a vehicle cargo space, the in-vehicle conveyor system comprising one or more rails comprising legs and corner portions in the vehicle cargo space, the rails mounted to walls, floor, or ceiling of the vehicle cargo space and having one or more cargo storage units removably attached to the rails such that the one or more cargo storage units are raised with respect to a floor of the vehicle cargo space; and an actuator for driving movement of the one or more cargo storage units to various positions along a circuit defined by a travel path of the one or more cargo storage units, wherein, upon instruction, the actuator moves specified cargo units to predetermined locations along the circuit.

Aspect 15. The device of aspect 14, wherein the rails comprise two elongated side legs, two short ends, and corner portions between a respective elongated side leg and short end.

Aspect 16. The device of aspects 14 or 15, wherein the circuit may include one or more sub-circuits defined within the circuit corresponding to shorter travel paths for one or more cargo storage units when compared to the travel path.

Aspect 17. The device of aspects 14, 15 or 16, wherein the rails further comprise a split rail forming a short loop circuit within the circuit as part of the travel path for one or more cargo storage units.

Aspect 18. A method of managing cargo in a vehicle, the method comprising: providing an in-vehicle conveyor system comprising one or more rails mounted to walls or ceilings of a vehicle cargo space; securing one or more cargo storage units having at least one shelf to the rails such that each cargo storage unit independently moves along a circuit defined by a travel path of one or more of the cargo storage units; and moving a specified cargo storage unit of the one or more cargo units from a first location on the circuit to a predetermined second location along the circuit, wherein the moving is via a power-driven or manually driven system.

Aspect 19. The method of aspect 18, further comprising: receiving delivery data, location information, a predetermined path or route, or GPS data, or combinations thereof, at a controller about packages on one or more of the cargo storage units to generate instructions for transporting the specified cargo storage unit; initiating an actuator according to the instructions to transport the specified cargo unit from the first location to the predetermined second location.

Aspect 20. The method of aspects 18 or 19, wherein the predetermined second location corresponds to an accessible position for a vehicle driver to access packages stored in the specified cargo storage unit.

Aspect 21. A cargo storage unit for use with an in-vehicle conveyor system, the cargo storage unit comprising a body defining a cavity for receiving packages therein, the body comprising a mount for attaching the body to rails of an in-vehicle conveyor system; and one or more shelves formed in the body to support the packages thereon.

Aspect 22. The cargo storage unit of aspect 21, wherein the one or more shelves are unevenly spaced to define package cavities of varying size.

Aspect 23. The cargo storage unit of aspects 21 or 22, wherein the body and one or more shelves are constructed of one or more tote bags.

Aspect 24. The cargo storage unit of aspect 23, wherein the one or more tote bags are made of a modular lightweight load-carrying equipment material hooked to a wire frame to form the cargo storage unit.

Aspect 25. The cargo storage unit of aspects 21 or 22, wherein the body is constructed of a box-shell housing with two or more sides receiving the one or more shelving therein to define package cavities to store cargo.

Aspect 26. The cargo storage unit of aspect 25, wherein the box-shell housing is formed from a trim material on a frame, a metal shell, or a plastic shell.

Aspect 27. The cargo storage unit of aspects 25 or 26, wherein the one or more shelves are unevenly spaced along a height of the box-shell.

Aspect 28. The cargo storage unit of any of aspects 25 to 27, wherein the two or more sides are retractable, detachable, or foldable.

Aspect 29. The cargo storage unit of any of aspects 21 to 28, wherein the mount suspends the cargo storage unit from the rails such that the body can move freely relative to the rails.

Aspect 30. The cargo storage unit of aspects 21 or 22, wherein cargo storage unit is a welded assembly with shelves integrally formed within a frame.

Aspect 31. The cargo storage unit of any of aspects 21 to 30, wherein the mount is a single trolley or dual trolley attachment for the cargo storage unit to the rails.

Aspect 32. The cargo storage unit of aspect 31, wherein the single trolley or dual trolley comprise a hook, frame hanger, gear and barrel, ball joint connection, or combinations thereof for securing the cargo storage unit to the rails.

Aspect 33. An in-vehicle conveyor system comprises one or more rails mounted to walls or a ceiling of a vehicle cargo space; one or more cargo storage units removably attached to the rails such that the one or more cargo storage units are raised with respect to a floor of the vehicle cargo space and are movable along a circuit defined in the vehicle cargo spaced based on a travel path of one or more of the cargo storage units; a drive system for moving the cargo storage units along the circuit; and responsive to commands related to the travel path of a specified cargo unit, a controller which actuates the drive system to move the specified cargo unit to a predetermined location.

Aspect 34. The in-vehicle conveyor system of aspect 33, wherein the command is based on delivery data, location information, a predetermined path or route, or GPS data, or combinations thereof.

Aspect 35. The in-vehicle conveyor system of aspects 33 or 34, wherein the drive system comprises a linear drive system.

Aspect 36. The in-vehicle conveyor system of aspect 35, wherein the linear drive system includes one or more linear drive units to move the one or more cargo storage unit in one or more directions.

Aspect 37. The in-vehicle conveyor system of aspect 36, wherein the one or more linear drive units include a plurality of linear actuators with each linear actuator having a home position aligning a corner mechanism with a first rail of the rails.

Aspect 38. The in-vehicle conveyor system of any of aspects 35 to 37, wherein each linear actuator is a two way actuator for motion of each cargo storage unit in two directions.

Aspect 39. The in-vehicle conveyor system of aspect 36, wherein the one or more linear drive units include lead screws for moving the cargo storage units.

Aspect 40. The in-vehicle conveyor system of aspect 33, wherein the drive system is a belt driven system.

Aspect 41. The in-vehicle conveyor system of aspect 33, wherein the drive system is a cable driven system.

Aspect 42. The in-vehicle conveyor system of aspect 41, wherein the cable driven system is a monorail or tandem rail arrangement.

Aspect 43. The in-vehicle conveyor system of aspect 33, wherein the drive system is a chain driven system.

Aspect 44. The in-vehicle conveyor system of any of aspects 33 to 43, wherein the drive system comprises one or more actuators.

Aspect 45. The in-vehicle conveyor system of any of aspects 33 to 43, wherein the drive system is a manually driven system.

Aspect 46. The in-vehicle conveyor system of aspect 33 or 34, wherein the drive system is a combination of a linear belt drive system and a cable driven system.

Aspect 47. An in-vehicle conveyor system comprising a set of rails mounted to walls or a ceiling of a vehicle cargo space, the set of rails comprising forward/aft legs and lateral legs in the vehicle cargo space; corner portions between respective forward/aft legs and lateral; and one or more cargo storage units removably attached from the rails and movable along a circuit defined by a travel path of the one or more cargo storage units, wherein the one or more cargo storage units translate in a forward/aft direction along the forward/aft legs and a lateral direction along the lateral legs, and move between the forward/aft legs and the lateral legs via the corner portions.

Aspect 48. The in-vehicle conveyor system of aspect 47, wherein the corner portion include one or more corner turnstiles, with each corner turnstile aligning with a forward/aft leg in a first position and a lateral leg in a second position.

Aspect 49. The in-vehicle conveyor system of aspect 47, wherein the corner portions include corner radii with a first end adjoining a forward/aft leg and a second end adjoining a lateral leg.

Aspect 50. The in-vehicle conveyor system of aspect 47, wherein the corner portion includes gear and barrel to connect a forward/aft leg with a lateral leg.

Aspect 51. The in-vehicle conveyor system of any of aspects 47 to 50, wherein the one or more cargo storage units each include one or more trolleys to mount the respective cargo unit to the rails.

Aspect 52. The in-vehicle conveyor system of aspect 51, wherein each of the one or more trolleys includes a center pin comprising a first position for fore/aft transfer of the cargo storage unit, and a second position for later transfer of the cargo, with the corner portion comprising a fore/aft hook engaged with the center pin in the first position, and a lateral hook engaged with the center pin in the second position.

Aspect 53. The in-vehicle conveyor system of any of aspects 47 to 52, further comprising a center rail disposed between the forward/aft legs of the set of rails, the center rail connected to the lateral legs via additional corner portions and providing a sub-circuit for travel of the cargo storage units.

Aspect 54. The in-vehicle conveyor system of any of aspects 47 to 52, further comprising a lateral rail disposed between the lateral legs of the set of rails, the lateral rail in connected to the forward/aft legs via additional corner portions and providing a sub-circuit for travel of the cargo storage units.

Aspect 55. The in-vehicle conveyor system of aspect 47, wherein the corner portions comprise a combination of corner turnstiles, corner radii, gear and barrel mechanisms, and biased hooks.

Aspect 56. An in-vehicle conveyor system comprising: a set of rails mounted to walls or a ceiling of a vehicle cargo space, the set of rails comprising a center rail extending in a forward/aft direction in the vehicle cargo space, and a plurality of lateral rails extending in a lateral direction in the vehicle cargo space; corner portions at junctures between the center rail and each lateral rail; and one or more cargo storage units removably attached to the rails and movable along a circuit defined based on travel paths of the one or more cargo storage units, wherein the one or more cargo storage units have a stored position on the lateral rails, and translate in a lateral direction toward the center rail, and are transferred onto the center rail via the corner portions for movement in a forward/aft direction in the vehicle cargo space.

Aspect 57. The in-vehicle conveyor system of aspect 56, wherein the corner portions comprise corner turnstiles, corner radii, gear and barrel mechanisms, biased hooks, or combinations thereof.

Aspect 58. The in-vehicle conveyor system of aspects 56 or 57, further comprising pushing members which push the cargo storage units toward the center rail.

Aspect 59. A cargo system comprising: an in-vehicle conveyor system mounted in a vehicle cargo space, the in-vehicle conveyor system comprising one or more rails, the rails mounted to walls or ceilings of the vehicle cargo space; one or more cargo storage units removably attached to the in-vehicle conveyor system and defining a circuit based on a travel path of the one or more cargo storage units, and when the one or more cargo storage units are attached to the in-vehicle conveyor system, free ends of the one or more cargo storage units are raised with respect to a floor of the vehicle cargo space; and an anti-sway system cooperating with the one or more cargo storage units, the rails, and/or the walls, ceiling, or floor of the vehicle cargo space to inhibit swinging or rotation of the free ends relative to the top ends or bottom ends.

Aspect 60. The system of aspect 59, wherein the anti-sway system comprises railings to contact the cargo storage units to restrict movement of the cargo storage units relative to the rails.

Aspect 61. The system of aspect 60, wherein the railings comprise protrusions which cooperate with channels defined in the free ends of the cargo storage units to guide the cargo storage units.

Aspect 62. The system of aspects 60 or 61, wherein the railings are on the walls around the vehicle cargo space, at a forward end of the vehicle cargo space, at a rear end of the cargo space, towards a center of the cargo space, or combinations thereof.

Aspect 63. The system of any of aspects 59 to 62, wherein the anti-sway system comprises vertically extending railings extending from the floor of the vehicle cargo space to restrict movement of the cargo storage units relative to the rails and restrain overflow cargo stored on the floor.

Aspect 64. A trolley for an in-vehicle conveyor system, the mount comprising: a plate defining one or more openings, and comprising bearings disposed in the openings; a swivel mechanism mounted to the center of the plate on a top side of the plate and extending vertically therefrom; and a cargo storage unit connector mounted to a bottom side of the plate.

Aspect 65. The trolley of aspect 64, wherein the swivel mechanism includes a gear portion or a rack portion of a rack and pinion gear set.

Aspect 66. The trolley of aspect 64, further comprising a center pin having a first position corresponding to a first direction of movement and a second position corresponding to a second direction of movement.

Aspect 67. The trolley of any of aspects 64 to 66, wherein the swivel mechanism is rotatable by a motor and gear mechanism.

Aspect 68. The trolley of any of aspects 64 to 67, wherein the swivel mechanism includes a rotational detent device having one or more indentations for engaging pins.

Any of the above methods or systems described in the aspects, and the features of each, may be combined with other methods or systems, or features of each, to integrate various aspects of the claims, aspects, and/or disclosures as described herein. Additionally, the system, construction, steps, features, or components describing the in-vehicle conveyor system may be incorporated in any order, combination, or arrangement, and its operation may be incorporated by any method for moving CSUs in the appropriate system.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on specific application and implementation. These attributes can include, but are not limited to cost, strength, durability, life cycle cost, marketability, appearance, packaging size, serviceability, weight, manufacturability, ease of assembly, etc. As such to the extent any such embodiments are described as less desirable than other embodiments or prior art implementations with respect to one or more characteristics, these embodiments are not outside the scope of the disclosure and can be desirable for particular applications.

What is claimed is:

1. A system configured to move a cargo, the system comprising:
an in-vehicle conveyor system mounted in a vehicle cargo space, the in-vehicle conveyor system comprising one or more rails, the rails mounted to at least one of: walls, a floor, and a ceiling of the vehicle cargo space;
one or more cargo storage units attached to the in-vehicle conveyor system, each of the one or more cargo storage units secured to the rails such that the one or more cargo storage units are raised with respect to the floor of the vehicle cargo space and defining a circuit as based on a travel path of the one or more cargo storage units, wherein, upon instruction to the one or more cargo storage units, the one or more cargo storage units are movable along the circuit to move a specified cargo storage unit to a predetermined location; and
an anti-sway system mounted to at least one of: the rails, the walls, the ceiling, and the floor of the vehicle cargo space and, wherein the anti-sway system is configured to inhibit swinging or rotation of free ends of the one or more cargo storage units.

2. The system of claim 1, wherein the instruction is a manual instruction or based on delivery data of packages loaded in the specified cargo storage unit, and wherein the instruction is based on at least one of: a location information, a predetermined path or route, and a GPS data of a vehicle in which the in-vehicle conveyor system is provided.

3. The system of 1, wherein the predetermined location is a front portion of the circuit or a rear portion of the circuit.

4. The system of claim 1, wherein the rails are provided as a monorail track, dual rail track, or combinations thereof.

5. The system of claim 1, wherein each of the one or more cargo storage units comprises one or more shelves.

6. The system of claim 5, wherein the one or more shelves are unevenly spaced to define package cavities in the one or more cargo storage units of varying sizes.

7. The system of claim 1, wherein the one or more cargo storage units are rotatable about a vertical axis with respect to the rails.

8. The system of claim 1, wherein the one or more cargo storage units are each individually secured to the rails via one or more trolleys.

9. The system of claim 8, wherein the one or more trolleys comprise a hook, a ball joint, a gear and a barrel, a hanger frame, or combinations thereof.

10. The system of claim 1, wherein the in-vehicle conveyor system is manually driven, power driven, belt driven, cable driven, or chain driven.

11. The system of claim 1, wherein one or more of the one or more cargo storage units comprises one or more bumpers.

12. A device configured to move a cargo, the device comprising:

an in-vehicle conveyor system mounted in a vehicle cargo space, the in-vehicle conveyor system comprising one or more rails comprising legs and corner portions in the vehicle cargo space, the rails mounted to at least one of: walls, a floor, and a ceiling of the vehicle cargo space and comprising one or more cargo storage units removably attached to the rails such that the one or more cargo storage units are raised with respect to the floor of the vehicle cargo space;

an actuator driving movement of the one or more cargo storage units to various positions along a circuit defined by a travel path of the one or more cargo storage units, wherein, upon instruction, the actuator moves specified cargo units to predetermined locations along the circuit; and an anti-sway system mounted to at least one of: the rails, the walls, the ceiling, and the floor of the vehicle cargo space and, wherein the anti-sway system is configured to inhibit swinging or rotation of free ends of the one or more cargo storage units.

13. The device of claim 12, wherein the rails comprise two elongated side legs, two short ends, and corner portions between a respective elongated side leg and short end.

14. The device of claim 12, wherein the circuit includes one or more sub-circuits defined within the circuit corresponding to shorter travel paths for one or more cargo storage units when compared to the travel path.

15. The device of claim 12, wherein the rails further comprise a split rail forming a short loop circuit as a sub-circuit within the circuit as a shorter travel path for the one or more cargo storage units when compared to the travel path.

16. The system of claim 1, wherein the anti-sway system is configured to be moved in a deployed position and a stored position, wherein:

in the deployed position, the anti-sway system is configured to inhibit swinging or rotation of free ends of the one or more cargo storage units, and in the stored position, the anti-sway system is moved away from the one or more cargo storage units.

17. The system of claim 1, wherein the anti-sway system comprises a plurality of railings extending from the vehicle cargo space to restrict the movement of the one or more cargo storage units.

* * * * *